(12) United States Patent
Vijgen et al.

(10) Patent No.: US 11,052,992 B2
(45) Date of Patent: Jul. 6, 2021

(54) MINI-SPOILERS FOR ENHANCING THE EFFECTIVENESS OF LATERAL-CONTROL SURFACES OF AIRCRAFT WINGS

(71) Applicant: The Boeing Company, Chicago, IL (US)

(72) Inventors: Paul M. Vijgen, Everett, WA (US); Adam P. Malachowski, Lynnwood, WA (US); Christopher A. Konings, Lynnwood, WA (US); Brian E. Geppert, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 87 days.

(21) Appl. No.: 16/692,704

(22) Filed: Nov. 22, 2019

(65) Prior Publication Data

US 2021/0155338 A1 May 27, 2021

(51) Int. Cl.
*B64C 9/12* (2006.01)
*B64C 9/04* (2006.01)
(Continued)

(52) U.S. Cl.
CPC ............... *B64C 9/12* (2013.01); *B64C 9/04* (2013.01); *B64C 13/02* (2013.01); *B64C 13/28* (2013.01); *B64C 2009/005* (2013.01)

(58) Field of Classification Search
CPC .... B64C 9/00; B64C 9/02; B64C 9/04; B64C 9/10; B64C 9/12; B64C 2009/005; B64C 13/02
See application file for complete search history.

(56) References Cited

U.S. PATENT DOCUMENTS

| | | | |
|---|---|---|---|
| 2,173,674 A | * | 9/1939 | Zaparka ............... B64C 9/02 244/90 R |
| 2,730,313 A | * | 1/1956 | Ringham ............ B64C 23/00 244/213 |

(Continued)

FOREIGN PATENT DOCUMENTS

| | | |
|---|---|---|
| EP | 3546345 | 10/2019 |
| FR | 1035117 | 8/1953 |

OTHER PUBLICATIONS

European Patent Office, "Extended European Search Report," issued in connection with European Patent Application No. 20209049.4, dated Apr. 19, 2021, 9 pages.

*Primary Examiner* — Richard G Davis
(74) *Attorney, Agent, or Firm* — Hanley, Flight & Zimmerman, LLC

(57) ABSTRACT

Mini-spoilers for enhancing the effectiveness of lateral-control surfaces of aircraft wings are described. An example aircraft includes a wing, a lateral-control surface, and a mini-spoiler. The lateral-control surface is movably coupled to the wing. The lateral-control surface is movable between a neutral position, a first upward deflected position, and a second upward deflected position extending beyond the first upward deflected position. The mini-spoiler is located on or forward of the lateral-control surface. The mini-spoiler is movable between a retracted position and a deployed position. The mini-spoiler is configured to be moved from the retracted position to the deployed position based on the lateral-control surface being moved from the neutral position to or toward the first upward deflected position.

22 Claims, 26 Drawing Sheets

(51) Int. Cl.
*B64C 13/28* (2006.01)
*B64C 13/02* (2006.01)
*B64C 9/00* (2006.01)

(56) References Cited

U.S. PATENT DOCUMENTS

| | | | |
|---|---|---|---|
| 2,750,132 A | | 6/1956 | Palmer et al. |
| 2,981,503 A | | 4/1961 | Goode et al. |
| 3,120,935 A | | 2/1964 | Perrin |
| 4,015,787 A | * | 4/1977 | Maieli .................. B64C 9/20 244/215 |
| 10,144,502 B2 | | 12/2018 | Omeara et al. |
| 2006/0175468 A1 | * | 8/2006 | Huynh ................ B64C 9/323 244/212 |
| 2007/0284483 A1 | * | 12/2007 | Milliere .............. B64C 9/323 244/217 |
| 2015/0083851 A1 | * | 3/2015 | Moser ................. B64C 13/16 244/99.2 |
| 2015/0083867 A1 | * | 3/2015 | Moser ................. B64C 9/24 244/214 |
| 2017/0259908 A1 | * | 9/2017 | Omeara ............... B64C 9/16 |

\* cited by examiner

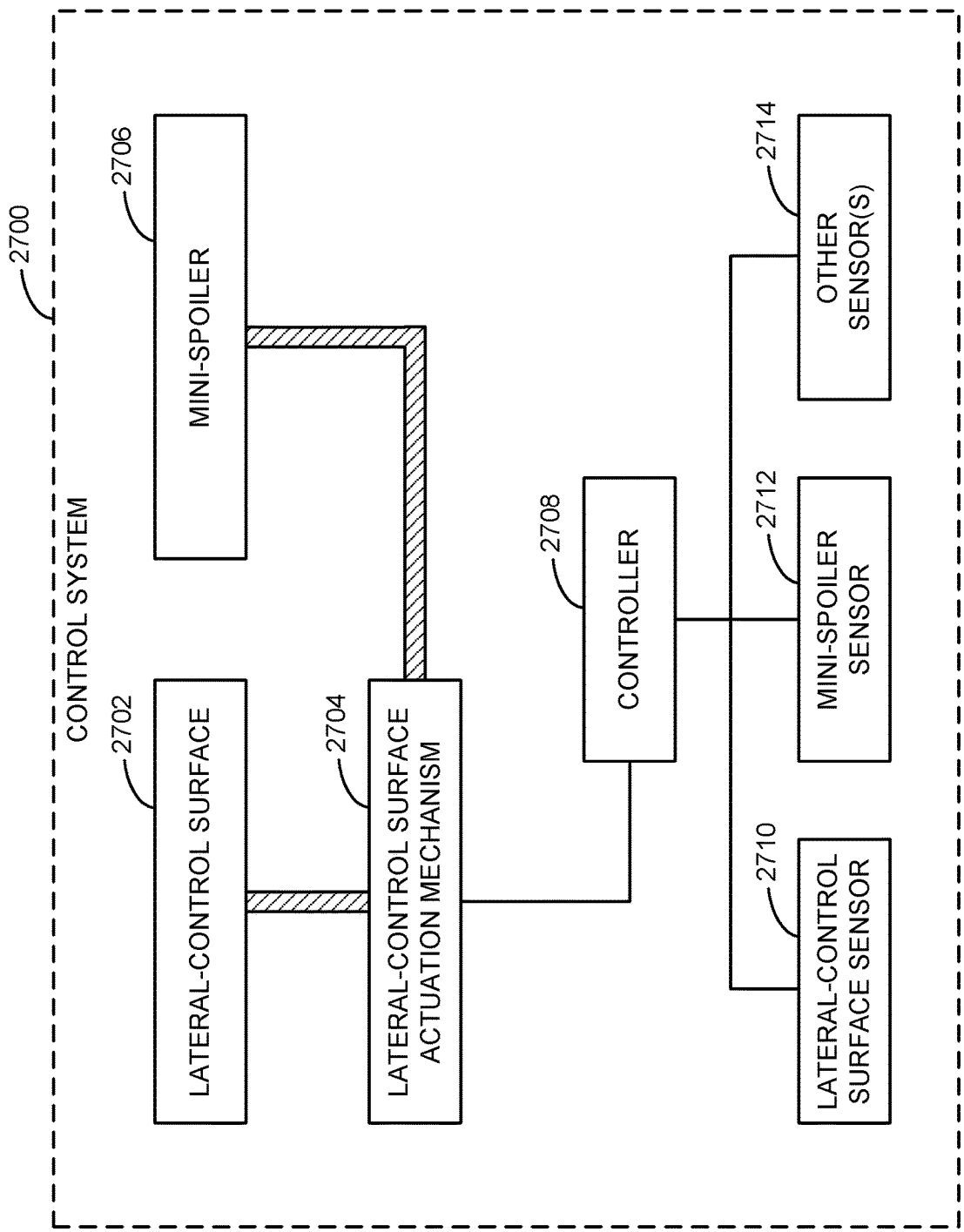

US 11,052,992 B2

MINI-SPOILERS FOR ENHANCING THE EFFECTIVENESS OF LATERAL-CONTROL SURFACES OF AIRCRAFT WINGS

FIELD OF THE DISCLOSURE

This disclosure relates generally to lateral-control surfaces of aircraft wings and, more specifically, to mini-spoilers for enhancing the effectiveness of lateral-control surfaces of aircraft wings.

BACKGROUND

Each wing of an aircraft commonly includes one or more lateral-control surface(s) (e.g., one or more aileron(s), one or more flaperon(s), one or more spoiler(s), etc.) configured to control the roll and/or the yaw of the aircraft during flight. Each lateral-control surface is typically movable from a neutral (e.g., undeflected) position through a range of deflected positions (e.g., a range of upward and/or downward deflected positions) that enable the lateral-control surface to provide a desired aerodynamic effect associated with controlling the roll and/or the yaw of the aircraft.

While lateral-control surfaces are generally effective for controlling the roll and/or the yaw of the aircraft, a lateral-control surface can in some instances experience an adverse reversal of its intended aerodynamic effect. For example, at flight conditions with locally transonic flow features on swept wings at high subsonic Mach numbers beyond cruise, strong shock waves can develop causing flow separation. A lateral-control surface deployed at a small upward deflection (e.g., five degrees (5°) upward) can change local flow separation and/or reattachment such that an adverse aerodynamic effect of the lateral-control surface occurs. The adverse aerodynamic effect can include the formation of a dead-band, or even reversal of the intended lateral-control surface effect, with opposite roll and/or yaw control response relative to what is achieved at lower Mach numbers.

SUMMARY

Mini-spoilers for enhancing the effectiveness of lateral-control surfaces of aircraft wings are disclosed herein. In some examples, an aircraft is disclosed. In some disclosed examples, the aircraft comprises a wing, a lateral-control surface, and a mini-spoiler. In some disclosed examples, the lateral-control surface is movably coupled to the wing. In some disclosed examples, the lateral-control surface is movable between a neutral position, a first upward deflected position, and a second upward deflected position extending beyond the first upward deflected position. In some disclosed examples, the mini-spoiler is located on or forward of the lateral-control surface. In some disclosed examples, the mini-spoiler is movable between a retracted position and a deployed position. In some disclosed examples, the mini-spoiler is configured to be moved from the retracted position to the deployed position based on the lateral-control surface being moved from the neutral position to or toward the first upward deflected position.

In some examples, a method is disclosed. In some disclosed examples, the method comprises moving a lateral-control surface coupled to a wing of an aircraft from a neutral position to a first upward deflected position, and from the first upward deflected position to a second upward deflected position extending beyond the first upward deflected position. In some disclosed examples, the method further comprises moving a mini-spoiler located on or forward of the lateral-control surface from a retracted position to a deployed position based on the lateral-control surface being moved from the neutral position to or toward the first upward deflected position.

BRIEF DESCRIPTION OF THE DRAWINGS

FIG. 27 is a block diagram of a second example control system configured to control the movement of a mini-spoiler associated with a lateral-control surface of an aircraft wing.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 1:
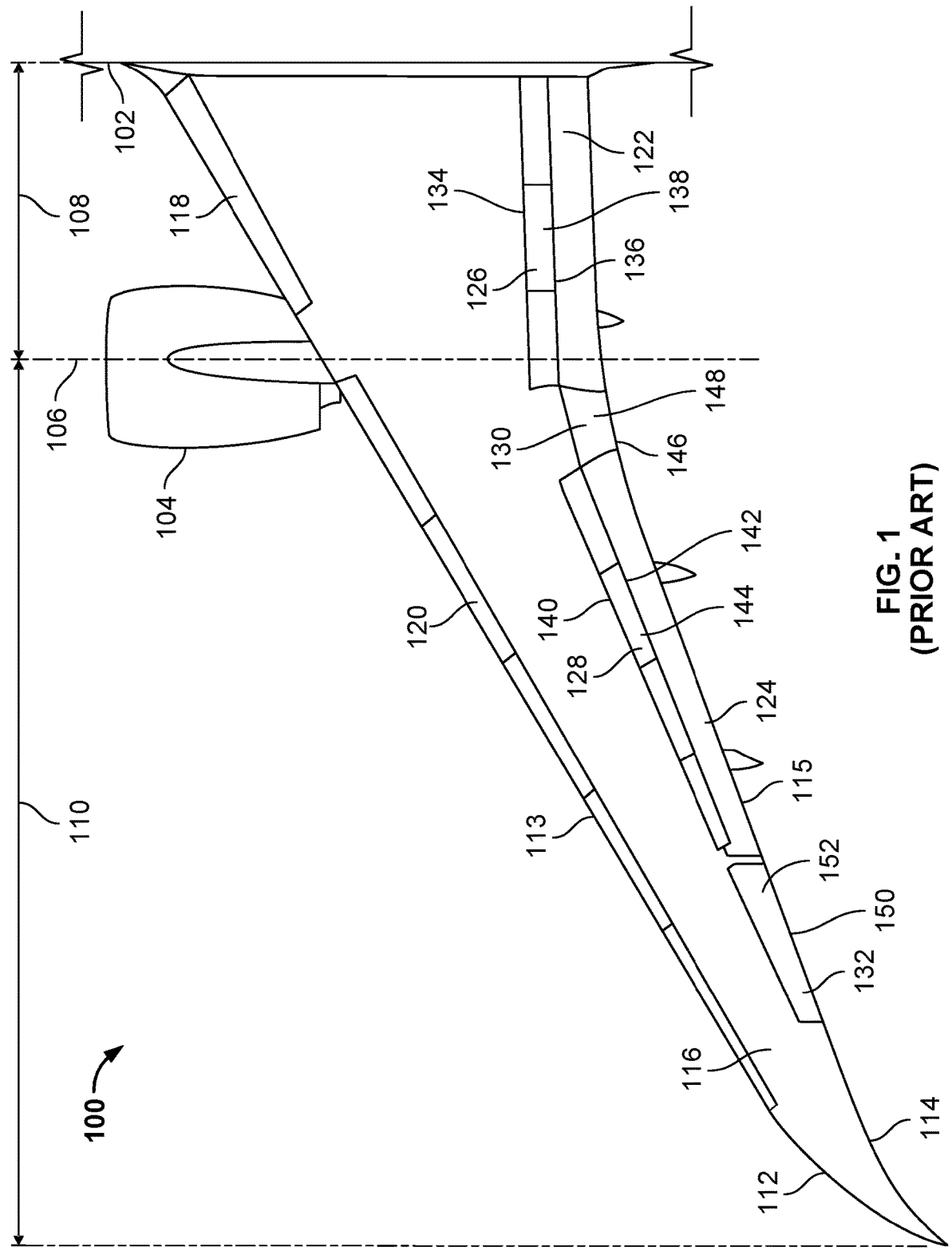
FIG. 1 is a plan view of a known aircraft wing.

FIG. 1 is a plan view of a known aircraft wing 100. The aircraft wing 100 of FIG. 1 is coupled to a fuselage 102 of an aircraft, and is swept in a rearward direction relative thereto. In other examples, the aircraft wing 100 can alternatively be swept in a forward direction, or can alternatively be implemented in a straight wing configuration. A nacelle 104 of the aircraft is coupled to the aircraft wing 100. A longitudinal axis 106 of the nacelle 104 generally divides the aircraft wing 100 into an inboard portion 108 (e.g., located between the fuselage 102 and the longitudinal axis 106 of the nacelle 104) and an outboard portion 110 (e.g., located outboard of the longitudinal axis 106 of the nacelle 104). The aircraft wing 100 further includes a fixed leading edge 112, a fixed trailing edge 114 located opposite to and/or rearward of the fixed leading edge 112, and a fixed upper surface 116 extending between the fixed leading edge 112 and the fixed trailing edge 114. Additionally, the aircraft wing includes a leading edge 113 and a trailing edge 115 located opposite to and/or rearward of the leading edge 113. The leading edge 113 is the true leading edge of the aircraft wing 100, taken when any deployable and/or movable leading edge device(s) of the aircraft wing 100 is/are positioned in their respective stowed and/or neutral position(s) relative to the fixed leading edge 112 of the aircraft wing 100. The trailing edge 115 is the true trailing edge of the aircraft wing 100, taken when any deployable and/or movable trailing edge device(s) of the aircraft wing 100 is/are positioned in their respective stowed and/or neutral position(s) relative to the fixed trailing edge 114 of the aircraft wing 100.

The aircraft wing 100 of FIG. 1 includes several different types of flight-control surfaces and/or devices, including lift-control surfaces. The lift-control surfaces of the aircraft wing 100 of FIG. 1 include an inboard slat 118, outboard slats 120, an inboard flap 122, and an outboard flap 124. The lift-control surfaces individually and/or collectively provide in-flight lift-control (e.g., by adjusting the coefficient of lift generated by the aircraft wing 100 relative to a local airflow) for an aircraft implementing the aircraft wing 100 of FIG. 1. As shown in FIG. 1, the inboard slat 118 and the inboard flap 122 are generally located inboard of the longitudinal axis 106 of the nacelle 104 (e.g., within the inboard portion 108 of the aircraft wing 100), while the outboard slats 120 and the outboard flap 124 are generally located outboard of the longitudinal axis 106 of the nacelle 104 (e.g., within the outboard portion 110 of the aircraft wing 100).

In addition to the lift-control surfaces described above, the aircraft wing 100 of FIG. 1 also includes flight-control surfaces and/or devices configured as lateral-control surfaces. The lateral-control surfaces of the aircraft wing 100 of FIG. 1 include an inboard spoiler 126, an outboard spoiler 128, a flaperon 130, and an aileron 132. Only some of the listed lateral-control devices may be incorporated on a wing (e.g., some aircraft do not require a flaperon). Also, some aircraft have multiple ailerons. The lateral-control surfaces individually and/or collectively provide in-flight lateral-control (e.g., roll-control and/or yaw-control) for an aircraft implementing the aircraft wing 100 of FIG. 1. As shown in FIG. 1, the inboard spoiler 126 is generally located inboard of the longitudinal axis 106 of the nacelle 104 (e.g., within the inboard portion 108 of the aircraft wing 100), while the outboard spoiler 128, the flaperon 130, and the aileron 132 are generally located outboard of the longitudinal axis 106 of the nacelle 104 (e.g., within the outboard portion 110 of the aircraft wing 100).

The inboard spoiler 126 is movably coupled to the aircraft wing 100, and is located forward of and adjacent to the inboard flap 122 of the aircraft wing 100. The inboard spoiler 126 includes a leading edge 134, a trailing edge 136 located opposite to and/or rearward of the leading edge 134, and an upper surface 138 extending between the leading edge 134 and the trailing edge 136. The inboard spoiler 126 is movable (e.g., rotatable and/or deflectable) relative to the fixed upper surface 116 of the aircraft wing 100 between a neutral (e.g., undeflected) position in which the upper surface 138 of the inboard spoiler 126 is generally aligned with (e.g., is parallel to and/or coplanar with) the fixed upper surface 116 of the aircraft wing 100, and a range of deflected positions in which the upper surface 138 of the inboard spoiler 126 is deflected upward (e.g., about a hinge line located proximate to the leading edge 134 and/or forward of the trailing edge 136 of the inboard spoiler 126) relative to the fixed upper surface 116 of the aircraft wing 100. Movement of the inboard spoiler 126 occurs via one or more actuation mechanism(s) coupled to the inboard spoiler 126 of the aircraft wing 100 and controlled via one or more control system(s) of an aircraft implementing the aircraft wing 100.

The outboard spoiler 128 is movably coupled to the aircraft wing 100, and are located forward of and adjacent to the outboard flap 124 of the aircraft wing 100. The outboard spoiler 128 includes a leading edge 140, a trailing edge 142 located opposite to and/or rearward of the leading edge 140, and an upper surface 144 extending between the leading edge 140 and the trailing edge 142. The outboard spoiler 128 is movable (e.g., rotatable and/or deflectable) relative to the fixed upper surface 116 of the aircraft wing 100 between a neutral (e.g., undeflected) position in which the upper surface 144 of the outboard spoiler 128 is generally aligned with (e.g., is parallel to and/or coplanar with) the fixed upper surface 116 of the aircraft wing 100, and a range of deflected positions in which the upper surface 144 of the outboard spoiler 128 is deflected upward (e.g., about a hinge line located proximate to the leading edge 140 and/or forward of the trailing edge 142 of the outboard spoiler 128) relative to the fixed upper surface 116 of the aircraft wing 100. Movement of the outboard spoiler 128 occurs via one or more actuation mechanism(s) coupled to the outboard spoiler 128 of the aircraft wing 100 and controlled via one or more control system(s) of an aircraft implementing the aircraft wing 100.

The flaperon 130 is movably coupled to the aircraft wing 100, and is located between the inboard flap 122 and the outboard flap 124 of the aircraft wing 100. The flaperon 130 includes a leading edge (not visible in FIG. 1), a trailing edge 146 located opposite to and/or rearward of the leading edge, and an upper surface 148 extending between the leading edge and the trailing edge 146. The flaperon 130 is movable (e.g., rotatable and/or deflectable) relative to the fixed upper surface 116 of the aircraft wing 100 between a neutral (e.g., undeflected) position in which the upper surface 148 of the flaperon 130 is generally aligned with (e.g., is parallel to and/or coplanar with) the fixed upper surface 116 of the aircraft wing 100, and a range of deflected positions in which the upper surface 148 of the flaperon 130 is deflected upward or downward (e.g., about a hinge line located proximate to the leading edge and/or forward of the trailing edge 146 of the flaperon 130) relative to the fixed upper surface 116 of the aircraft wing 100. Movement of the flaperon 130 occurs via one or more actuation mechanism(s) coupled to the flaperon 130 of the aircraft wing 100 and controlled via one or more control system(s) of an aircraft implementing the aircraft wing 100.

The aileron 132 is movably coupled to the aircraft wing 100, and is located outboard of the outboard flap 124 and/or outboard of the outboard spoiler 128 of the aircraft wing. The aileron 132 includes a leading edge (not visible in FIG. 1), a trailing edge 150 located opposite to and/or rearward of the leading edge, and an upper surface 152 extending between the leading edge and the trailing edge 150. The aileron 132 is movable (e.g., rotatable and/or deflectable) relative to the fixed upper surface 116 of the aircraft wing 100 between a neutral (e.g., undeflected) position in which the upper surface 152 of the aileron 132 is generally aligned with (e.g., is parallel to and/or coplanar with) the fixed upper surface 116 of the aircraft wing 100, and a range of deflected positions in which the upper surface 152 of the aileron 132 is deflected upward or downward (e.g., about a hinge line located proximate to the leading edge and/or forward of the trailing edge 150 of the aileron 132) relative to the fixed upper surface 116 of the aircraft wing 100. Movement of the aileron 132 occurs via one or more actuation mechanism(s) coupled to the aileron 132 of the aircraft wing 100 and controlled via one or more control system(s) of an aircraft implementing the aircraft wing 100.

Movements of the lateral-control surfaces (e.g., the inboard spoiler 126, the outboard spoiler 128, the flaperon 130, and/or the aileron 132) of the aircraft wing 100 relative to the fixed upper surface 116 of the aircraft wing 100 of FIG. 1 enable the lateral-control surfaces to individually and/or collectively provide a desired aerodynamic effect associated with controlling the roll and/or the yaw of the aircraft implementing the aircraft wing 100. While the lateral-control surfaces are generally effective for controlling the roll and/or the yaw of the aircraft, one or more of the lateral-control surface(s) can in some instances experience an adverse reversal of its/their intended aerodynamic effect.

For example, at flight conditions with locally transonic flow features on swept wings at high subsonic Mach numbers beyond cruise, strong shock waves can develop causing flow separation ahead of a lateral-control surface (e.g., the inboard spoiler 126, the outboard spoiler 128, the flaperon 130, or the aileron 132) of the aircraft wing 100. When the lateral-control surface is deployed at a small upward deflection (e.g., five degrees (5°) upward), it can change local flow separation and/or reattachment such that an adverse aerodynamic effect of the lateral-control surface occurs. In such an example, the adverse aerodynamic effect can include the formation of a dead-band, or even reversal of the intended aerodynamic effect of the aileron lateral control surface, with opposite roll and/or yaw control response relative to what is achieved at lower Mach numbers.

Figure 2:
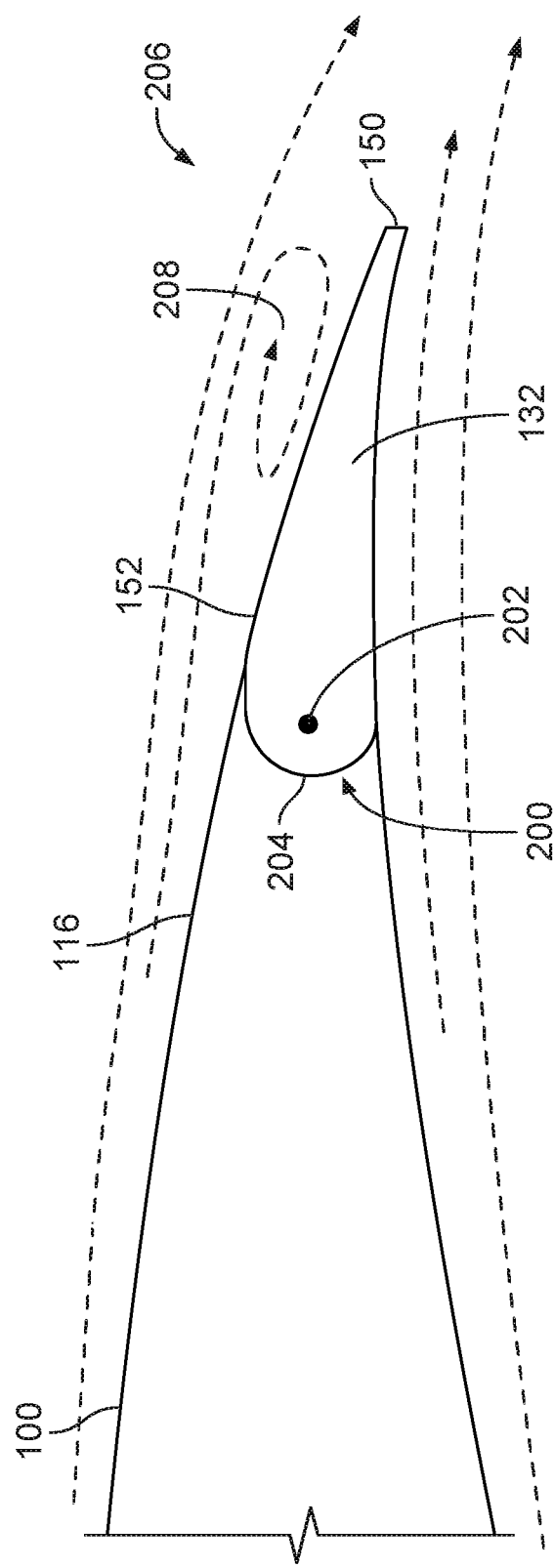
FIG. 2 is a partial cross-sectional view of the aircraft wing of FIG. 1 showing the aileron of FIG. 1 in a neutral (e.g., undeflected) position.
Figure 3:
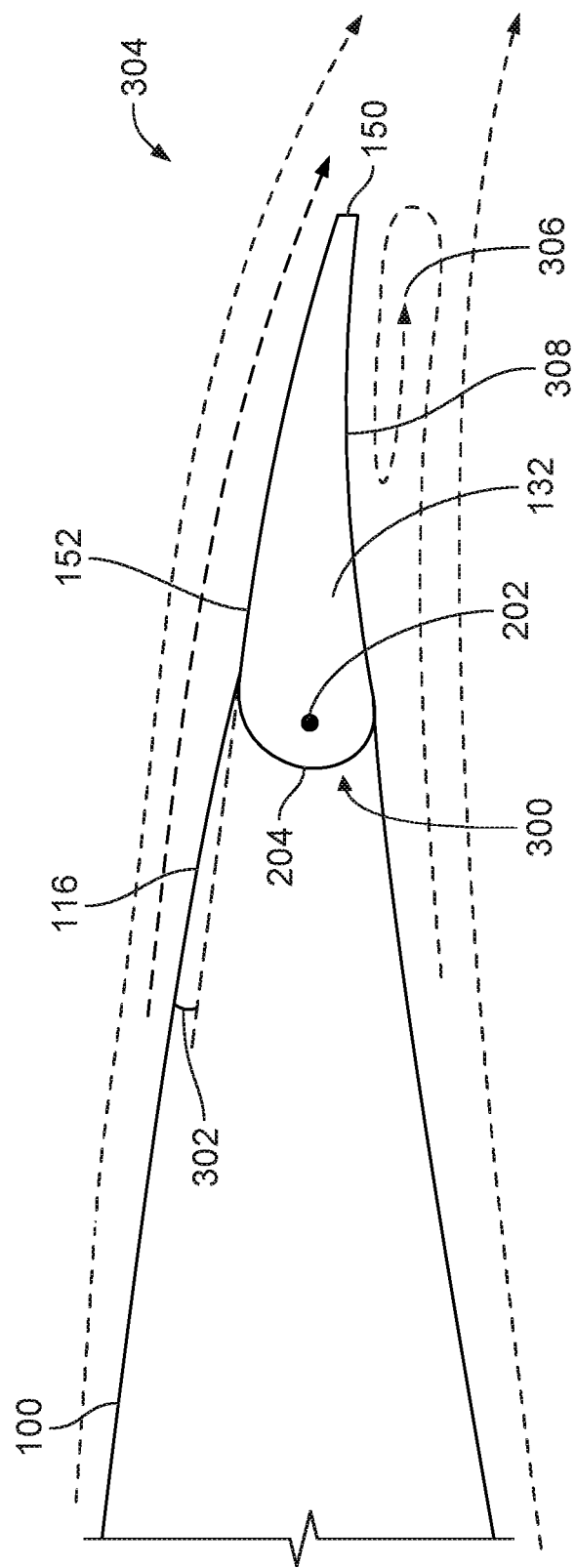
FIG. 3 is a partial cross-sectional view of the aircraft wing of FIGS. 1 and 2 showing the aileron of FIGS. 1 and 2 in a first upward deflected position.
Figure 4:
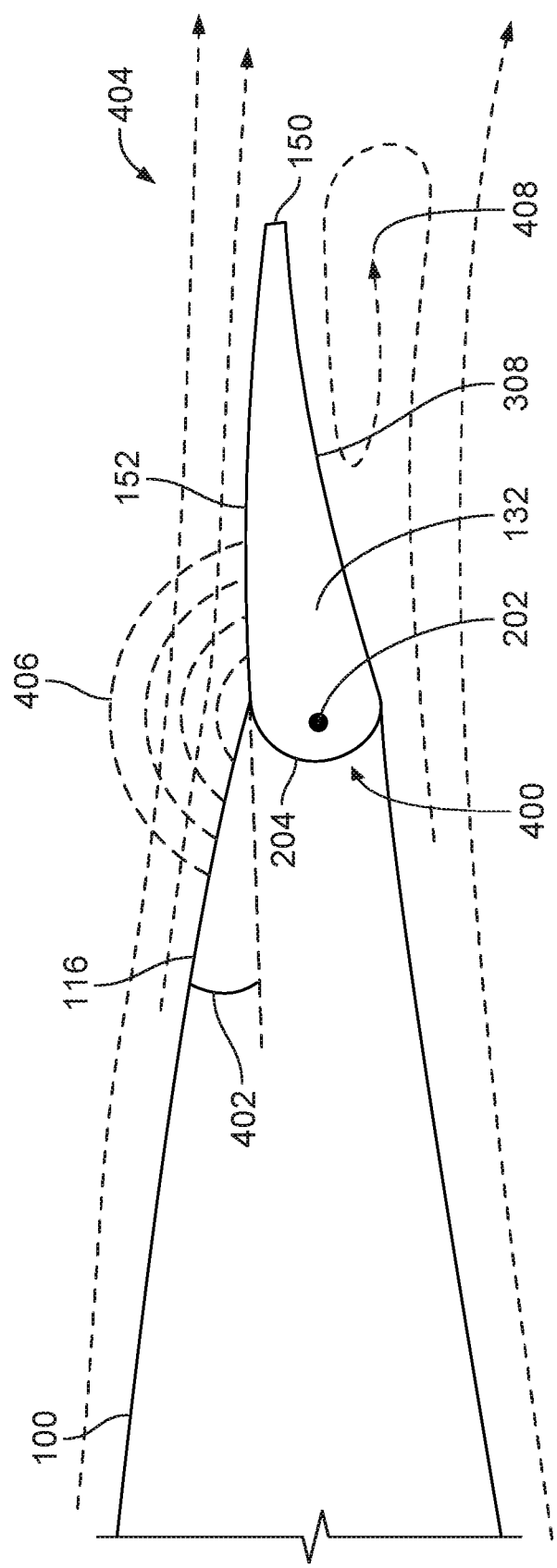
FIG. 4 is a partial cross-sectional view of the aircraft wing of FIGS. 1-3 showing the aileron of FIGS. 1-3 in a second upward deflected position.

As further described below, FIGS. 2-4 illustrate the formation and resolution of an adverse aerodynamic effect in connection with the aileron 132 of the aircraft wing 100. The description of the flow field of the aileron 132 of the aircraft wing 100 of FIG. 1 provided below in connection with FIGS. 2-4 also applies to the flow field of the flaperon 130 of the aircraft wing 100 of FIG. 1.

FIG. 2 is a partial cross-sectional view of the aircraft wing 100 of FIG. 1 showing the aileron 132 of FIG. 1 in a neutral (e.g., undeflected) position 200. The aileron 132 is movably coupled to the aircraft wing 100, and is movable (e.g., rotatable and/or deflectable relative to the neutral position 200) about a hinge line 202 located proximate to the leading edge 204 and/or forward of the trailing edge 150 of the aileron 132. When the aileron 132 is in the neutral position 200, the upper surface 152 of the aileron 132 is generally aligned with (e.g., is parallel to and/or coplanar with) the fixed upper surface 116 of the aircraft wing 100.

FIG. 2 further illustrates a first airflow 206 local to the aileron 132 when an aircraft implementing the aircraft wing 100 is traveling at high Mach number with the aileron 132 in the neutral position 200. The first airflow 206 includes a first flow separation region 208 located along the upper surface 152 of the aileron 132. The first flow separation region 208 of the first airflow 206 of FIG. 2 reduces the lift potential of the aircraft wing 100.

FIG. 3 is a partial cross-sectional view of the aircraft wing 100 of FIGS. 1 and 2 showing the aileron 132 of FIGS. 1 and 2 in a first upward deflected position 300. The aileron 132 can be deflected and/or rotated about the hinge line 202 from the neutral position 200 of FIG. 2 to the first upward deflected position 300 of FIG. 3. When the aileron 132 is in the first upward deflected position 300, the upper surface 152 of the aileron 132 is oriented at a first deflection angle 302 relative to the fixed upper surface 116 of the aircraft wing 100. In the illustrated example of FIG. 3, the first deflection angle 302 is approximately five degrees (5°).

FIG. 3 further illustrates a second airflow 304 local to the aileron 132 when an aircraft implementing the aircraft wing 100 is traveling at high Mach number with the aileron 132 in the first upward deflected position 300. The second airflow 304 of FIG. 3 differs from the first airflow 206 of FIG. 2. More specifically, the first flow separation region 208 included in the first airflow 206 of FIG. 2 is eliminated from and/or is not included in the second airflow 304 of FIG. 3. Furthermore, the second airflow 304 of FIG. 3 includes a second flow separation region 306 located along a lower surface 308 of the aileron 132. While the elimination of the first flow separation region 208 improves the lift potential of the aircraft wing 100, such improvement is offset by the introduction of the second flow separation region 306, which reduces the lift potential of the aircraft wing 100. The net aerodynamic effect is that the aircraft wing 100 experiences an insignificant lift change when the aileron 132 moves from the neutral position 200 of FIG. 2 to the first upward deflected position 300 of FIG. 3, which constitutes an adverse reversal of the intended aerodynamic effect of deflecting the aileron 132 upward.

FIG. 4 is a partial cross-sectional view of the aircraft wing 100 of FIGS. 1-3 showing the aileron 132 of FIGS. 1-3 in a second upward deflected position 400. The aileron 132 can be deflected and/or rotated about the hinge line 202 from the first upward deflected position 300 of FIG. 3 to the second upward deflected position 400 of FIG. 4. When the aileron 132 is in the second upward deflected position 400, the upper surface 152 of the aileron 132 is oriented at a second deflection angle 402 relative to the fixed upper surface 116 of the aircraft wing 100. The second deflection angle 402 associated with the second upward deflected position 400 of FIG. 4 is greater than the first deflection angle 302 associated with the first upward deflected position 300 of FIG. 3. In the illustrated example of FIG. 4, the second deflection angle 402 is approximately fifteen degrees (15°).

FIG. 4 further illustrates a third airflow 404 local to the aileron 132 when an aircraft implementing the aircraft wing 100 is traveling at high Mach number with the aileron 132 in the second upward deflected position 400. The third airflow 404 of FIG. 4 differs from the second airflow 304 of FIG. 3. More specifically, the third airflow 404 of FIG. 4 includes an increased pressure region 406 located along the upper surface 152 of the aileron 132 and/or along the fixed upper surface 116 of the aircraft wing 100 forward of the aileron 132. The third airflow 404 of FIG. 4 further includes a third flow separation region 408 located along the lower surface 308 of the aileron 132 and having a size and/or an area that is increased relative to the size and/or the area of the second flow separation region 306 of the second airflow 304 of FIG. 3. In response to the increased pressure region 406 and the third flow separation region 408 of FIG. 4, the aircraft wing 100 experiences a significant (e.g., measurable) lift reduction, which corresponds to the intended aerodynamic effect of deflecting the aileron 132 upward. Accordingly, the adverse reversal of the intended aerodynamic effect occurring at a small upward deflection of the aileron 132 (e.g., as shown in FIG. 3) is resolved when the aileron 132 is positioned at a larger upward deflection (e.g., as shown in FIG. 4).

Figure 5:
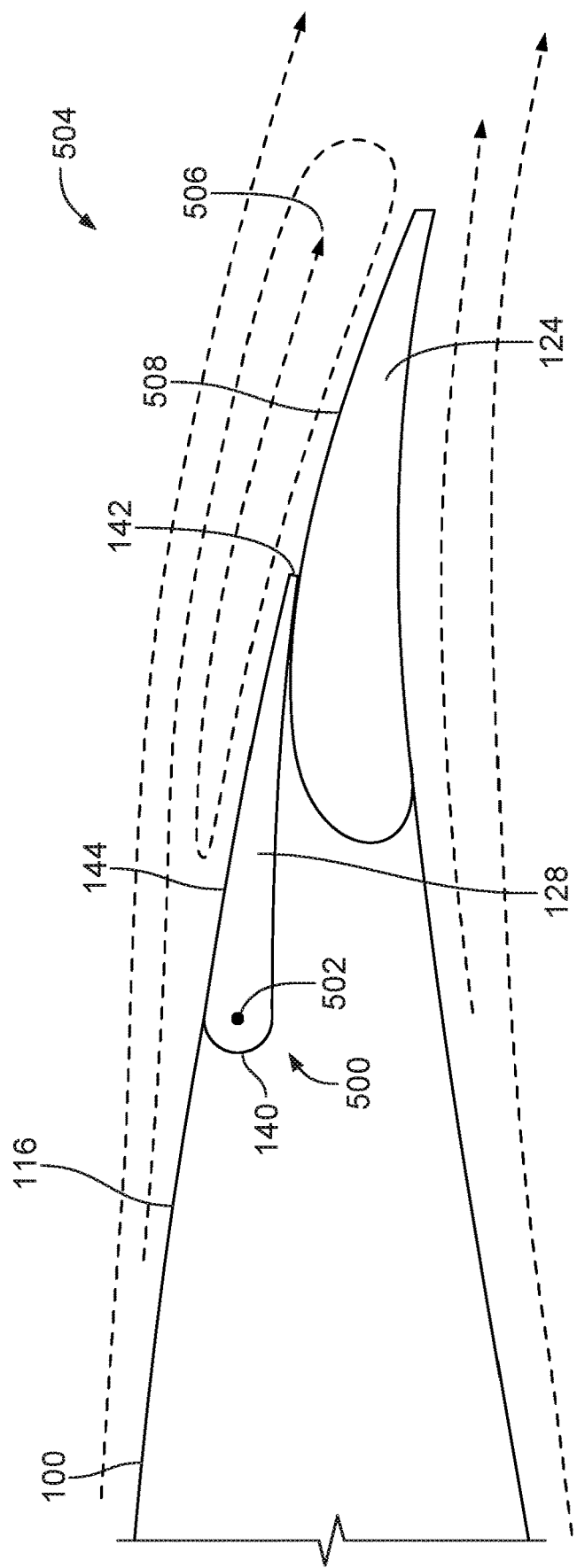
FIG. 5 is a partial cross-sectional view of the aircraft wing of FIG. 1 showing the outboard spoiler of FIG. 1 in a neutral (e.g., undeflected) position.
Figure 6:
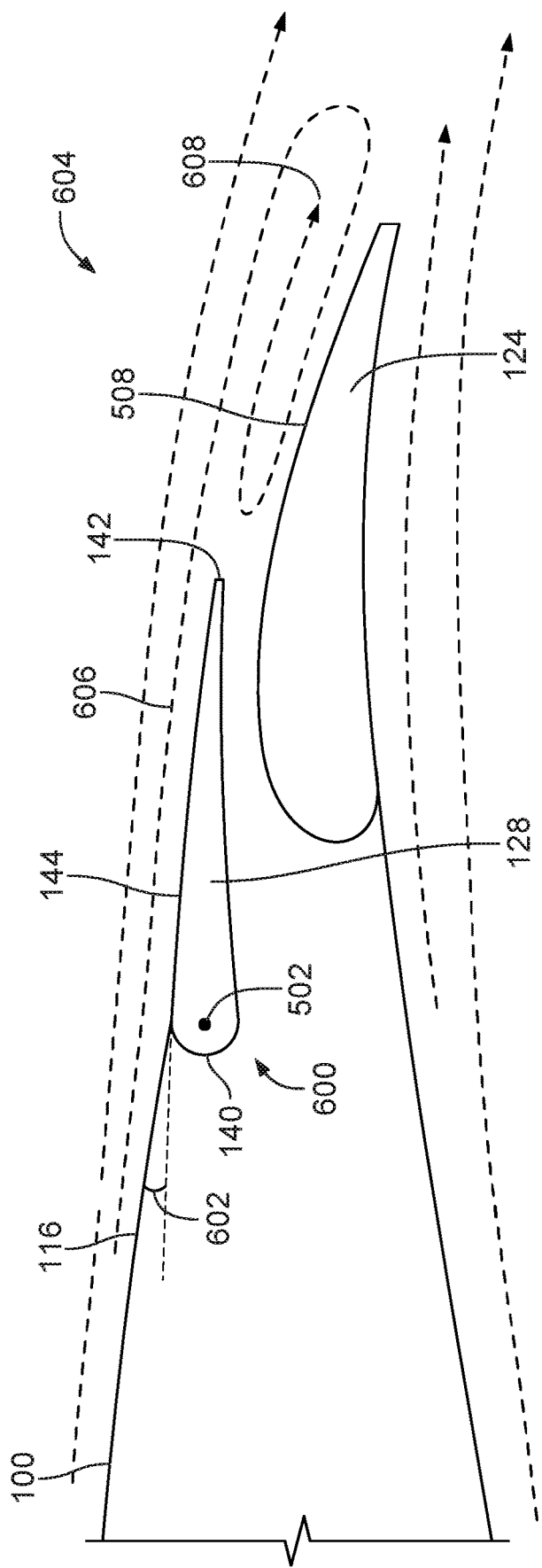
FIG. 6 is a partial cross-sectional view of the aircraft wing of FIGS. 1 and 5 showing the outboard spoiler of FIGS. 1 and 5 in a first upward deflected position.
Figure 7:
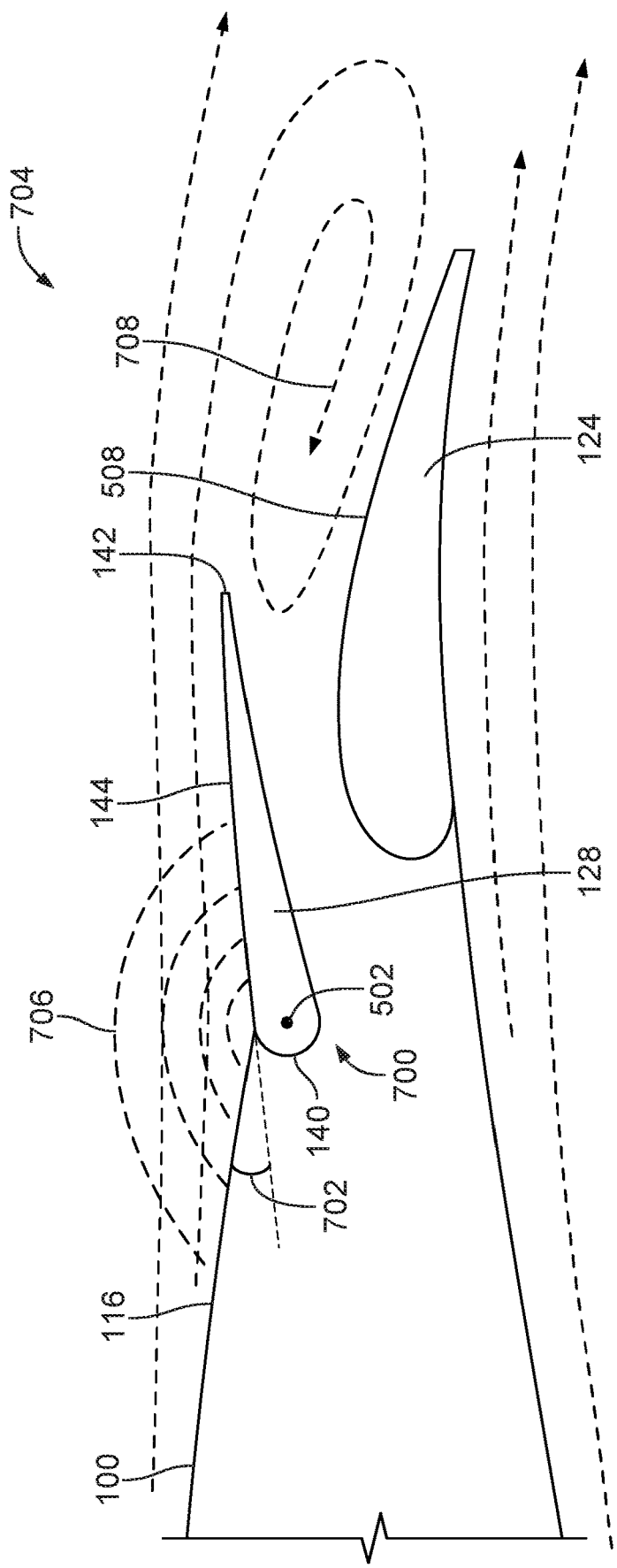
FIG. 7 is a partial cross-sectional view of the aircraft wing of FIGS. 1, 5 and 6 showing the outboard spoiler of FIGS. 1, 5 and 6 in a second upward deflected position.

As further described below, FIGS. 5-7 illustrate the formation and resolution of an adverse aerodynamic effect in connection with the outboard spoiler 128 of the aircraft wing 100. The description of the flow field of the outboard spoiler 128 of the aircraft wing 100 of FIG. 1 provided below in connection with FIGS. 5-7 also applies to the flow field of the inboard spoiler 126 of the aircraft wing 100 of FIG. 1.

FIG. 5 is a partial cross-sectional view of the aircraft wing 100 of FIG. 1 showing the outboard spoiler 128 of FIG. 1 in a neutral (e.g., undeflected) position 500. The outboard spoiler 128 is movably coupled to the aircraft wing 100, and is movable (e.g., rotatable and/or deflectable relative to the neutral position 500) about a hinge line 502 located proximate to the leading edge 140 and/or forward of the trailing edge 142 of the outboard spoiler 128. When the outboard spoiler 128 is in the neutral position 500, the upper surface 144 of the outboard spoiler 128 is generally aligned with (e.g., is parallel to and/or coplanar with) the fixed upper surface 116 of the aircraft wing 100.

FIG. 5 further illustrates a first airflow 504 local to the outboard spoiler 128 when an aircraft implementing the aircraft wing 100 is traveling at high Mach number with the outboard spoiler 128 in the neutral position 500. The first airflow 504 includes a first flow separation region 506 located along the upper surface 144 of the outboard spoiler 128 and along an upper surface 508 of the outboard flap 124. The first flow separation region 506 of the first airflow 504 of FIG. 5 reduces the lift potential of the aircraft wing 100.

FIG. 6 is a partial cross-sectional view of the aircraft wing 100 of FIGS. 1 and 5 showing the outboard spoiler 128 of FIGS. 1 and 5 in a first upward deflected position 600. The outboard spoiler 128 can be deflected and/or rotated about the hinge line 502 from the neutral position 500 of FIG. 5 to the first upward deflected position 600 of FIG. 6. When the outboard spoiler 128 is in the first upward deflected position 600, the upper surface 144 of the outboard spoiler 128 is oriented at a first deflection angle 602 relative to the fixed upper surface 116 of the aircraft wing 100. In the illustrated example of FIG. 6, the first deflection angle 602 is approximately five degrees (5°).

FIG. 6 further illustrates a second airflow 604 local to the outboard spoiler 128 when an aircraft implementing the aircraft wing 100 is traveling at high Mach number with the outboard spoiler 128 in the first upward deflected position 600. The second airflow 604 of FIG. 6 differs from the first airflow 504 of FIG. 5. More specifically, the second airflow 604 of FIG. 6 includes a flow reattachment region 606 located along the upper surface 144 of the outboard spoiler 128, and a second flow separation region 608 located along the upper surface 508 of the outboard flap 124. While the flow reattachment region 606 improves the lift potential of the aircraft wing 100, such improvement is offset by the second flow separation region 608, which reduces the lift potential of the aircraft wing 100. The net aerodynamic effect is that the aircraft wing 100 experiences an insignificant lift change when the outboard spoiler 128 moves from the neutral position 500 of FIG. 5 to the first upward deflected position 600 of FIG. 6, which constitutes an adverse reversal of the intended aerodynamic effect of deflecting the outboard spoiler 128 upward.

FIG. 7 is a partial cross-sectional view of the aircraft wing 100 of FIGS. 1, 5 and 6 showing the outboard spoiler 128 of FIGS. 1, 5 and 6 in a second upward deflected position 700. The outboard spoiler 128 can be deflected and/or rotated about the hinge line 502 from the first upward deflected position 600 of FIG. 6 to the second upward deflected position 700 of FIG. 7. When the outboard spoiler 128 is in the second upward deflected position 700, the upper surface 144 of the outboard spoiler 128 is oriented at a second deflection angle 702 relative to the fixed upper surface 116 of the aircraft wing 100. The second deflection angle 702 associated with the second upward deflected position 700 of FIG. 7 is greater than the first deflection angle 602 associated with the first upward deflected position 600 of FIG. 6. In the illustrated example of FIG. 7, the second deflection angle 702 is approximately fifteen degrees (15°).

FIG. 7 further illustrates a third airflow 704 local to the outboard spoiler 128 when an aircraft implementing the aircraft wing 100 is traveling at high Mach number with the outboard spoiler 128 in the second upward deflected position 700. The third airflow 704 of FIG. 7 differs from the second airflow 604 of FIG. 6. More specifically, the third airflow 704 of FIG. 7 includes an increased pressure region 706 located along the upper surface 144 of the outboard spoiler 128 and/or along the fixed upper surface 116 of the aircraft wing 100 forward of the outboard spoiler 128. The third airflow 704 of FIG. 7 further includes a third flow separation region 708 located along the upper surface 508 of the outboard flap 124 and having a size and/or an area that is increased relative to the size and/or the area of the second flow separation region 608 of the second airflow 604 of FIG. 6. In response to the increased pressure region 706 and the third flow separation region 708 of FIG. 7, the aircraft wing 100 experiences a significant (e.g., measurable) lift reduction, which corresponds to the intended aerodynamic effect of deflecting the outboard spoiler 128 upward. Accordingly, the adverse reversal of the intended aerodynamic effect occurring at a small upward deflection of the outboard spoiler 128 (e.g., as shown in FIG. 6) is resolved when the outboard spoiler 128 is positioned at a larger upward deflection (e.g., as shown in FIG. 7).

While existing solutions can reduce or eliminate the potential dead band associated with the effectiveness of the lateral-control surfaces of an aircraft, such solutions have disadvantages, shortcomings, and/or negative consequences that generally render such solutions undesirable and/or unsuitable to implement. For example, a first solution to minimize or eliminate adverse reversal of an intended lateral-control surface effect includes thickening the trailing edge of the lateral-control surface to modify shock-wave locations with lateral-control surface deflection. This first solution, however, carries the negative consequence of generating adverse aerodynamic drag. As another example, a second solution to minimize or eliminate reversal of an intended lateral-control surface effect includes changing the contour of the wing to drastically alter shock position and/or strength at high Mach numbers. This second solution, however, carries the negative consequence of having a sub-optimized shape for cruise, along with a relatively large cruise fuel-burn penalty. As another example, a third solution to minimize or eliminate reversal of an intended lateral-control surface effect includes changing the location and/or the orientation of the hinge line of the lateral-control surface relative to the fixed trailing edge of the wing. This third solution, however, carries the negative consequence of requiring significant system integration modification, and/or generating significant weight penalties.

Unlike the known aircraft wing 100 of FIGS. 1-7 described above, example aircraft wings disclosed herein include example mini-spoilers that are configured to enhance the effectiveness of example lateral-control surfaces of the aircraft wing. Example mini-spoilers for enhancing the effectiveness of lateral-control surfaces of aircraft wings are disclosed herein. In some disclosed examples, a lateral-control surface is movably coupled to the aircraft wing, and a mini-spoiler is located on or forward of the lateral-control surface. The mini-spoiler is movable between a retracted position and a deployed position relative to the aircraft wing and/or relative to the lateral-control surface, and is configured to be moved from the retracted position to the deployed position based on the lateral-control surface being positioned at a small upward deflection (e.g., five degrees (5°) upward) relative to a neutral (e.g., undeflected) position of the lateral-control surface). Moving the mini-spoiler from the retracted position to the deployed position while the lateral-control surface is positioned at small upward deflections advantageously prevents flow reattachment on the lateral-control surface. At high transonic Mach numbers, this favorable flow-field change induced by the deployment of the mini-spoiler can minimize or completely eliminate adverse reduction or reversal of an intended lateral-control control surface effect when the lateral-control surface is positioned at small upward deflections.

In some disclosed examples, the lateral-control surface is actuated via a first actuator configured to move the lateral-control surface, and the mini-spoiler is separately and/or independently actuated via a second actuator configured to move the mini-spoiler. In other disclosed examples, the lateral-control surface is actuated via an actuator configured to move the lateral-control surface, and the mini-spoiler is mechanically slaved (e.g., via any type and/or any number of engaged mechanical couplings, including gears, clutches, rods, pistons, shafts, links, pulleys, chains, belts, hinges, pins, biasing elements, fasteners, etc.) to the lateral control surface and/or to the actuator that is configured to move the lateral-control surface, such that the movements and/or positions of the mini-spoiler are mechanically dependent upon the movements and/or positions of the lateral-control surface. As used herein, the term "mechanically slaved" means that a first object is driven in a mechanically-dependent manner by a second object to which the first object is mechanically coupled and/or mechanically linked. For example, reference to a mini-spoiler that is mechanically slaved to an actuator-driven lateral-control device means that the mini-spoiler is driven in a mechanically-dependent manner by the lateral-control device and/or by the actuator of the lateral-control device to which the mini-spoiler is mechanically coupled and/or mechanically linked.

Figure 8:
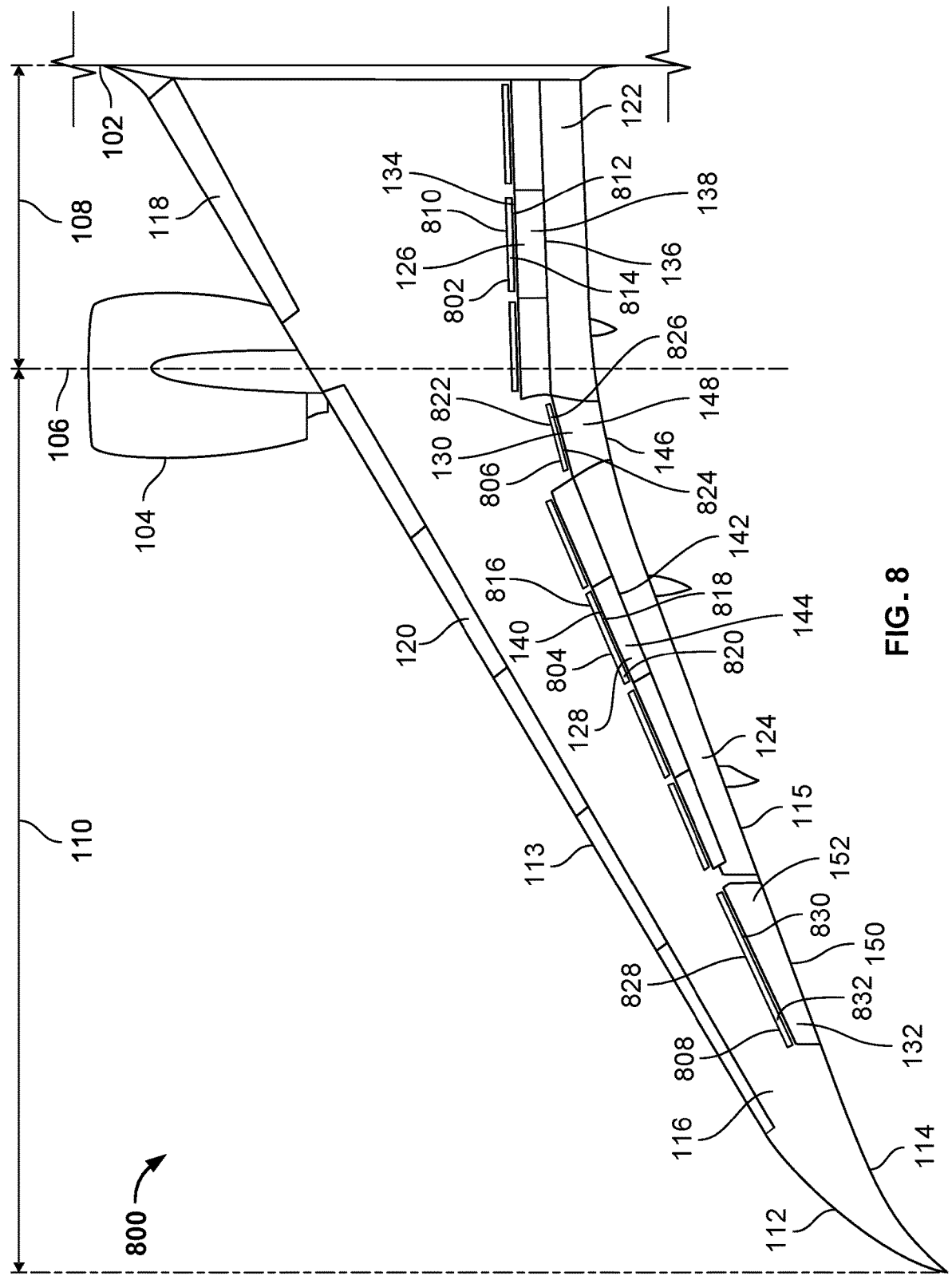
FIG. 8 is a plan view of an example aircraft wing including example mini-spoilers constructed in accordance with the teachings of this disclosure.

FIG. 8 is a plan view of an example aircraft wing 800 including example mini-spoilers constructed in accordance with the teachings of this disclosure. In the illustrated example of FIG. 8, the aircraft wing 800 of FIG. 8 includes the fuselage 102, the nacelle 104 (including the longitudinal axis 106), the inboard portion 108, the outboard portion 110, the fixed leading edge 112, the leading edge 113, the fixed trailing edge 114, the trailing edge 115, the fixed upper surface 116, the lift-control surfaces (including the inboard slat 118, the outboard slats 120, the inboard flap 122, and the outboard flap 124), and the lateral-control surface (including the inboard spoiler 126, the outboard spoiler 128, the flaperon 130, and the aileron 132) of the aircraft wing 100 of FIGS. 1-7 described above. In other examples, the aircraft wing 800 of FIG. 8 can alternatively include additional lift-control surfaces and/or additional lateral-control surfaces relative to those described above in connection with FIGS. 1-7. In still other examples, the aircraft wing 800 of FIG. 8 can alternatively include fewer lift-control surfaces and/or fewer lateral-control surfaces relative to those described above in connection with FIGS. 1-7.

In the illustrated example of FIG. 8, the mini-spoilers of the aircraft wing 800 include a first example mini-spoiler 802 associated with the inboard spoiler 126 of the aircraft wing 800, a second example mini-spoiler 804 associated with the outboard spoiler 128 of the aircraft wing 800, a third example mini-spoiler 806 associated with the flaperon 130 of the aircraft wing 800, and a fourth example mini-spoiler 808 associated with the aileron 132 of the aircraft wing 800. Thus, as shown in FIG. 8, each of the lateral-control surfaces of the aircraft wing 800 of FIG. 8 is associated with a corresponding one of the mini-spoilers of the aircraft wing 800. In other examples, the ratio of lateral-control surfaces to mini-spoilers can differ from the one-to-one ratio shown in FIG. 8. For example, the aircraft wing 800 of FIG. 8 can alternatively include fewer mini-spoilers than lateral-control surfaces, with a single one of the mini-spoilers being associated with (e.g., spanning across and/or along) multiple ones of the lateral-control surfaces. As another example, the aircraft wing 800 of FIG. 8 can alternatively include fewer mini-spoilers than lateral-control surfaces, with one or more of the lateral-control surfaces being without an associated mini-spoiler.

In the illustrated example of FIG. 8, the first mini-spoiler 802 is movably coupled to the aircraft wing 800, and is located forward of and adjacent to the inboard spoiler 126 of the aircraft wing 800 along the fixed upper surface 116 of the aircraft wing 800. The first mini-spoiler 802 includes an example leading edge 810, an example trailing edge 812 located opposite to and/or rearward of the leading edge 810, and an example upper surface 814 extending between the leading edge 810 and the trailing edge 812. The first mini-spoiler 802 is movable (e.g., rotatable and/or deflectable) relative to the fixed upper surface 116 of the aircraft wing 800 between a retracted position in which the upper surface 814 of the first mini-spoiler 802 is generally aligned with (e.g., is parallel to and/or coplanar with) the fixed upper surface 116 of the aircraft wing 800, and a deployed position in which the upper surface 814 of the first mini-spoiler 802 is deflected upward (e.g., about a hinge line located proximate to the leading edge 810 and/or forward of the trailing edge 812 of the first mini-spoiler 802) relative to the fixed upper surface 116 of the aircraft wing 800.

The first mini-spoiler 802 is configured (e.g., sized and/or shaped) such that a chordwise dimension (e.g., in a fore-aft direction substantially parallel to the longitudinal axis 106) of the upper surface 814 of the first mini-spoiler 802 measured when the first mini-spoiler 802 is in its retracted position is substantially smaller than a chordwise dimension of the upper surface 138 of the inboard spoiler 126 measured when the inboard spoiler 126 is in its neutral (e.g., undeflected) position. In some examples, the measured chordwise dimension of the upper surface 814 of the first mini-spoiler 802 of FIG. 8 is between approximately five percent (5%) and approximately sixty percent (60%) of the measured chordwise dimension of the upper surface 138 of the inboard spoiler 126. In some examples, the measured chordwise dimension of the upper surface 814 of the first mini-spoiler 802 of FIG. 8 is between approximately one percent (1%) and approximately five percent (5%) of a local wing chord measured from the leading edge 113 of the aircraft wing 800 to the trailing edge 115 of the aircraft wing 800 at a location local to (e.g., adjacent to and/or overlapping) the first mini-spoiler 802, and with any local leading edge device(s) (e.g., the inboard slat 118) and/or local trailing edge device(s) (e.g., the inboard flap 122) positioned in its/their respective stowed and/or neutral position(s).

In the illustrated example of FIG. 8, the first mini-spoiler 802 has a substantially planar shape that extends along the fixed upper surface 116 of the aircraft wing 800 in a lateral and/or spanwise direction. As shown in FIG. 8, the spanwise extent of the first mini-spoiler 802 is approximately equal to the spanwise extent of the leading edge 134 of the inboard spoiler 126. In other examples, the spanwise extent of the first mini-spoiler 802 can be substantially less than the spanwise extent of the leading edge 134 of the inboard spoiler 126.

In some examples, movement of the first mini-spoiler 802 occurs via one or more actuation mechanism(s) coupled to the first mini-spoiler 802 of the aircraft wing 800, and controlled via one or more control system(s) of an aircraft implementing the aircraft wing 800. In such examples, the actuation mechanism(s) coupled to the first mini-spoiler 802 can be controlled (e.g., via one or more signal(s), command(s), and/or instruction(s) generated by a dedicated controller) based on movements and/or the positions of the inboard spoiler 126. For example, the first mini-spoiler 802 can be configured and/or controlled (A) to move toward and/or be positioned in its retracted position when the inboard spoiler 126 is moved toward and/or positioned in its neutral (e.g., undeflected) position, (B) to move toward and/or be positioned in its deployed position when the inboard spoiler 126 is moved toward and/or positioned in a first upward deflected position, and (C) to move toward and/or be positioned in its retracted position when the inboard spoiler 126 is moved toward and/or positioned in a second upward deflected position extending beyond the first upward deflected position. The first mini-spoiler 802 can alternatively be configured and/or controlled to remain in its deployed position when the inboard spoiler 126 is moved toward and/or positioned in the second upward deflected position.

In other examples, the first mini-spoiler 802 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the inboard spoiler 126 such that movement and/or the position of the first mini-spoiler 802 is mechanically dependent upon movement and/or the position of the inboard spoiler 126. For example, the first mini-spoiler 802 can be mechanically slaved (A) to move toward and/or be positioned in its retracted position when the inboard spoiler 126 is moved toward and/or positioned in its neutral (e.g., undeflected) position, (B) to move toward and/or be positioned in its deployed position when the inboard spoiler 126 is moved toward and/or positioned in a first upward deflected position, and (C) to move toward and/or be positioned in its retracted position when the inboard spoiler 126 is moved toward and/or positioned in a second upward deflected position extending beyond the first upward deflected position. The first mini-spoiler 802 can alternatively be mechanically slaved to remain in its deployed position when the inboard spoiler 126 is moved toward and/or positioned in the second upward deflected position.

In the illustrated example of FIG. 8, the second mini-spoiler 804 is movably coupled to the aircraft wing 800, and is located forward of and adjacent to the outboard spoiler 128 of the aircraft wing 800 along the fixed upper surface 116 of the aircraft wing 800. The second mini-spoiler 804 includes an example leading edge 816, an example trailing edge 818 located opposite to and/or rearward of the leading edge 816, and an example upper surface 820 extending between the leading edge 816 and the trailing edge 818. The second mini-spoiler 804 is movable (e.g., rotatable and/or deflectable) relative to the fixed upper surface 116 of the aircraft wing 800 between a retracted position in which the upper surface 820 of the second mini-spoiler 804 is generally aligned with (e.g., is parallel to and/or coplanar with) the fixed upper surface 116 of the aircraft wing 800, and a deployed position in which the upper surface 820 of the second mini-spoiler 804 is deflected upward (e.g., about a hinge line located proximate to the leading edge 816 and/or forward of the trailing edge 818 of the second mini-spoiler 804) relative to the fixed upper surface 116 of the aircraft wing 800.

The second mini-spoiler 804 is configured (e.g., sized and/or shaped) such that a chordwise dimension (e.g., in a fore-aft direction substantially parallel to the longitudinal axis 106) of the upper surface 820 of the second mini-spoiler 804 measured when the second mini-spoiler 804 is in its retracted position is substantially smaller than a chordwise dimension of the upper surface 144 of the outboard spoiler 128 measured when the outboard spoiler 128 is in its neutral (e.g., undeflected) position. In some examples, the measured chordwise dimension of the upper surface 820 of the second mini-spoiler 804 of FIG. 8 is between approximately five percent (5%) and approximately sixty percent (60%) of the measured chordwise dimension of the upper surface 144 of the outboard spoiler 128. In some examples, the measured chordwise dimension of the upper surface 820 of the second mini-spoiler 804 of FIG. 8 is between approximately one percent (1%) and approximately five percent (5%) of a local wing chord measured from the leading edge 113 of the aircraft wing 800 to the trailing edge 115 of the aircraft wing 800 at a location local to (e.g., adjacent to and/or overlapping) the second mini-spoiler 804, and with any local leading edge device(s) (e.g., the outboard slat(s) 120) and/or local trailing edge device(s) (e.g., the outboard flap 124) positioned in its/their respective stowed and/or neutral position(s).

In the illustrated example of FIG. 8, the second mini-spoiler 804 has a substantially planar shape that extends along the fixed upper surface 116 of the aircraft wing 800 in a lateral and/or spanwise direction. As shown in FIG. 8, the spanwise extent of the second mini-spoiler 804 is approximately equal to the spanwise extent of the leading edge 140 of the outboard spoiler 128. In other examples, the spanwise extent of the second mini-spoiler 804 can be substantially less than the spanwise extent of the leading edge 140 of the outboard spoiler 128.

In some examples, movement of the second mini-spoiler 804 occurs via one or more actuation mechanism(s) coupled to the second mini-spoiler 804 of the aircraft wing 800, and controlled via one or more control system(s) of an aircraft implementing the aircraft wing 800. In such examples, the actuation mechanism(s) coupled to the second mini-spoiler 804 can be controlled (e.g., via one or more signal(s), command(s), and/or instruction(s) generated by a dedicated controller) based on movement and/or the position of the outboard spoiler 128. For example, the second mini-spoiler 804 can be configured and/or controlled (A) to move toward and/or be positioned in its retracted position when the outboard spoiler 128 is moved toward and/or positioned in its neutral (e.g., undeflected) position, (B) to move toward and/or be positioned in its deployed position when the outboard spoiler 128 is moved toward and/or positioned in a first upward deflected position, and (C) to move toward and/or be positioned in its retracted position when the outboard spoiler 128 is moved toward and/or positioned in a second upward deflected position extending beyond the first upward deflected position. The second mini-spoiler 804 can alternatively be configured and/or controlled to remain in its deployed position when the outboard spoiler 128 is moved toward and/or positioned in the second upward deflected position.

In other examples, the second mini-spoiler 804 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the outboard spoiler 128 such that movement and/or the position of the second mini-spoiler 804 is mechanically dependent upon movement and/or the position of the outboard spoiler 128. For example, the second mini-spoiler 804 can be mechanically slaved (A) to move toward and/or be positioned in its retracted position when the outboard spoiler 128 is moved toward and/or positioned in its neutral (e.g., undeflected) position, (B) to move toward and/or be positioned in its deployed position when the outboard spoiler 128 is moved toward and/or positioned in a first upward deflected position, and (C) to move toward and/or be positioned in its retracted position when the outboard spoiler 128 is moved toward and/or positioned in a second upward deflected position extending beyond the first upward deflected position. The second mini-spoiler 804 can alternatively be mechanically slaved to remain in its deployed position when the outboard spoiler 128 is moved toward and/or positioned in the second upward deflected position.

In the illustrated example of FIG. 8, the third mini-spoiler 806 is movably coupled to the aircraft wing 800, and is located forward of and adjacent to the flaperon 130 of the aircraft wing 800 along the fixed upper surface 116 of the aircraft wing 800. The third mini-spoiler 806 includes an example leading edge 822, an example trailing edge 824 located opposite to and/or rearward of the leading edge 822, and an example upper surface 826 extending between the leading edge 822 and the trailing edge 824. The third mini-spoiler 806 is movable (e.g., rotatable and/or deflectable) relative to the fixed upper surface 116 of the aircraft wing 800 between a retracted position in which the upper surface 826 of the third mini-spoiler 806 is generally aligned with (e.g., is parallel to and/or coplanar with) the fixed upper surface 116 of the aircraft wing 800, and a deployed position in which the upper surface 826 of the third mini-spoiler 806 is deflected upward (e.g., about a hinge line located proximate to the leading edge 822 and/or forward of the trailing edge 824 of the third mini-spoiler 806) relative to the fixed upper surface 116 of the aircraft wing 800.

The third mini-spoiler 806 is configured (e.g., sized and/or shaped) such that a chordwise dimension (e.g., in a fore-aft direction substantially parallel to the longitudinal axis 106) of the upper surface 826 of the third mini-spoiler 806 measured when the third mini-spoiler 806 is in its retracted position is substantially smaller than a chordwise dimension of the upper surface 148 of the flaperon 130 measured when the flaperon 130 is in its neutral (e.g., undeflected) position. In some examples, the measured chordwise dimension of the upper surface 826 of the third mini-spoiler 806 of FIG. 8 is between approximately five percent (5%) and approximately sixty percent (60%) of the measured chordwise dimension of the upper surface 148 of the flaperon 130. In some examples, the measured chordwise dimension of the upper surface 826 of the third mini-spoiler 806 of FIG. 8 is between approximately one percent (1%) and approximately five percent (5%) of a local wing chord measured from the leading edge 113 of the aircraft wing 800 to the trailing edge 115 of the aircraft wing 800 at a location local to (e.g., adjacent to and/or overlapping) the third mini-spoiler 806, and with any local leading edge device(s) (e.g., the outboard slat(s) 120) and/or local trailing edge device(s) (e.g., the flaperon 130) positioned in its/their respective stowed and/or neutral position(s).

In the illustrated example of FIG. 8, the third mini-spoiler 806 has a substantially planar shape that extends along the fixed upper surface 116 of the aircraft wing 800 in a lateral and/or spanwise direction. As shown in FIG. 8, the spanwise extent of the third mini-spoiler 806 is approximately equal to the spanwise extent of the leading edge of the flaperon 130. In other examples, the spanwise extent of the third mini-spoiler 806 can be substantially less than the spanwise extent of the leading edge of the flaperon 130.

In some examples, movement of the third mini-spoiler 806 occurs via one or more actuation mechanism(s) coupled to the third mini-spoiler 806 of the aircraft wing 800, and controlled via one or more control system(s) of an aircraft implementing the aircraft wing 800. In such examples, the actuation mechanism(s) coupled to the third mini-spoiler 806 can be controlled (e.g., via one or more signal(s), command(s), and/or instruction(s) generated by a dedicated controller) based on movement and/or the position of the flaperon 130. For example, the third mini-spoiler 806 can be configured and/or controlled (A) to move toward and/or be positioned in its retracted position when the flaperon 130 is moved toward and/or positioned in its neutral (e.g., undeflected) position, (B) to move toward and/or be positioned in its deployed position when the flaperon 130 is moved toward and/or positioned in a first upward deflected position, and (C) to move toward and/or be positioned in its retracted position when the flaperon 130 is moved toward and/or positioned in a second upward deflected position extending beyond the first upward deflected position. The third mini-spoiler 806 can alternatively be configured and/or controlled to remain in its deployed position when the flaperon 130 is moved toward and/or positioned in the second upward deflected position.

In other examples, the third mini-spoiler 806 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the flaperon 130 such that movement and/or the position of the third mini-spoiler 806 is mechanically dependent upon movement and/or the position of the flaperon 130. For example, the third mini-spoiler 806 can be mechanically slaved (A) to move toward and/or be positioned in its retracted position when the flaperon 130 is moved toward and/or positioned in its neutral (e.g., undeflected) position, (B) to move toward and/or be positioned in its deployed position when the flaperon 130 is moved toward and/or positioned in a first upward deflected position, and (C) to move toward and/or be positioned in its retracted position when the flaperon 130 is moved toward and/or positioned in a second upward deflected position extending beyond the first upward deflected position. The third mini-spoiler 806 can alternatively be mechanically slaved to remain in its deployed position when the flaperon 130 is moved toward and/or positioned in the second upward deflected position.

In the illustrated example of FIG. 8, the fourth mini-spoiler 808 is movably coupled to the aircraft wing 800, and is located forward of and adjacent to the aileron 132 of the aircraft wing 800 along the fixed upper surface 116 of the aircraft wing 800. The fourth mini-spoiler 808 includes an example leading edge 828, an example trailing edge 830 located opposite to and/or rearward of the leading edge 828, and an example upper surface 832 extending between the leading edge 828 and the trailing edge 830. The fourth mini-spoiler 808 is movable (e.g., rotatable and/or deflectable) relative to the fixed upper surface 116 of the aircraft wing 800 between a retracted position in which the upper surface 832 of the fourth mini-spoiler 808 is generally aligned with (e.g., is parallel to and/or coplanar with) the fixed upper surface 116 of the aircraft wing 800, and a deployed position in which the upper surface 832 of the fourth mini-spoiler 808 is deflected upward (e.g., about a hinge line located proximate to the leading edge 828 and/or forward of the trailing edge 830 of the fourth mini-spoiler 808) relative to the fixed upper surface 116 of the aircraft wing 800.

The fourth mini-spoiler 808 is configured (e.g., sized and/or shaped) such that a chordwise dimension (e.g., in a fore-aft direction substantially parallel to the longitudinal axis 106) of the upper surface 832 of the fourth mini-spoiler 808 measured when the fourth mini-spoiler 808 is in its retracted position is substantially smaller than a chordwise dimension of the upper surface 152 of the aileron 132 measured when the aileron 132 is in its neutral (e.g., undeflected) position. In some examples, the measured chordwise dimension of the upper surface 832 of the fourth mini-spoiler 808 of FIG. 8 is between approximately five percent (5%) and approximately sixty percent (60%) of the measured chordwise dimension of the upper surface 152 of the aileron 132. In some examples, the measured chordwise dimension of the upper surface 832 of the fourth mini-spoiler 808 of FIG. 8 is between approximately one percent (1%) and approximately five percent (5%) of a local wing chord measured from the leading edge 113 of the aircraft wing 800 to the trailing edge 115 of the aircraft wing 800 at a location local to (e.g., adjacent to and/or overlapping) the fourth mini-spoiler 808, and with any local leading edge device(s) (e.g., the outboard slat(s) 120) and/or local trailing edge device(s) (e.g., the aileron 132) positioned in its/their respective stowed and/or neutral position(s).

In the illustrated example of FIG. 8, the fourth mini-spoiler 808 has a substantially planar shape that extends along the fixed upper surface 116 of the aircraft wing 800 in a lateral and/or spanwise direction. As shown in FIG. 8, the spanwise extent of the fourth mini-spoiler 808 is approximately equal to the spanwise extent of the leading edge of the aileron 132. In other examples, the spanwise extent of the fourth mini-spoiler 808 can be substantially less than the spanwise extent of the leading edge of the aileron 132.

In some examples, movement of the fourth mini-spoiler 808 occurs via one or more actuation mechanism(s) coupled to the fourth mini-spoiler 808 of the aircraft wing 800, and controlled via one or more control system(s) of an aircraft implementing the aircraft wing 800. In such examples, the actuation mechanism(s) coupled to the fourth mini-spoiler 808 can be controlled (e.g., via one or more signal(s), command(s), and/or instruction(s) generated by a dedicated controller) based on movement and/or the position of the aileron 132. For example, the fourth mini-spoiler 808 can be configured and/or controlled (A) to move toward and/or be positioned in its retracted position when the aileron 132 is moved toward and/or positioned in its neutral (e.g., undeflected) position, (B) to move toward and/or be positioned in its deployed position when the aileron 132 is moved toward and/or positioned in a first upward deflected position, and (C) to move toward and/or be positioned in its retracted position when the aileron 132 is moved toward and/or positioned in a second upward deflected position extending beyond the first upward deflected position. The fourth mini-spoiler 808 can alternatively be configured and/or controlled to remain in its deployed position when the aileron 132 is moved toward and/or positioned in the second upward deflected position.

In other examples, the fourth mini-spoiler 808 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the aileron 132 such that movement and/or the position of the fourth mini-spoiler 808 is mechanically dependent upon movement and/or the position of the aileron 132. For example, the fourth mini-spoiler 808 can be mechanically slaved (A) to move toward and/or be positioned in its retracted position when the aileron 132 is moved toward and/or positioned in its neutral (e.g., undeflected) position, (B) to move toward and/or be positioned in its deployed position when the aileron 132 is moved toward and/or positioned in a first upward deflected position, and (C) to move toward and/or be positioned in its retracted position when the aileron 132 is moved toward and/or positioned in a second upward deflected position extending beyond the first upward deflected position. The fourth mini-spoiler 808 can alternatively be mechanically slaved to remain in its deployed position when the aileron 132 is moved toward and/or positioned in the second upward deflected position.

Figure 9:
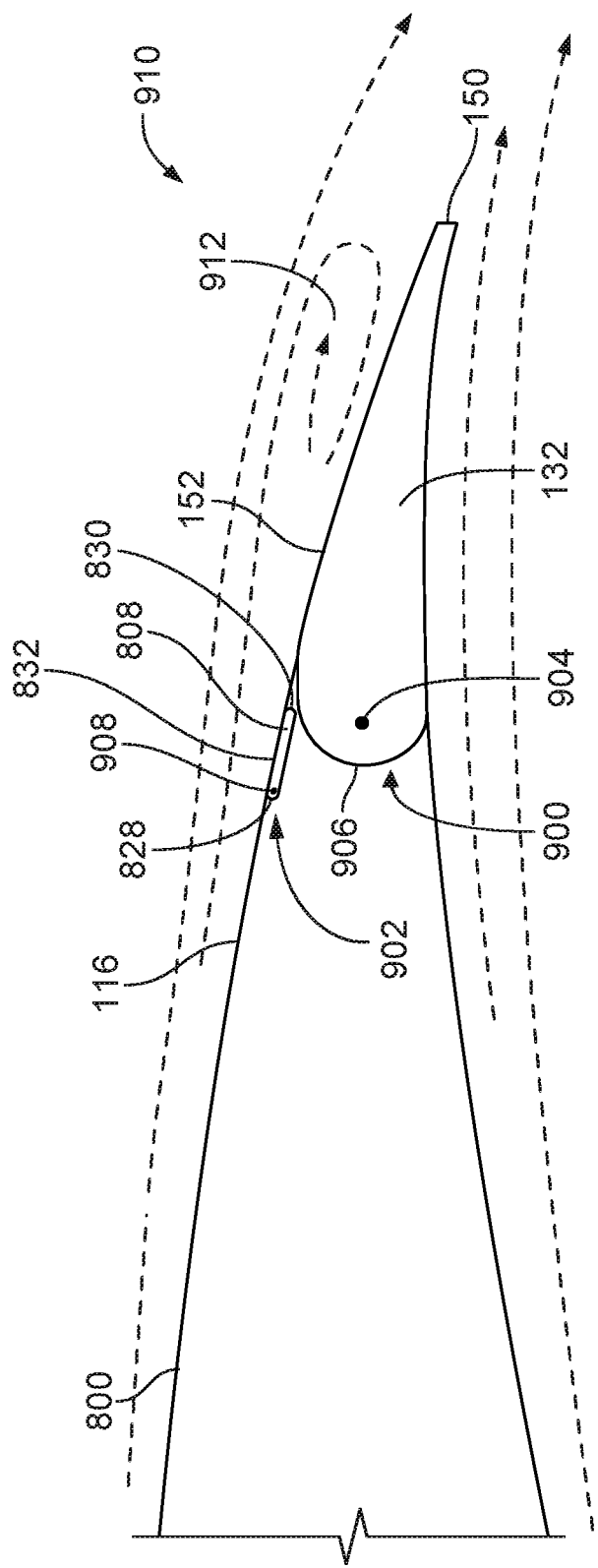
FIG. 9 is a partial cross-sectional view of the aircraft wing of FIG. 8 showing the aileron of FIG. 8 in an example neutral (e.g., undeflected) position, and showing the fourth mini-spoiler of FIG. 8 in an example retracted position.
Figure 10:
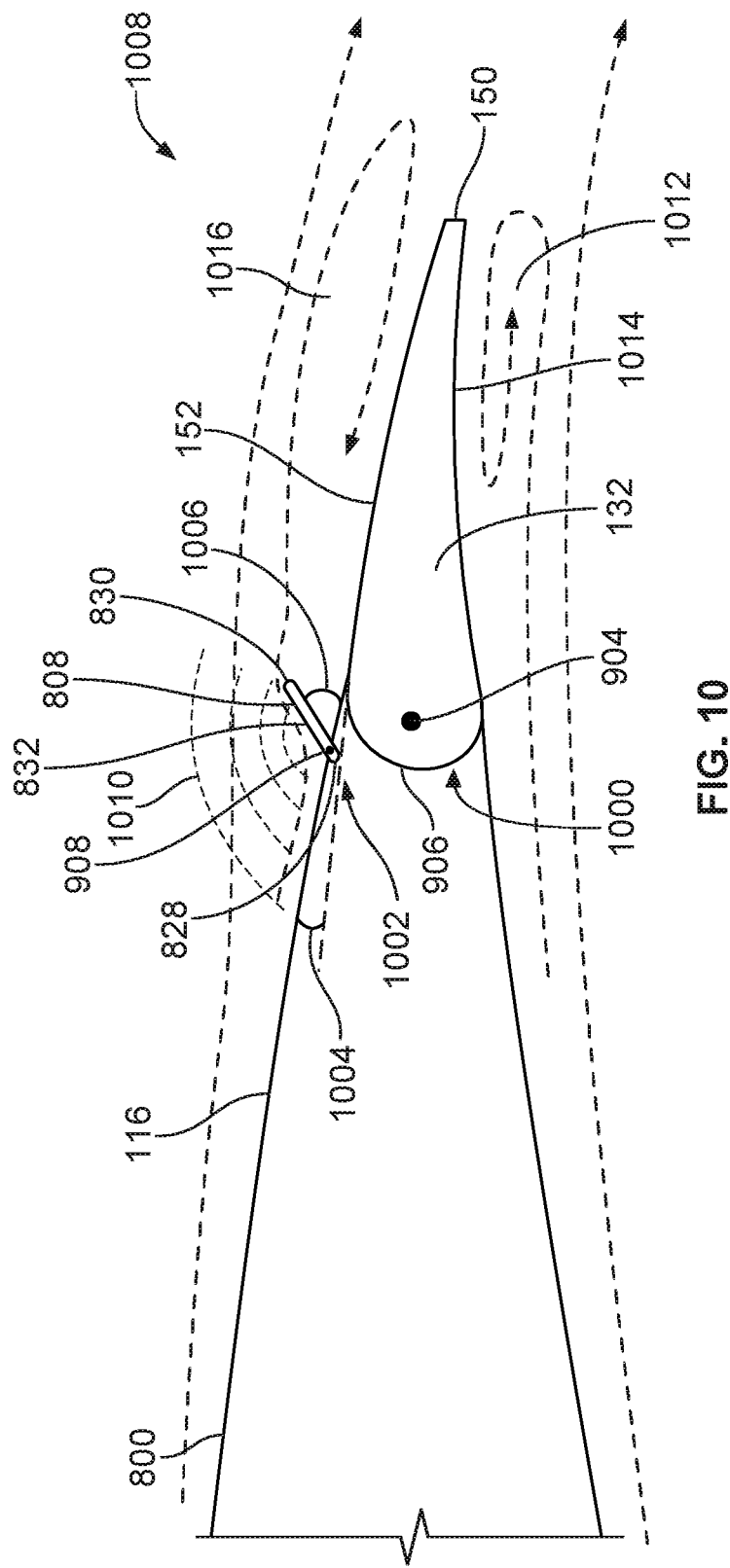
FIG. 10 is a partial cross-sectional view of the aircraft wing of FIGS. 8 and 9 showing the aileron of FIGS. 8 and 9 in a first example upward deflected position, and showing the fourth mini-spoiler of FIGS. 8 and 9 in an example deployed position.
Figure 11:
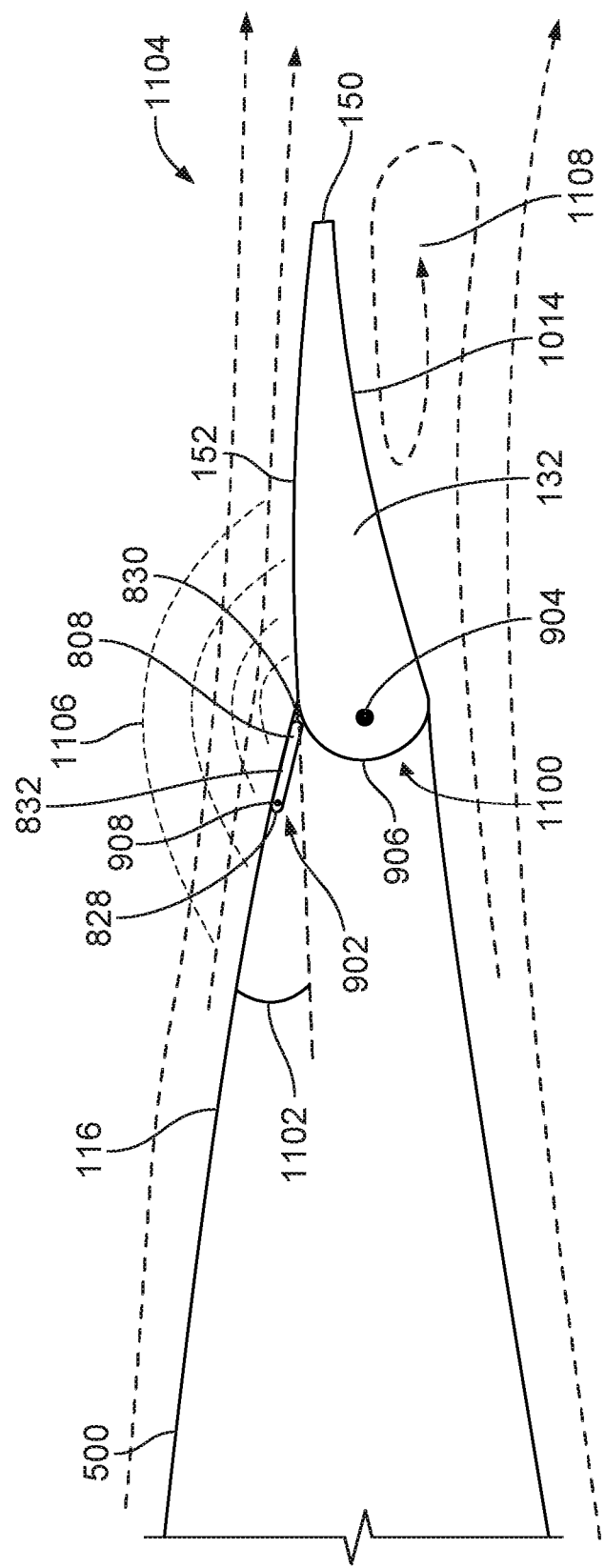
FIG. 11 is a partial cross-sectional view of the aircraft wing of FIGS. 8-10 showing the aileron of FIGS. 8-10 in a second example upward deflected position, and showing the fourth mini-spoiler of FIGS. 8-10 in the retracted position of FIG. 9.

As further described below, FIGS. 9-11 illustrate the fourth mini-spoiler 808 of the aircraft wing 800 of FIG. 8 enhancing the effectiveness of the aileron 132 of the aircraft wing 800 of FIG. 8 as the aileron 132 moves from a neutral position to a first upward deflected position, and from the first upward deflected position to a second upward deflected position extending beyond the first upward deflected position. The description of the flow field of the aileron 132 and the fourth mini-spoiler 808 of the aircraft wing 800 of FIG. 8 provided below in connection with FIGS. 9-11 also applies to the flow field of the flaperon 130 and the third mini-spoiler 806 of the aircraft wing 800 of FIG. 8.

FIG. 9 is a partial cross-sectional view of the aircraft wing 800 of FIG. 8 showing the aileron 132 of FIG. 8 in an example neutral (e.g., undeflected) position 900, and showing the fourth mini-spoiler 808 of FIG. 8 in an example retracted position 902. The aileron 132 is movably coupled to the aircraft wing 800, and is movable (e.g., rotatable and/or deflectable relative to the neutral position 900) about a first example hinge line 904 located proximate to an example leading edge 906 and/or forward of the trailing edge 150 of the aileron 132. When the aileron 132 is in the neutral position 900, the upper surface 152 of the aileron 132 is generally aligned with (e.g., is parallel to and/or coplanar with) the fixed upper surface 116 of the aircraft wing 800. The fourth mini-spoiler 808 is also movably coupled to the aircraft wing 800, and is movable (e.g., rotatable and/or deflectable relative to the retracted position 902) about a second example hinge line 908 located proximate to the leading edge 828 and/or forward of the trailing edge 830 of the fourth mini-spoiler 808. When the fourth mini-spoiler 808 is in the retracted position 902, the upper surface 832 of the fourth mini-spoiler 808 is generally aligned with (e.g., is parallel to and/or coplanar with) the fixed upper surface 116 of the aircraft wing 800.

FIG. 9 further illustrates a first example airflow 910 local to the aileron 132 when an aircraft implementing the aircraft wing 800 is traveling at high Mach number with the aileron 132 in the neutral position 900 and the fourth mini-spoiler 808 in the retracted position 902. The first airflow 910 includes a first example flow separation region 912 located along the upper surface 152 of the aileron 132. The first flow separation region 912 of the first airflow 910 of FIG. 9 reduces the lift potential of the aircraft wing 800. The first airflow 910 illustrated in FIG. 9 is substantially identical to the first airflow 206 illustrated in FIG. 2 and described above.

FIG. 10 is a partial cross-sectional view of the aircraft wing 800 of FIGS. 8 and 9 showing the aileron 132 of FIGS. 8 and 9 in a first example upward deflected position 1000, and showing the fourth mini-spoiler of FIGS. 8 and 9 in an example deployed position 1002. The aileron 132 can be deflected and/or rotated about the first hinge line 904 from the neutral position 900 of FIG. 9 to the first upward deflected position 1000 of FIG. 10. When the aileron 132 is in the first upward deflected position 1000, the upper surface 152 of the aileron 132 is oriented at a first example deflection angle 1004 relative to the fixed upper surface 116 of the aircraft wing 800. In the illustrated example of FIG. 10, the first deflection angle 1004 is approximately five degrees (5°). The fourth mini-spoiler 808 can be deflected and/or rotated about the second hinge line 908 from the retracted position 902 of FIG. 9 to the deployed position 1002 of FIG. 10. When the fourth mini-spoiler 808 is in the deployed position 1002, the upper surface 832 of the fourth mini-spoiler 808 is oriented at an example deployment angle 1006 relative to the fixed upper surface 116 of the aircraft wing 800. In some examples, the deployment angle 1006 is between thirty degrees (30°) and ninety degrees (90°), and preferably between thirty degrees (30°) and sixty degrees (60°). In the illustrated example of FIG. 10, the deployment angle 1006 is approximately forty-five degrees (45°).

FIG. 10 further illustrates a second example airflow 1008 local to the aileron 132 when an aircraft implementing the aircraft wing 800 is traveling at high Mach number with the aileron 132 in the first upward deflected position 1000 and the fourth mini-spoiler 808 in the deployed position 1002. The second airflow 1008 of FIG. 10 differs from the first airflow 910 of FIG. 9. More specifically, the second airflow 1008 of FIG. 10 includes a first example increased pressure region 1010 located along the upper surface 832 of the fourth mini-spoiler 808 and/or along the fixed upper surface 116 of the aircraft wing 800 forward of the fourth mini-spoiler 808. The second airflow 1008 of FIG. 10 further includes a second example flow separation region 1012 located along an example lower surface 1014 of the aileron 132. The second airflow 1008 of FIG. 10 further includes a third example flow separation region 1016 located along the upper surface 152 of the aileron 132 and having a size and/or an area greater than the size and/or the area of the first flow separation region 912 of the first airflow 910 of FIG. 9. In response to the first increased pressure region 1010, the second flow separation region 1012, and the third flow separation region 1016, the aircraft wing 800 experiences a significant (e.g., measurable) lift reduction, which corresponds to the intended aerodynamic effect of deflecting the aileron 132 upward.

Deployment of the fourth mini-spoiler 808 while the aileron 132 is positioned at a small upward deflection (e.g., as shown in FIG. 10) advantageously eliminates the adverse reversal of the intended aerodynamic effect that would otherwise occur (e.g., as shown in FIG. 3 described above) in the absence of the fourth mini-spoiler 808 when the aileron 132 is positioned at the small upward deflection. By eliminating the dead-band associated with the aileron 132 being positioned at small upward deflections, the fourth mini-spoiler 808 advantageously enhances the effectiveness of the aileron 132.

FIG. 11 is a partial cross-sectional view of the aircraft wing 800 of FIGS. 8-10 showing the aileron 132 of FIGS. 8-10 in a second example upward deflected position 1100, and showing the fourth mini-spoiler 808 of FIGS. 8-10 in the retracted position 902 of FIG. 9. The aileron 132 can be deflected and/or rotated about the first hinge line 904 from the first upward deflected position 1000 of FIG. 10 to the second upward deflected position 1100 of FIG. 11. When the aileron 132 is in the second upward deflected position 1100, the upper surface 152 of the aileron 132 is oriented at a second example deflection angle 1102 relative to the fixed upper surface 116 of the aircraft wing 800. The second deflection angle 1102 associated with the second upward deflected position 1100 of FIG. 11 is greater than the first deflection angle 1004 associated with the first upward deflected position 1000 of FIG. 10. In the illustrated example of FIG. 11, the second deflection angle 1102 is approximately fifteen degrees (15°). The fourth mini-spoiler 808 can be deflected and/or rotated about the second hinge line 908 from the deployed position 1002 of FIG. 10 to the retracted position 902 of FIGS. 9 and 11.

FIG. 11 further illustrates a third example airflow 1104 local to the aileron 132 when an aircraft implementing the aircraft wing 800 is traveling at high Mach number with the aileron 132 in the second upward deflected position 1100 and the fourth mini-spoiler 808 in the retracted position 902. The third airflow 1104 of FIG. 11 differs from the second airflow 1008 of FIG. 10. More specifically, the second flow separation region 1012 included in the second airflow 1008 of FIG. 10 is eliminated from and/or is not included in the third airflow 1104 of FIG. 11. Furthermore, the third airflow 1104 of FIG. 11 includes a second example increased pressure region 1106 located along the upper surface 152 of the aileron 132, along the upper surface 832 of the fourth mini-spoiler 808, and/or along the fixed upper surface 116 of the aircraft wing 800 forward of the aileron 132, and having a size and/or an area greater than the size and/or the area of the first increased pressure region 1010 of the second airflow 1008 of FIG. 10. The third airflow 1104 of FIG. 11 further includes a fourth example flow separation region 1108 located along the lower surface 1014 of the aileron 132 and having a size and/or an area greater than the size and/or the area of the second flow separation region 1012 of the second airflow 1008 of FIG. 10. In response to the second increased pressure region 1106 and the fourth flow separation region 1108, the aircraft wing 800 maintains a significant (e.g., measurable) lift reduction.

Figure 12:
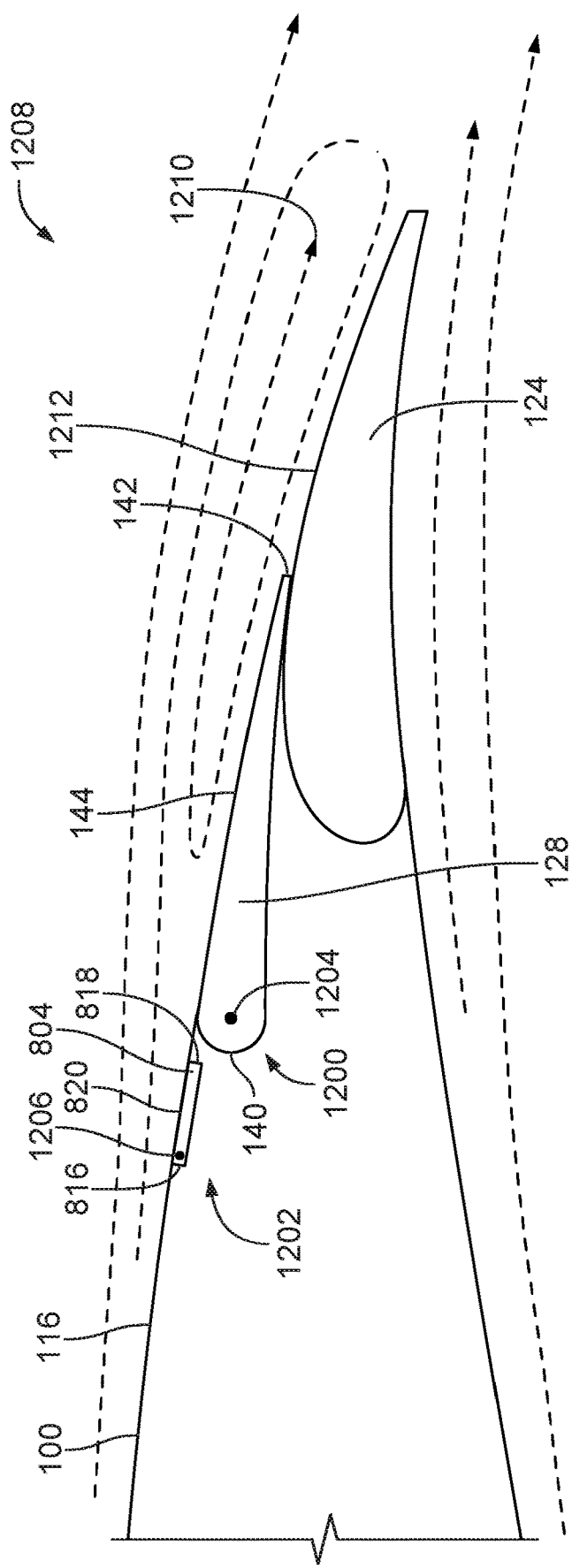
FIG. 12 is a partial cross-sectional view of the aircraft wing of FIG. 8 showing the outboard spoiler of FIG. 8 in an example neutral (e.g., undeflected) position, and showing the second mini-spoiler of FIG. 8 in an example retracted position.
Figure 13:
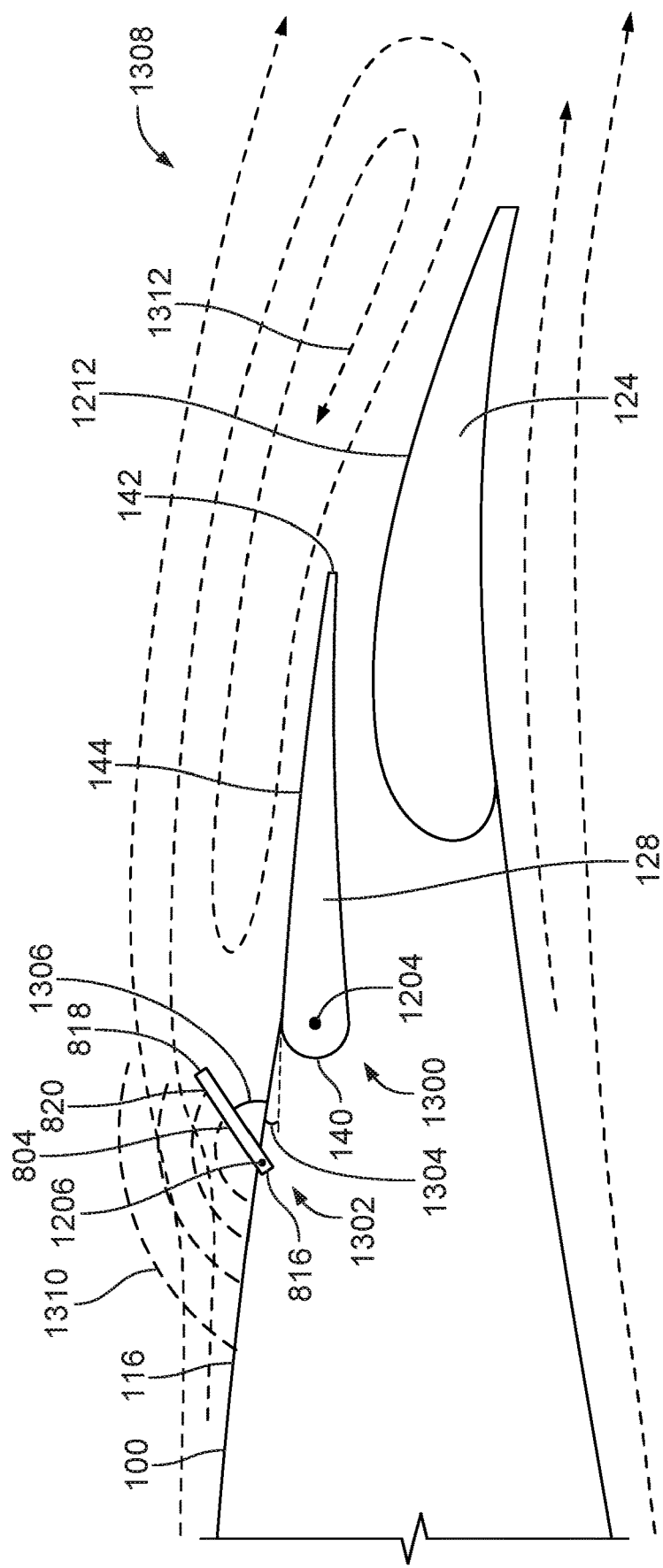
FIG. 13 is a partial cross-sectional view of the aircraft wing of FIGS. 8 and 12 showing the outboard spoiler of FIGS. 8 and 12 in a first example upward deflected position, and showing the second mini-spoiler of FIGS. 8 and 12 in an example deployed position.
Figure 14:
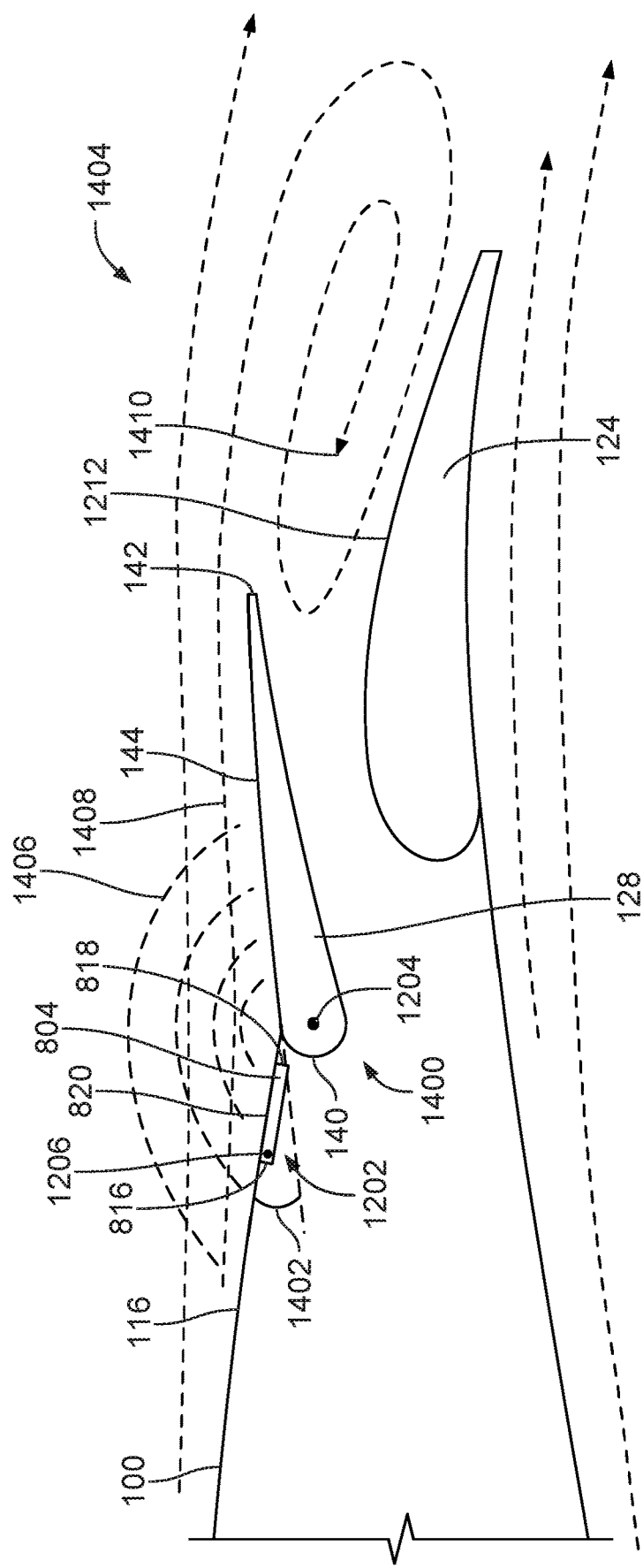
FIG. 14 is a partial cross-sectional view of the aircraft wing of FIGS. 8, 12 and 13 showing the outboard spoiler of FIGS. 8, 12 and 13 in a second example upward deflected position, and showing the second mini-spoiler of FIGS. 8, 12 and 13 in the retracted position of FIG. 12.

As further described below, FIGS. 12-14 illustrate the second mini-spoiler 804 of the aircraft wing 800 of FIG. 8 enhancing the effectiveness of the outboard spoiler 128 of the aircraft wing 800 of FIG. 8 as the outboard spoiler 128 moves from a neutral position to a first upward deflected position, and from the first upward deflected position to a second upward deflected position extending beyond the first upward deflected position. The description of the flow field of the outboard spoiler 128 and the second mini-spoiler 804 of the aircraft wing 800 of FIG. 8 provided below in connection with FIGS. 12-14 also applies to the flow field of the inboard spoiler 126 and the first mini-spoiler 802 of the aircraft wing 800 of FIG. 8.

FIG. 12 is a partial cross-sectional view of the aircraft wing 800 of FIG. 8 showing the outboard spoiler 128 of FIG. 8 in an example neutral (e.g., undeflected) position 1200, and showing the second mini-spoiler 804 of FIG. 8 in an example retracted position 1202. The outboard spoiler 128 is movably coupled to the aircraft wing 800, and is movable (e.g., rotatable and/or deflectable relative to the neutral position 1200) about a first example hinge line 1204 located proximate to an example leading edge 140 and/or forward of the trailing edge 142 of the outboard spoiler 128. When the outboard spoiler 128 is in the neutral position 1200, the upper surface 144 of the outboard spoiler 128 is generally aligned with (e.g., is parallel to and/or coplanar with) the fixed upper surface 116 of the aircraft wing 800. The second mini-spoiler 804 is also movably coupled to the aircraft wing 800, and is movable (e.g., rotatable and/or deflectable relative to the retracted position 1202) about a second example hinge line 1206 located proximate to the leading edge 816 and/or forward of the trailing edge 818 of the second mini-spoiler 804. When the second mini-spoiler 804 is in the retracted position 1202, the upper surface 820 of the second mini-spoiler 804 is generally aligned with (e.g., is parallel to and/or coplanar with) the fixed upper surface 116 of the aircraft wing 800.

FIG. 12 further illustrates a first example airflow 1208 local to the outboard spoiler 128 when an aircraft implementing the aircraft wing 800 is traveling at high Mach number with the outboard spoiler 128 in the neutral position 1200 and the second mini-spoiler 804 in the retracted position 1202. The first airflow 1208 includes a first example flow separation region 1210 located along the upper surface 144 of the outboard spoiler 128 and along an upper surface 1212 of the outboard flap 124. The first flow separation region 1210 of the first airflow 1208 of FIG. 12 reduces the lift potential of the aircraft wing 800. The first airflow 1208 illustrated in FIG. 12 is substantially identical to the first airflow 504 illustrated in FIG. 5 and described above.

FIG. 13 is a partial cross-sectional view of the aircraft wing 800 of FIGS. 8 and 12 showing the outboard spoiler 128 of FIGS. 8 and 12 in a first example upward deflected position 1300, and showing the second mini-spoiler 804 of FIGS. 8 and 12 in an example deployed position 1302. The outboard spoiler 128 can be deflected and/or rotated about the first hinge line 1204 from the neutral position 1200 of FIG. 12 to the first upward deflected position 1300 of FIG. 13. When the outboard spoiler 128 is in the first upward deflected position 1300, the upper surface 144 of the outboard spoiler 128 is oriented at a first example deflection angle 1304 relative to the fixed upper surface 116 of the aircraft wing 800. In the illustrated example of FIG. 13, the first deflection angle 1304 is approximately five degrees (5°). The second mini-spoiler 804 can be deflected and/or rotated about the second hinge line 1206 from the retracted position 1202 of FIG. 12 to the deployed position 1302 of FIG. 13. When the second mini-spoiler 804 is in the deployed position 1302, the upper surface 820 of the second mini-spoiler 804 is oriented at an example deployment angle 1306 relative to the fixed upper surface 116 of the aircraft wing 800. In some examples, the deployment angle 1306 is between thirty degrees (30°) and ninety degrees (90°), and preferably between thirty degrees (30°) and sixty degrees (60°). In the illustrated example of FIG. 13, the deployment angle 1306 is approximately forty-five degrees (45°).

FIG. 13 further illustrates a second example airflow 1308 local to the outboard spoiler 128 when an aircraft implementing the aircraft wing 800 is traveling at high Mach number with the outboard spoiler 128 in the first upward deflected position 1300 and the second mini-spoiler 804 in the deployed position 1302. The second airflow 1308 of FIG. 13 differs from the first airflow 1208 of FIG. 12. More specifically, the second airflow 1308 of FIG. 13 includes a first example increased pressure region 1310 located along the upper surface 820 of the second mini-spoiler 804 and/or along the fixed upper surface 116 of the aircraft wing 800 forward of the second mini-spoiler 804. The second airflow 1308 of FIG. 13 further includes a second example flow separation region 1312 located along the upper surface 144 of the outboard spoiler 128 and along the upper surface 1212 of the outboard flap 124, and having a size and/or an area greater than the size and/or the area of the first flow separation region 1210 of the first airflow 1208 of FIG. 12. In response to the first increased pressure region 1310 and the second flow separation region 1312, the aircraft wing 800 experiences a significant (e.g., measurable) lift reduction, which corresponds to the intended aerodynamic effect of deflecting the outboard spoiler 128 upward.

Deployment of the second mini-spoiler 804 while the outboard spoiler 128 is positioned at a small upward deflection (e.g., as shown in FIG. 13) advantageously eliminates the adverse reversal of the intended aerodynamic effect that would otherwise occur (e.g., as shown in FIG. 6 described above) in the absence of the second mini-spoiler 804 when the outboard spoiler 128 is positioned at the small upward deflection. By eliminating the dead-band associated with the outboard spoiler 128 being positioned at small upward deflections, the second mini-spoiler 804 advantageously enhances the effectiveness of the outboard spoiler 128.

FIG. 14 is a partial cross-sectional view of the aircraft wing 800 of FIGS. 8, 12 and 13 showing the outboard spoiler 128 of FIGS. 8, 12 and 13 in a second example upward deflected position 1400, and showing the second mini-spoiler 804 of FIGS. 8, 12 and 13 in the retracted position 1202 of FIG. 12. The outboard spoiler 128 can be deflected and/or rotated about the first hinge line 1204 from the first upward deflected position 1300 of FIG. 13 to the second upward deflected position 1400 of FIG. 14. When the outboard spoiler 128 is in the second upward deflected position 1400, the upper surface 144 of the outboard spoiler 128 is oriented at a second example deflection angle 1402 relative to the fixed upper surface 116 of the aircraft wing 800. The second deflection angle 1402 associated with the second upward deflected position 1400 of FIG. 14 is greater than the first deflection angle 1304 associated with the first upward deflected position 1300 of FIG. 13. In the illustrated example of FIG. 14, the second deflection angle 1402 is approximately fifteen degrees (15°). The second mini-spoiler 804 can be deflected and/or rotated about the second hinge line 1206 from the deployed position 1302 of FIG. 13 to the retracted position 1202 of FIGS. 12 and 14.

FIG. 14 further illustrates a third example airflow 1404 local to the outboard spoiler 128 when an aircraft implementing the aircraft wing 800 is traveling at high Mach number with the outboard spoiler 128 in the second upward deflected position 1400 and the second mini-spoiler 804 in the retracted position 1202. The third airflow 1404 of FIG. 14 differs from the second airflow 1308 of FIG. 13. More specifically, the third airflow 1404 includes a second example increased pressure region 1406 located along the upper surface 144 of the outboard spoiler 128, along the upper surface 820 of the second mini-spoiler 804, and/or along the fixed upper surface 116 of the aircraft wing 800 forward of the outboard spoiler 128, and having a size and/or an area greater than the size and/or the area of the first increased pressure region 1310 of the second airflow 1308 of FIG. 13. The third airflow 1404 of FIG. 14 further includes an example flow reattachment region 1408 located along the upper surface 144 of the outboard spoiler 128. The third airflow 1404 of FIG. 14 further includes a third example flow separation region 1410 located along the upper surface 1212 of the outboard flap 124, and having a size and/or an area greater than the size and/or the area of the second flow separation region 1312 of the second airflow 1308 of FIG. 13. In response to the second increased pressure region 1406, the flow reattachment region 1408, and the third flow separation region 1410, the aircraft wing 800 maintains a significant (e.g., measurable) lift reduction.

Figure 15:
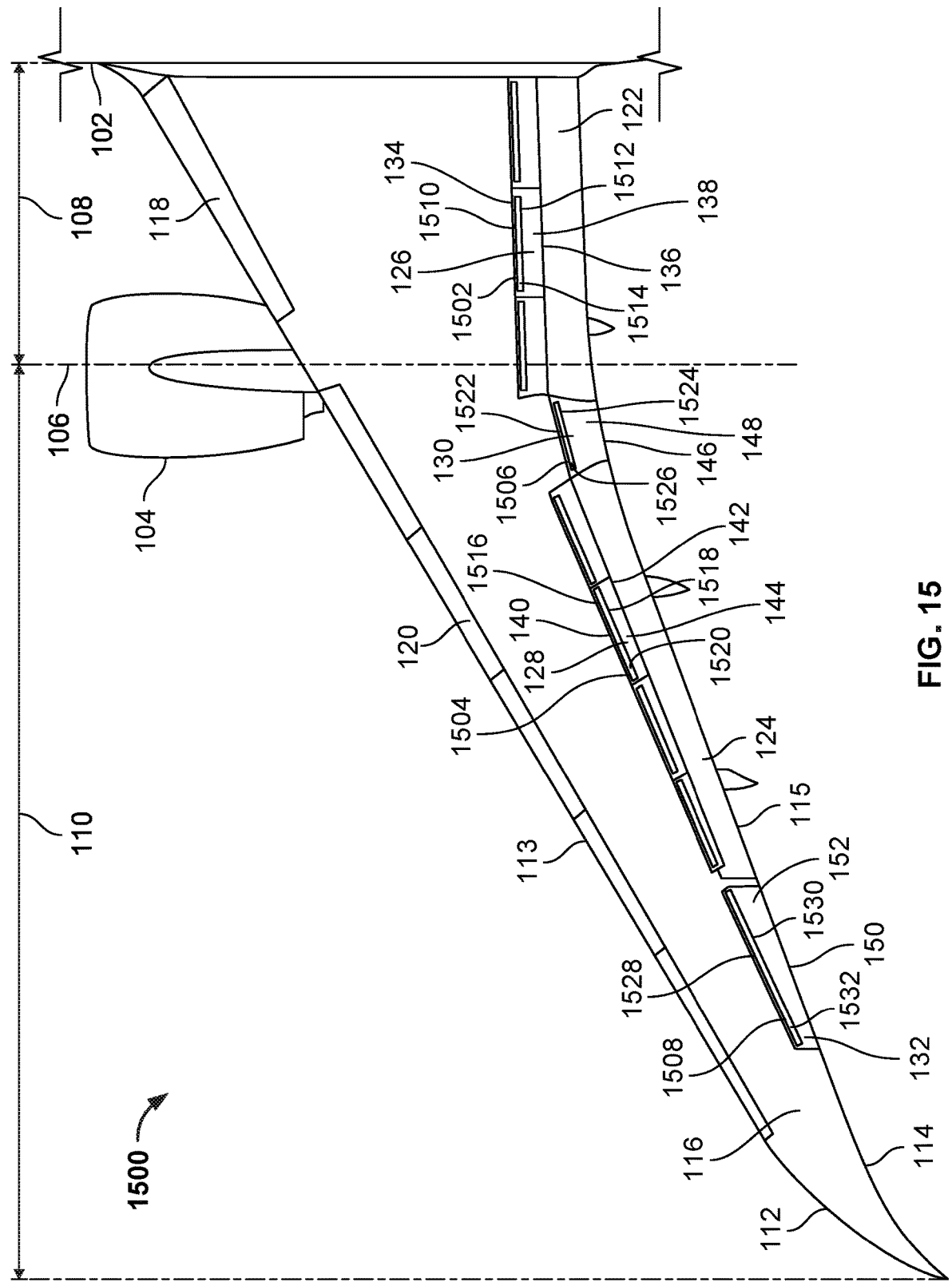
FIG. 15 is a plan view of another example aircraft wing including example mini-spoilers constructed in accordance with the teachings of this disclosure.

FIG. 15 is a plan view of another example aircraft wing 1500 including example mini-spoilers constructed in accordance with the teachings of this disclosure. In the illustrated example of FIG. 15, the aircraft wing 1500 of FIG. 15 includes the fuselage 102, the nacelle 104 (including the longitudinal axis 106), the inboard portion 108, the outboard portion 110, the fixed leading edge 112, the leading edge 113, the fixed trailing edge 114, the trailing edge 115, the fixed upper surface 116, the lift-control surfaces (including the inboard slat 118, the outboard slats 120, the inboard flap 122, and the outboard flap 124), and the lateral-control surfaces (including the inboard spoiler 126, the outboard spoiler 128, the flaperon 130, and the aileron 132) of the aircraft wing 100 of FIGS. 1-7 described above. In other examples, the aircraft wing 1500 of FIG. 15 can alternatively include additional lift-control surfaces and/or additional lateral-control surfaces relative to those described above in connection with FIGS. 1-7. In still other examples, the aircraft wing 1500 of FIG. 15 can alternatively include fewer lift-control surfaces and/or fewer lateral-control surfaces relative to those described above in connection with FIGS. 1-7.

In the illustrated example of FIG. 15, the mini-spoilers of the aircraft wing 1500 include a first example mini-spoiler 1502 associated with the inboard spoiler 126 of the aircraft wing 1500, a second example mini-spoiler 1504 associated with the outboard spoiler 128 of the aircraft wing 1500, a third example mini-spoiler 1506 associated with the flaperon 130 of the aircraft wing 1500, and a fourth example mini-spoiler 1508 associated with the aileron 132 of the aircraft wing 1500. Thus, as shown in FIG. 15, each of the lateral-control surfaces of the aircraft wing 1500 of FIG. 15 is associated with a corresponding one of the mini-spoilers of the aircraft wing 1500. In other examples, the ratio of lateral-control surfaces to mini-spoilers can differ from the one-to-one ratio shown in FIG. 15. For example, the aircraft wing 1500 of FIG. 15 can alternatively include fewer mini-spoilers than lateral-control surfaces, with one or more of the lateral-control surfaces being without an associated mini-spoiler.

In the illustrated example of FIG. 15, the first mini-spoiler 1502 is movably coupled to the inboard spoiler 126 of the aircraft wing 1500, and is located proximate to the leading edge 134 and/or forward of the trailing edge 136 of the inboard spoiler 126 along the upper surface 138 of the inboard spoiler 126. The first mini-spoiler 1502 includes an example leading edge 1510, an example trailing edge 1512 located opposite to and/or rearward of the leading edge 1510, and an example upper surface 1514 extending between the leading edge 1510 and the trailing edge 1512. The first mini-spoiler 1502 is movable (e.g., rotatable and/or deflectable) relative to the upper surface 138 of the inboard spoiler 126 between a retracted position in which the upper surface 1514 of the first mini-spoiler 1502 is generally aligned with (e.g., is parallel to and/or coplanar with) the upper surface 138 of the inboard spoiler 126, and a deployed position in which the upper surface 1514 of the first mini-spoiler 1502 is deflected upward (e.g., about a hinge line located proximate to the leading edge 1510 and/or forward of the trailing edge 1512 of the first mini-spoiler 1502) relative to the upper surface 138 of the inboard spoiler 126.

The first mini-spoiler 1502 is configured (e.g., sized and/or shaped) such that a chordwise dimension (e.g., in a fore-aft direction substantially parallel to the longitudinal axis 106) of the upper surface 1514 of the first mini-spoiler 1502 measured when the first mini-spoiler 1502 is in its retracted position is substantially smaller than a chordwise dimension of the upper surface 138 of the inboard spoiler 126 measured when the inboard spoiler 126 is in its neutral (e.g., undeflected) position. In some examples, the measured chordwise dimension of the upper surface 1514 of the first mini-spoiler 1502 of FIG. 15 is between approximately five percent (5%) and approximately sixty percent (60%) of the measured chordwise dimension of the upper surface 138 of the inboard spoiler 126. In some examples, the measured chordwise dimension of the upper surface 1514 of the first mini-spoiler 1502 of FIG. 15 is between approximately one percent (1%) and approximately five percent (5%) of a local wing chord measured from the leading edge 113 of the aircraft wing 1500 to the trailing edge 115 of the aircraft wing 1500 at a location local to (e.g., adjacent to and/or overlapping) the first mini-spoiler 1502, and with any local leading edge device(s) (e.g., the inboard slat 118) and/or local trailing edge device(s) (e.g., the inboard flap 122) positioned in its/their respective stowed and/or neutral position(s).

In the illustrated example of FIG. 15, the first mini-spoiler 1502 has a substantially planar shape that extends along the upper surface 138 of the inboard spoiler 126 in a lateral and/or spanwise direction. As shown in FIG. 15, the spanwise extent of the first mini-spoiler 1502 is approximately equal to the spanwise extent of the leading edge 134 of the inboard spoiler 126. In other examples, the spanwise extent of the first mini-spoiler 1502 can be substantially less than the spanwise extent of the leading edge 134 of the inboard spoiler 126.

In some examples, movement of the first mini-spoiler 1502 occurs via one or more actuation mechanism(s) coupled to the first mini-spoiler 1502 of the aircraft wing 1500, and controlled via one or more control system(s) of an aircraft implementing the aircraft wing 1500. In such examples, the actuation mechanism(s) coupled to the first mini-spoiler 1502 can be controlled (e.g., via one or more signal(s), command(s), and/or instruction(s) generated by a dedicated controller) based on movement and/or the position of the inboard spoiler 126. For example, the first mini-spoiler 1502 can be configured and/or controlled (A) to move toward and/or be positioned in its retracted position when the inboard spoiler 126 is moved toward and/or positioned in its neutral (e.g., undeflected) position, (B) to move toward and/or be positioned in its deployed position when the inboard spoiler 126 is moved toward and/or positioned in a first upward deflected position, and (C) to move toward and/or be positioned in its retracted position when the inboard spoiler 126 is moved toward and/or positioned in a second upward deflected position extending beyond the first upward deflected position. The first mini-spoiler 1502 can alternatively be configured and/or controlled to remain in its deployed position when the inboard spoiler 126 is moved toward and/or positioned in the second upward deflected position.

In other examples, the first mini-spoiler 1502 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the inboard spoiler 126 such that movement and/or the position of the first mini-spoiler 1502 is mechanically dependent upon movement and/or the position of the inboard spoiler 126. For example, the first mini-spoiler 1502 can be mechanically slaved (A) to move toward and/or be positioned in its retracted position when the inboard spoiler 126 is moved toward and/or positioned in its neutral (e.g., undeflected) position, (B) to move toward and/or be positioned in its deployed position when the inboard spoiler 126 is moved toward and/or positioned in a first upward deflected position, and (C) to move toward and/or be positioned in its retracted position when the inboard spoiler 126 is moved toward and/or positioned in a second upward deflected position extending beyond the first upward deflected position. The first mini-spoiler 1502 can alternatively be mechanically slaved to remain in its deployed position when the inboard spoiler 126 is moved toward and/or positioned in the second upward deflected position.

In the illustrated example of FIG. 15, the second mini-spoiler 1504 is movably coupled to the outboard spoiler 128 of the aircraft wing 1500, and is located proximate to the leading edge 140 and/or forward of the trailing edge 142 of the outboard spoiler 128 along the upper surface 144 of the outboard spoiler 128. The second mini-spoiler 1504 includes an example leading edge 1516, an example trailing edge 1518 located opposite to and/or rearward of the leading edge 1516, and an example upper surface 1520 extending between the leading edge 1516 and the trailing edge 1518. The second mini-spoiler 1504 is movable (e.g., rotatable and/or deflectable) relative to the upper surface 144 of the outboard spoiler 128 between a retracted position in which the upper surface 1520 of the second mini-spoiler 1504 is generally aligned with (e.g., is parallel to and/or coplanar with) the upper surface 144 of the outboard spoiler 128, and a deployed position in which the upper surface 1520 of the second mini-spoiler 1504 is deflected upward (e.g., about a hinge line located proximate to the leading edge 1516 and/or forward of the trailing edge 1518 of the second mini-spoiler 1504) relative to the upper surface 144 of the outboard spoiler 128.

The second mini-spoiler 1504 is configured (e.g., sized and/or shaped) such that a chordwise dimension (e.g., in a fore-aft direction substantially parallel to the longitudinal axis 106) of the upper surface 1520 of the second mini-spoiler 1504 measured when the second mini-spoiler 1504 is in its retracted position is substantially smaller than a chordwise dimension of the upper surface 144 of the outboard spoiler 128 measured when the outboard spoiler 128 is in its neutral (e.g., undeflected) position. In some examples, the measured chordwise dimension of the upper surface 1520 of the second mini-spoiler 1504 of FIG. 15 is between approximately five percent (5%) and approximately sixty percent (60%) of the measured chordwise dimension of the upper surface 144 of the outboard spoiler 128. In some examples, the measured chordwise dimension of the upper surface 1520 of the second mini-spoiler 1504 of FIG. 15 is between approximately one percent (1%) and approximately five percent (5%) of a local wing chord measured from the leading edge 113 of the aircraft wing 1500 to the trailing edge 115 of the aircraft wing 1500 at a location local to (e.g., adjacent to and/or overlapping) the second mini-spoiler 1504, and with any local leading edge device(s) (e.g., the outboard slat(s) 120) and/or local trailing edge device(s) (e.g., the outboard flap 124) positioned in its/their respective stowed and/or neutral position(s).

In the illustrated example of FIG. 15, the second mini-spoiler 1504 has a substantially planar shape that extends along the upper surface 144 of the outboard spoiler 128 in a lateral and/or spanwise direction. As shown in FIG. 15, the spanwise extent of the second mini-spoiler 1504 is approximately equal to the spanwise extent of the leading edge 140 of the outboard spoiler 128. In other examples, the spanwise extent of the second mini-spoiler 1504 can be substantially less than the spanwise extent of the leading edge 140 of the outboard spoiler 128.

In some examples, movement of the second mini-spoiler 1504 occurs via one or more actuation mechanism(s) coupled to the second mini-spoiler 1504 of the aircraft wing 1500, and controlled via one or more control system(s) of an aircraft implementing the aircraft wing 1500. In such examples, the actuation mechanism(s) coupled to the second mini-spoiler 1504 can be controlled (e.g., via one or more signal(s), command(s), and/or instruction(s) generated by a dedicated controller) based on movement and/or the position of the outboard spoiler 128. For example, the second mini-spoiler 1504 can be configured and/or controlled (A) to move toward and/or be positioned in its retracted position when the outboard spoiler 128 is moved toward and/or positioned in its neutral (e.g., undeflected) position, (B) to move toward and/or be positioned in its deployed position when the outboard spoiler 128 is moved toward and/or positioned in a first upward deflected position, and (C) to move toward and/or be positioned in its retracted position when the outboard spoiler 128 is moved toward and/or positioned in a second upward deflected position extending beyond the first upward deflected position. The second mini-spoiler 1504 can alternatively be configured and/or controlled to remain in its deployed position when the outboard spoiler 128 is moved toward and/or positioned in the second upward deflected position.

In other examples, the second mini-spoiler 1504 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the outboard spoiler 128 such that movement and/or the position of the second mini-spoiler 1504 is mechanically dependent upon movement and/or the position of the outboard spoiler 128. For example, the second mini-spoiler 1504 can be mechanically slaved (A) to move toward and/or be positioned in its retracted position when the outboard spoiler 128 is moved toward and/or positioned in its neutral (e.g., undeflected) position, (B) to move toward and/or be positioned in its deployed position when the outboard spoiler 128 is moved toward and/or positioned in a first upward deflected position, and (C) to move toward and/or be positioned in its retracted position when the outboard spoiler 128 is moved toward and/or positioned in a second upward deflected position extending beyond the first upward deflected position. The second mini-spoiler 1504 can alternatively be mechanically slaved to remain in its deployed position when the outboard spoiler 128 is moved toward and/or positioned in the second upward deflected position.

In the illustrated example of FIG. 15, the third mini-spoiler 1506 is movably coupled to the flaperon 130 of the aircraft wing 1500, and is located proximate to the leading edge and/or forward of the trailing edge 146 of the flaperon 130 along the upper surface 148 of the flaperon 130. The third mini-spoiler 1506 includes an example leading edge 1522, an example trailing edge 1524 located opposite to and/or rearward of the leading edge 1522, and an example upper surface 1526 extending between the leading edge 1522 and the trailing edge 1524. The third mini-spoiler 1506 is movable (e.g., rotatable and/or deflectable) relative to the upper surface 148 of the flaperon 130 between a retracted position in which the upper surface 1526 of the third mini-spoiler 1506 is generally aligned with (e.g., is parallel to and/or coplanar with) the upper surface 148 of the flaperon 130, and a deployed position in which the upper surface 1526 of the third mini-spoiler 1506 is deflected upward (e.g., about a hinge line located proximate to the leading edge 1522 and/or forward of the trailing edge 1524 of the third mini-spoiler 1506) relative to the upper surface 148 of the flaperon 130.

The third mini-spoiler 1506 is configured (e.g., sized and/or shaped) such that a chordwise dimension (e.g., in a fore-aft direction substantially parallel to the longitudinal axis 106) of the upper surface 1526 of the third mini-spoiler 1506 measured when the third mini-spoiler 1506 is in its retracted position is substantially smaller than a chordwise dimension of the upper surface 148 of the flaperon 130 measured when the flaperon 130 is in its neutral (e.g., undeflected) position. In some examples, the measured chordwise dimension of the upper surface 1526 of the third mini-spoiler 1506 of FIG. 15 is between approximately five percent (5%) and approximately sixty percent (60%) of the measured chordwise dimension of the upper surface 148 of the flaperon 130. In some examples, the measured chordwise dimension of the upper surface 1526 of the third mini-spoiler 1506 of FIG. 15 is between approximately one percent (1%) and approximately five percent (5%) of a local wing chord measured from the leading edge 113 of the aircraft wing 1500 to the trailing edge 115 of the aircraft wing 1500 at a location local to (e.g., adjacent to and/or overlapping) the third mini-spoiler 1506, and with any local leading edge device(s) (e.g., the outboard slat(s) 120) and/or local trailing edge device(s) (e.g., the flaperon flap 130) positioned in its/their respective stowed and/or neutral position(s).

In the illustrated example of FIG. 15, the third mini-spoiler 1506 has a substantially planar shape that extends along the upper surface 148 of the flaperon 130 in a lateral and/or spanwise direction. As shown in FIG. 15, the spanwise extent of the third mini-spoiler 1506 is approximately equal to the spanwise extent of the leading edge of the flaperon 130. In other examples, the spanwise extent of the third mini-spoiler 1506 can be substantially less than the spanwise extent of the leading edge of the flaperon 130.

In some examples, movement of the third mini-spoiler 1506 occurs via one or more actuation mechanism(s) coupled to the third mini-spoiler 1506 of the aircraft wing 1500, and controlled via one or more control system(s) of an aircraft implementing the aircraft wing 1500. In such examples, the actuation mechanism(s) coupled to the third mini-spoiler 1506 can be controlled (e.g., via one or more signal(s), command(s), and/or instruction(s) generated by a dedicated controller) based on movement and/or the position of the flaperon 130. For example, the third mini-spoiler 1506 can be configured and/or controlled (A) to move toward and/or be positioned in its retracted position when the flaperon 130 is moved toward and/or positioned in its neutral (e.g., undeflected) position, (B) to move toward and/or be positioned in its deployed position when the flaperon 130 is moved toward and/or positioned in a first upward deflected position, and (C) to move toward and/or be positioned in its retracted position when the flaperon 130 is moved toward and/or positioned in a second upward deflected position extending beyond the first upward deflected position. The third mini-spoiler 1506 can alternatively be configured and/or controlled to remain in its deployed position when the flaperon 130 is moved toward and/or positioned in the second upward deflected position.

In other examples, the third mini-spoiler 1506 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the flaperon 130 such that movement and/or the position of the third mini-spoiler 1506 is mechanically dependent upon movement and/or the position of the flaperon 130. For example, the third mini-spoiler 1506 can be mechanically slaved (A) to move toward and/or be positioned in its retracted position when the flaperon 130 is moved toward and/or positioned in its neutral (e.g., undeflected) position, (B) to move toward and/or be positioned in its deployed position when the flaperon 130 is moved toward and/or positioned in a first upward deflected position, and (C) to move toward and/or be positioned in its retracted position when the flaperon 130 is moved toward and/or positioned in a second upward deflected position extending beyond the first upward deflected position. The third mini-spoiler 1506 can alternatively be mechanically slaved to remain in its deployed position when the flaperon 130 is moved toward and/or positioned in the second upward deflected position.

In the illustrated example of FIG. 15, the fourth mini-spoiler 1508 is movably coupled to the aileron 132 of the aircraft wing 1500, and is located proximate to the leading edge and/or forward of the trailing edge 150 of the aileron 132 along the upper surface 152 of the aileron 132. The fourth mini-spoiler 1508 includes an example leading edge 1528, an example trailing edge 1530 located opposite to and/or rearward of the leading edge 1528, and an example upper surface 1532 extending between the leading edge 1528 and the trailing edge 1530. The fourth mini-spoiler 1508 is movable (e.g., rotatable and/or deflectable) relative to the upper surface 152 of the aileron 132 between a retracted position in which the upper surface 1532 of the fourth mini-spoiler 1508 is generally aligned with (e.g., is parallel to and/or coplanar with) the upper surface 152 of the aileron 132, and a deployed position in which the upper surface 1532 of the fourth mini-spoiler 1508 is deflected upward (e.g., about a hinge line located proximate to the leading edge 1528 and/or forward of the trailing edge 1530 of the fourth mini-spoiler 1508) relative to the upper surface 152 of the aileron 132.

The fourth mini-spoiler 1508 is configured (e.g., sized and/or shaped) such that a chordwise dimension (e.g., in a fore-aft direction substantially parallel to the longitudinal axis 106) of the upper surface 1532 of the fourth mini-spoiler 1508 measured when the fourth mini-spoiler 1508 is in its retracted position is substantially smaller than a chordwise dimension of the upper surface 152 of the aileron 132 measured when the aileron 132 is in its neutral (e.g., undeflected) position. In some examples, the measured chordwise dimension of the upper surface 1532 of the fourth mini-spoiler 1508 of FIG. 15 is between approximately five percent (5%) and approximately sixty percent (60%) of the measured chordwise dimension of the upper surface 152 of the aileron 132. In some examples, the measured chordwise dimension of the upper surface 1532 of the fourth mini-spoiler 1508 of FIG. 15 is between approximately one percent (1%) and approximately five percent (5%) of a local wing chord measured from the leading edge 113 of the aircraft wing 1500 to the trailing edge 115 of the aircraft wing 1500 at a location local to (e.g., adjacent to and/or overlapping) the fourth mini-spoiler 1508, and with any local leading edge device(s) (e.g., the outboard slat(s) 120) and/or local trailing edge device(s) (e.g., the aileron 132) positioned in its/their respective stowed and/or neutral position(s).

In the illustrated example of FIG. 15, the fourth mini-spoiler 1508 has a substantially planar shape that extends along the upper surface 152 of the aileron 132 in a lateral and/or spanwise direction. As shown in FIG. 15, the spanwise extent of the fourth mini-spoiler 1508 is approximately equal to the spanwise extent of the leading edge of the aileron 132. In other examples, the spanwise extent of the fourth mini-spoiler 1508 can be substantially less than the spanwise extent of the leading edge of the aileron 132.

In some examples, movement of the fourth mini-spoiler 1508 occurs via one or more actuation mechanism(s) coupled to the fourth mini-spoiler 1508 of the aircraft wing 1500, and controlled via one or more control system(s) of an aircraft implementing the aircraft wing 1500. In such examples, the actuation mechanism(s) coupled to the fourth mini-spoiler 1508 can be controlled (e.g., via one or more signal(s), command(s), and/or instruction(s) generated by a dedicated controller) based on movement and/or the position of the aileron 132. For example, the fourth mini-spoiler 1508 can be configured and/or controlled (A) to move toward and/or be positioned in its retracted position when the aileron 132 is moved toward and/or positioned in its neutral (e.g., undeflected) position, (B) to move toward and/or be positioned in its deployed position when the aileron 132 is moved toward and/or positioned in a first upward deflected position, and (C) to move toward and/or be positioned in its retracted position when the aileron 132 is moved toward and/or positioned in a second upward deflected position extending beyond the first upward deflected position. The fourth mini-spoiler 1508 can alternatively be configured and/or controlled to remain in its deployed position when the aileron 132 is moved toward and/or positioned in the second upward deflected position.

In other examples, the fourth mini-spoiler 1508 is mechanically slaved (e.g., via any type and/or any number of engaged mechanical couplings, including gears, clutches, rods, pistons, shafts, links, pulleys, chains, belts, hinges, pins, biasing elements, fasteners, etc.) to one or more actuation mechanism(s) coupled the aileron 132 such that movement and/or the position of the fourth mini-spoiler 1508 is mechanically dependent upon movement and/or the position of the aileron 132. For example, the fourth mini-spoiler 1508 can be mechanically slaved (A) to move toward and/or be positioned in its retracted position when the aileron 132 is moved toward and/or positioned in its neutral (e.g., undeflected) position, (B) to move toward and/or be positioned in its deployed position when the aileron 132 is moved toward and/or positioned in a first upward deflected position, and (C) to move toward and/or be positioned in its retracted position when the aileron 132 is moved toward and/or positioned in a second upward deflected position extending beyond the first upward deflected position. The fourth mini-spoiler 1508 can alternatively be mechanically slaved to remain in its deployed position when the aileron 132 is moved toward and/or positioned in the second upward deflected position.

Figure 16:
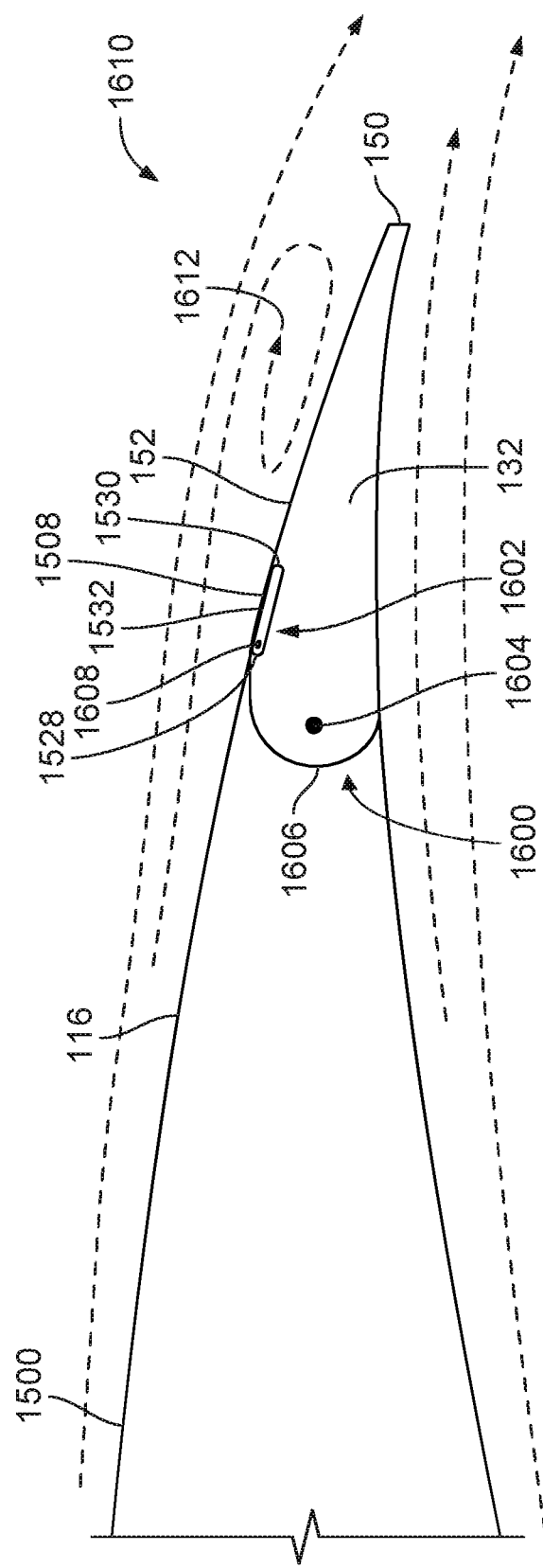
FIG. 16 is a partial cross-sectional view of the aircraft wing of FIG. 15 showing the aileron of FIG. 15 in an example neutral (e.g., undeflected) position, and showing the fourth mini-spoiler of FIG. 15 in an example retracted position.
Figure 17:
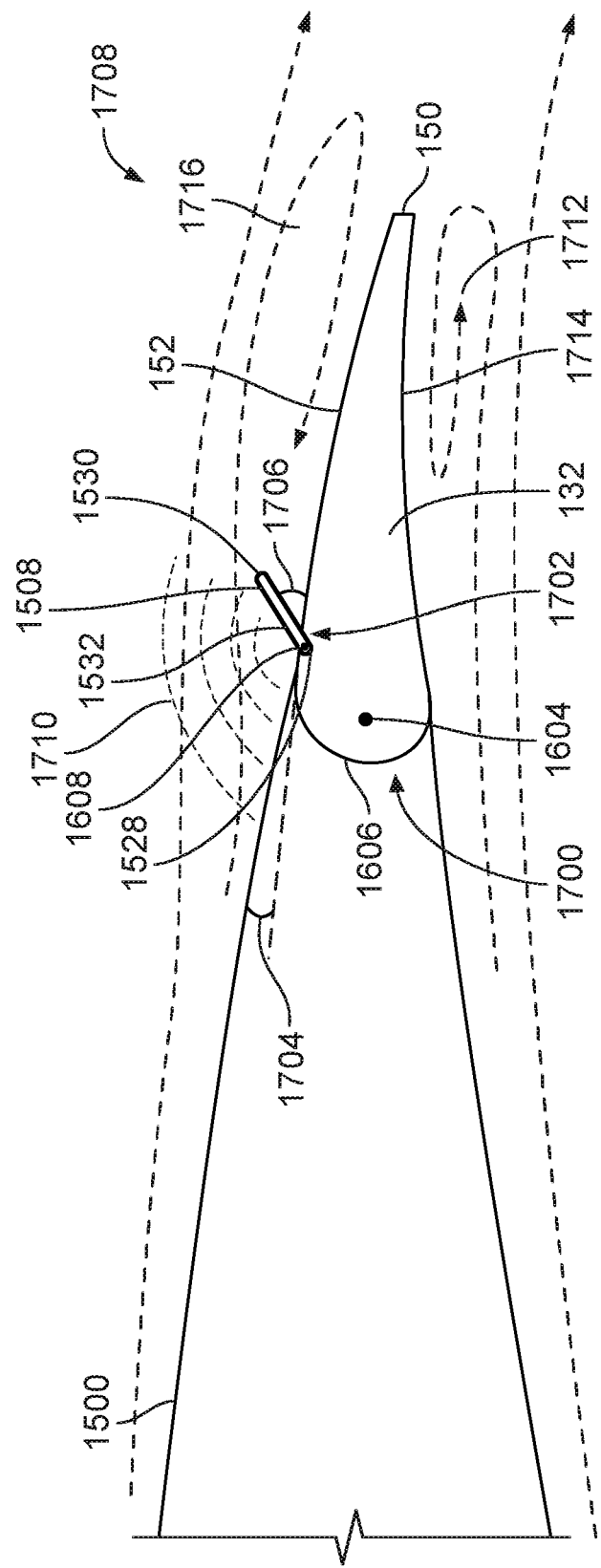
FIG. 17 is a partial cross-sectional view of the aircraft wing of FIGS. 15 and 16 showing the aileron of FIGS. 15 and 16 in a first example upward deflected position, and showing the fourth mini-spoiler of FIGS. 15 and 16 in an example deployed position.
Figure 18:
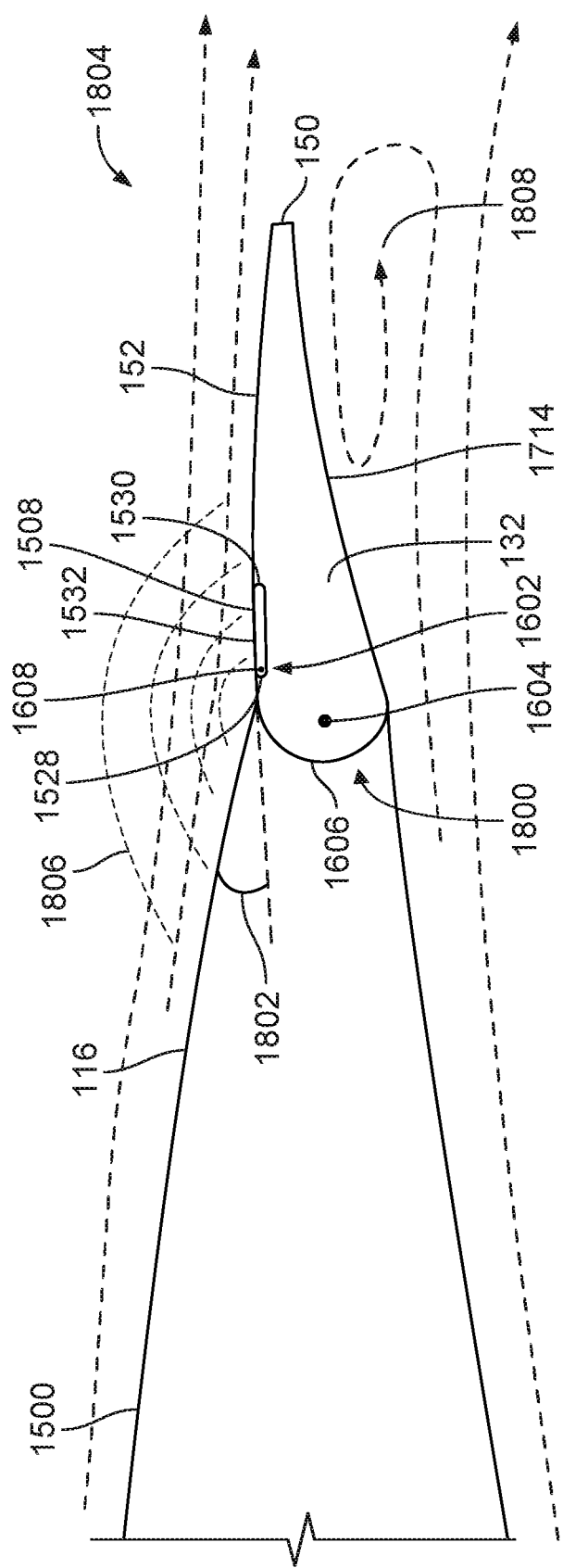
FIG. 18 is a partial cross-sectional view of the aircraft wing of FIGS. 15-17 showing the aileron of FIGS. 15-17 in a second example upward deflected position, and showing the fourth mini-spoiler of FIGS. 15-17 in the retracted position of FIG. 16.

As further described below, FIGS. 16-18 illustrate the fourth mini-spoiler 1508 of the aircraft wing 1500 of FIG. 15 enhancing the effectiveness of the aileron 132 of the aircraft wing 1500 of FIG. 15 as the aileron 132 moves from a neutral position to a first upward deflected position, and from the first upward deflected position to a second upward deflected position extending beyond the first upward deflected position. The description of the flow field of the aileron 132 and the fourth mini-spoiler 1508 of the aircraft wing 1500 of FIG. 15 provided below in connection with FIGS. 16-18 also applies to the flow field of the flaperon 130 and the third mini-spoiler 1506 of the aircraft wing 1500 of FIG. 15.

FIG. 16 is a partial cross-sectional view of the aircraft wing 1500 of FIG. 15 showing the aileron 132 of FIG. 15 in an example neutral (e.g., undeflected) position 1600, and showing the fourth mini-spoiler 1508 of FIG. 15 in an example retracted position 1602. The aileron 132 is movably coupled to the aircraft wing 1500, and is movable (e.g., rotatable and/or deflectable relative to the neutral position 1600) about a first example hinge line 1604 located proximate to an example leading edge 1606 and/or forward of the trailing edge 150 of the aileron 132. When the aileron 132 is in the neutral position 1600, the upper surface 152 of the aileron 132 is generally aligned with (e.g., is parallel to and/or coplanar with) the fixed upper surface 116 of the aircraft wing 1500. The fourth mini-spoiler 1508 is movably coupled to the aileron 132, and is movable (e.g., rotatable and/or deflectable relative to the retracted position 1602) about a second example hinge line 1608 located proximate to the leading edge 1528 and/or forward of the trailing edge 1530 of the fourth mini-spoiler 1508. When the fourth mini-spoiler 1508 is in the retracted position 1602, the upper surface 1532 of the fourth mini-spoiler 1508 is generally aligned with (e.g., is parallel to and/or coplanar with) the upper surface 152 of the aileron 132.

FIG. 16 further illustrates a first example airflow 1610 local to the aileron 132 when an aircraft implementing the aircraft wing 1500 is traveling at high Mach number with the aileron 132 in the neutral position 1600 and the fourth mini-spoiler 1508 in the retracted position 1602. The first airflow 1610 includes a first example flow separation region 1612 located along the upper surface 152 of the aileron 132. The first flow separation region 1612 of the first airflow 1610 of FIG. 16 reduces the lift potential of the aircraft wing 1500. The first airflow 1610 illustrated in FIG. 16 is substantially identical to the first airflow 206 illustrated in FIG. 2 and described above.

FIG. 17 is a partial cross-sectional view of the aircraft wing 1500 of FIGS. 15 and 16 showing the aileron 132 of FIGS. 15 and 16 in a first example upward deflected position 1700, and showing the fourth mini-spoiler 1508 of FIGS. 15 and 16 in an example deployed position 1702. The aileron 132 can be deflected and/or rotated about the first hinge line 1604 from the neutral position 1600 of FIG. 16 to the first upward deflected position 1700 of FIG. 17. When the aileron 132 is in the first upward deflected position 1700, the upper surface 152 of the aileron 132 is oriented at a first example deflection angle 1704 relative to the fixed upper surface 116 of the aircraft wing 1500. In the illustrated example of FIG. 17, the first deflection angle 1704 is approximately five degrees (5°). The fourth mini-spoiler 1508 can be deflected and/or rotated about the second hinge line 1608 from the retracted position 1602 of FIG. 16 to the deployed position 1702 of FIG. 17. When the fourth mini-spoiler 1508 is in the deployed position 1702, the upper surface 1532 of the fourth mini-spoiler 1508 is oriented at an example deployment angle 1706 relative to the upper surface 152 of the aileron 132. In some examples, the deployment angle 1706 is between thirty degrees (30°) and ninety degrees (90°), and preferably between thirty degrees (30°) and sixty degrees (60°). In the illustrated example of FIG. 17, the deployment angle 1706 is approximately forty-five degrees (45°).

FIG. 17 further illustrates a second example airflow 1708 local to the aileron 132 when an aircraft implementing the aircraft wing 1500 is traveling at high Mach number with the aileron 132 in the first upward deflected position 1700 and the fourth mini-spoiler 1508 in the deployed position 1702. The second airflow 1708 of FIG. 17 differs from the first airflow 1610 of FIG. 16. More specifically, the second airflow 1708 of FIG. 17 includes a first example increased pressure region 1710 located along the upper surface 1532 of the fourth mini-spoiler 1508 and/or along the fixed upper surface 116 of the aircraft wing 1500 forward of the fourth mini-spoiler 1508. The second airflow 1708 of FIG. 17 further includes a second example flow separation region 1712 located along an example lower surface 1714 of the aileron 132. The second airflow 1708 of FIG. 17 further includes a third example flow separation region 1716 located along the upper surface 152 of the aileron 132 and having a size and/or an area greater than the size and/or the area of the first flow separation region 1612 of the first airflow 1610 of FIG. 16. In response to the first increased pressure region 1710, the second flow separation region 1712, and the third flow separation region 1716, the aircraft wing 1500 experiences a significant (e.g., measurable) lift reduction, which corresponds to the intended aerodynamic effect of deflecting the aileron 132 upward.

Deployment of the fourth mini-spoiler 1508 while the aileron 132 is positioned at a small upward deflection (e.g., as shown in FIG. 17) advantageously eliminates the adverse reversal of the intended aerodynamic effect that would otherwise occur (e.g., as shown in FIG. 3 described above) in the absence of the fourth mini-spoiler 1508 when the aileron 132 is positioned at the small upward deflection. By eliminating the dead-band associated with the aileron 132 being positioned at small upward deflections, the fourth mini-spoiler 1508 advantageously enhances the effectiveness of the aileron 132.

FIG. 18 is a partial cross-sectional view of the aircraft wing 1500 of FIGS. 15-17 showing the aileron 132 of FIGS. 15-17 in a second example upward deflected position 1800, and showing the fourth mini-spoiler 1508 of FIGS. 15-17 in the retracted position 1602 of FIG. 16. The aileron 132 can be deflected and/or rotated about the first hinge line 1604 from the first upward deflected position 1700 of FIG. 17 to the second upward deflected position 1800 of FIG. 18. When the aileron 132 is in the second upward deflected position 1800, the upper surface 152 of the aileron 132 is oriented at a second example deflection angle 1802 relative to the fixed upper surface 116 of the aircraft wing 1500. The second deflection angle 1802 associated with the second upward deflected position 1800 of FIG. 18 is greater than the first deflection angle 1704 associated with the first upward deflected position 1700 of FIG. 17. In the illustrated example of FIG. 18, the second deflection angle 1802 is approximately fifteen degrees (15°). The fourth mini-spoiler 1508 can be deflected and/or rotated about the second hinge line 1608 from the deployed position 1702 of FIG. 17 to the retracted position 1602 of FIGS. 16 and 18.

FIG. 18 further illustrates a third example airflow 1804 local to the aileron 132 when an aircraft implementing the aircraft wing 1500 is traveling at high Mach number with the aileron 132 in the second upward deflected position 1800 and the fourth mini-spoiler 1508 in the retracted position 1602. The third airflow 1804 of FIG. 18 differs from the second airflow 1708 of FIG. 17. More specifically, the second flow separation region 1712 included in the second airflow 1708 of FIG. 17 is eliminated from and/or is not included in the third airflow 1804 of FIG. 18. Furthermore, the third airflow 1804 of FIG. 18 includes a second example increased pressure region 1806 located along the upper surface 152 of the aileron 132, along the upper surface 1532 of the fourth mini-spoiler 1508, and/or along the fixed upper surface 116 of the aircraft wing 1500 forward of the aileron 132, and having a size and/or an area greater than the size and/or the area of the first increased pressure region 1710 of the second airflow 1708 of FIG. 17. The third airflow 1804 of FIG. 18 further includes a fourth example flow separation region 1808 located along the lower surface 1714 of the aileron 132 and having a size and/or an area greater than the size and/or the area of the second flow separation region 1712 of the second airflow 1708 of FIG. 17. In response to the second increased pressure region 1806 and the fourth flow separation region 1808, the aircraft wing 1500 maintains a significant (e.g., measurable) lift reduction.

Figure 19:
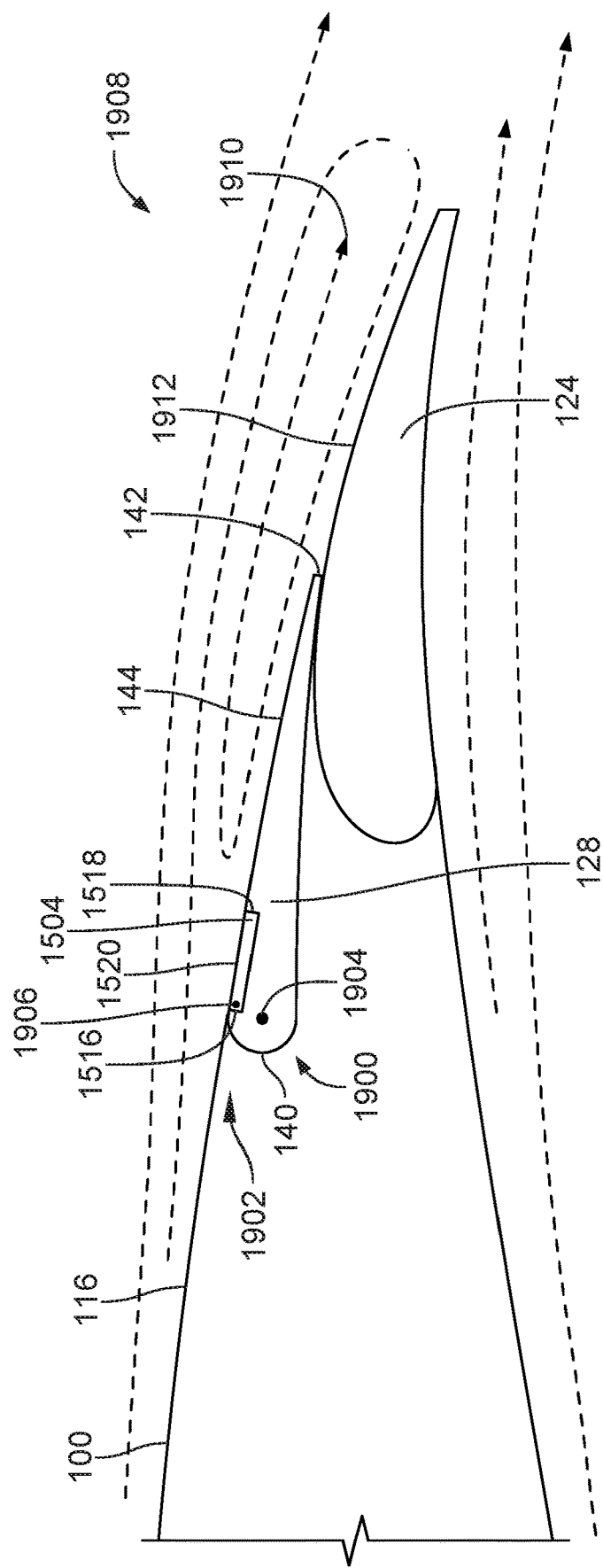
FIG. 19 is a partial cross-sectional view of the aircraft wing of FIG. 15 showing the outboard spoiler of FIG. 15 in an example neutral (e.g., undeflected) position, and showing the second mini-spoiler of FIG. 15 in an example retracted position.
Figure 20:
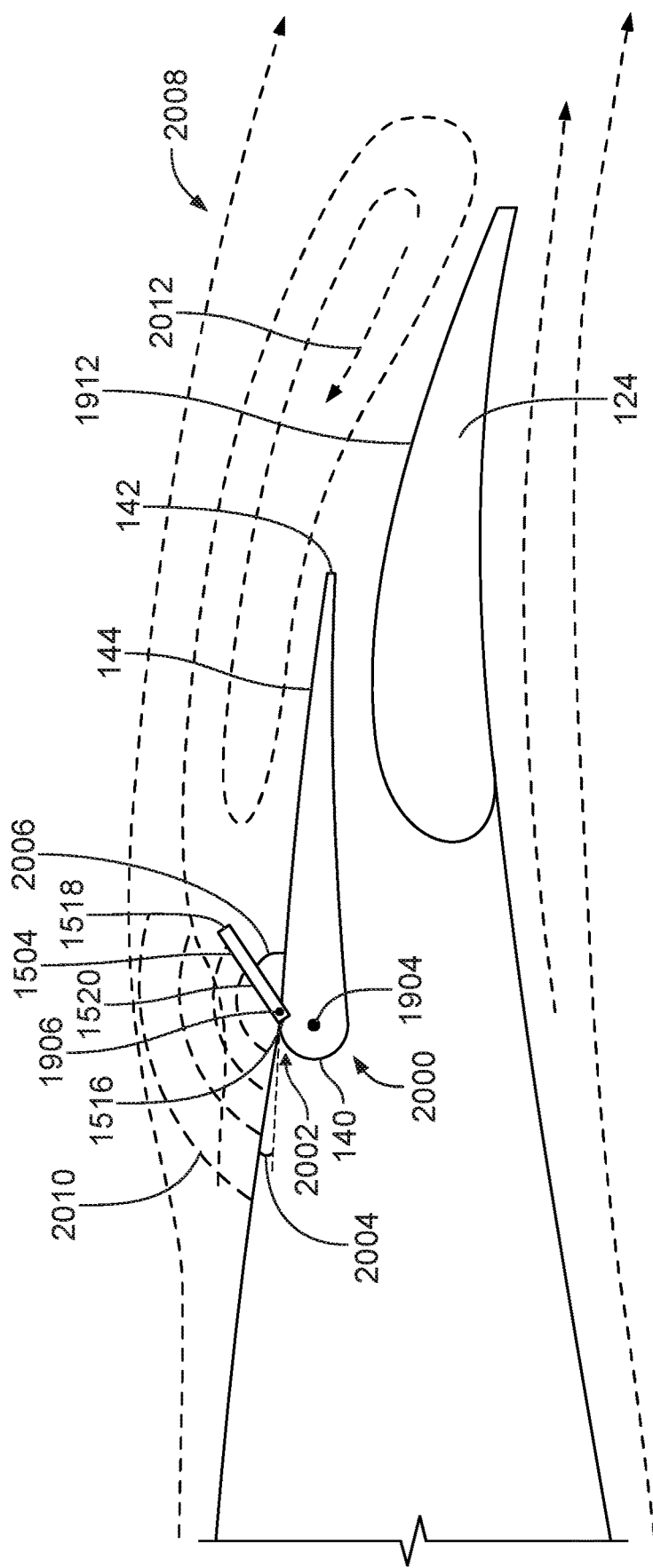
FIG. 20 is a partial cross-sectional view of the aircraft wing of FIGS. 15 and 19 showing the outboard spoiler of FIGS. 15 and 19 in a first example upward deflected position, and showing the second mini-spoiler of FIGS. 15 and 19 in an example deployed position.
Figure 21:
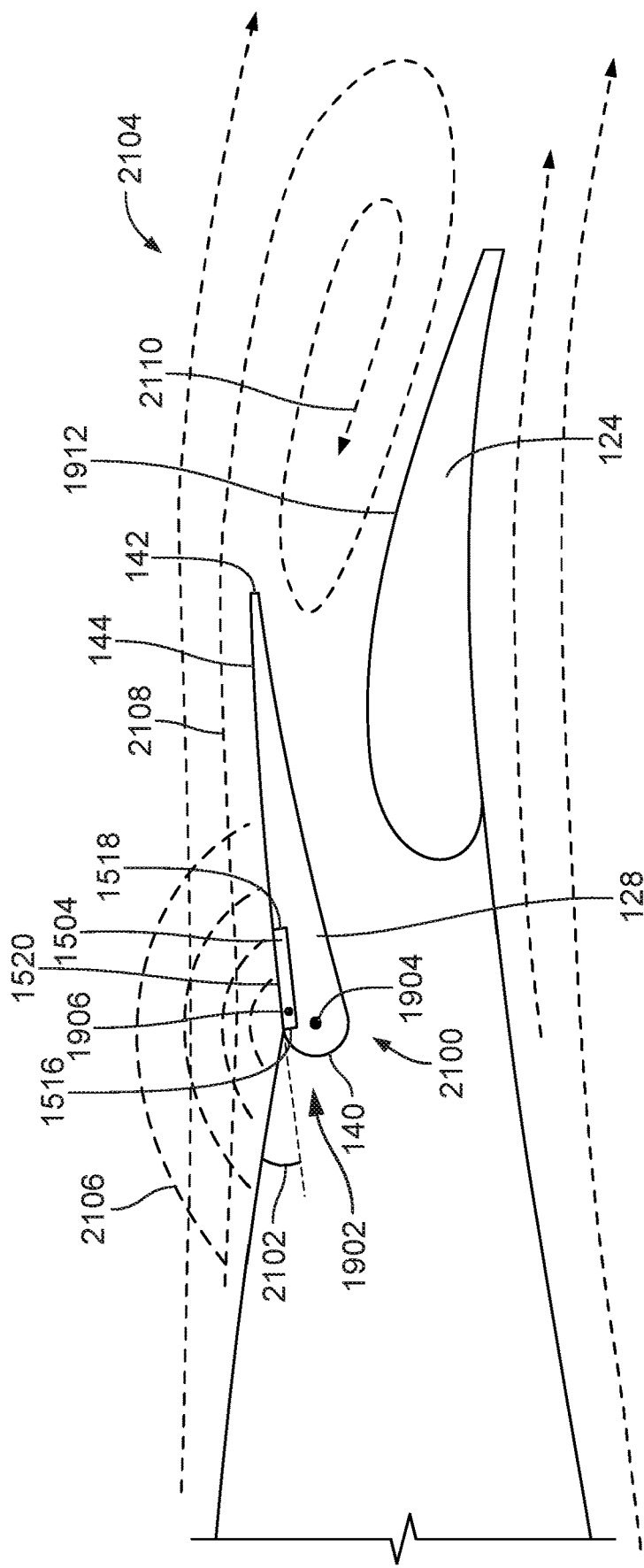
FIG. 21 is a partial cross-sectional view of the aircraft wing of FIGS. 15, 19 and 20 showing the outboard spoiler of FIGS. 15, 19 and 20 in a second example upward deflected position, and showing the second mini-spoiler of FIGS. 15, 19 and 20 in the retracted position of FIG. 19.

As further described below, FIGS. 19-21 illustrate the second mini-spoiler 1504 of the aircraft wing 1500 of FIG. 15 enhancing the effectiveness of the outboard spoiler 128 of the aircraft wing 1500 of FIG. 15 as the outboard spoiler 128 moves from a neutral position to a first upward deflected position, and from the first upward deflected position to a second upward deflected position extending beyond the first upward deflected position. The description of the flow field of the outboard spoiler 128 and the second mini-spoiler 1504 of the aircraft wing 1500 of FIG. 15 provided below in connection with FIGS. 19-21 also applies to the flow field of the inboard spoiler 126 and the first mini-spoiler 1502 of the aircraft wing 1500 of FIG. 15.

FIG. 19 is a partial cross-sectional view of the aircraft wing 1500 of FIG. 15 showing the outboard spoiler of FIG. 15 in an example neutral (e.g., undeflected) position 1900, and showing the second mini-spoiler 1504 of FIG. 15 in an example retracted position 1902. The outboard spoiler 128 is movably coupled to the aircraft wing 1500, and is movable (e.g., rotatable and/or deflectable relative to the neutral position 1900) about a first example hinge line 1904 located proximate to an example leading edge 140 and/or forward of the trailing edge 142 of the outboard spoiler 128. When the outboard spoiler 128 is in the neutral position 1900, the upper surface 144 of the outboard spoiler 128 is generally aligned with (e.g., is parallel to and/or coplanar with) the fixed upper surface 116 of the aircraft wing 1500. The second mini-spoiler 1504 is also movably coupled to the outboard spoiler 128, and is movable (e.g., rotatable and/or deflectable relative to the retracted position 1902) about a second example hinge line 1906 located proximate to the leading edge 1516 and/or forward of the trailing edge 1518 of the second mini-spoiler 1504. When the second mini-spoiler 1504 is in the retracted position 1902, the upper surface 1520 of the second mini-spoiler 1504 is generally aligned with (e.g., is parallel to and/or coplanar with) the upper surface 144 of the outboard spoiler 128.

FIG. 19 further illustrates a first example airflow 1908 local to the outboard spoiler 128 when an aircraft implementing the aircraft wing 1500 is traveling at high Mach number with the outboard spoiler 128 in the neutral position 1900 and the second mini-spoiler 1504 in the retracted position 1902. The first airflow 1908 includes a first example flow separation region 1910 located along the upper surface 144 of the outboard spoiler 128 and along an upper surface 1912 of the outboard flap 124. The first flow separation region 1910 of the first airflow 1908 of FIG. 19 reduces the lift potential of the aircraft wing 1500. The first airflow 1908 illustrated in FIG. 19 is substantially identical to the first airflow 504 illustrated in FIG. 5 and described above.

FIG. 20 is a partial cross-sectional view of the aircraft wing 1500 of FIGS. 15 and 19 showing the outboard spoiler 128 of FIGS. 15 and 19 in a first example upward deflected position 2000, and showing the second mini-spoiler 804 of FIGS. 15 and 19 in an example deployed position 2002. The outboard spoiler 128 can be deflected and/or rotated about the first hinge line 1904 from the neutral position 1900 of FIG. 19 to the first upward deflected position 2000 of FIG. 20. When the outboard spoiler 128 is in the first upward deflected position 2000, the upper surface 144 of the outboard spoiler 128 is oriented at a first example deflection angle 2004 relative to the fixed upper surface 116 of the aircraft wing 1500. In the illustrated example of FIG. 20, the first deflection angle 2004 is approximately five degrees (5°). The second mini-spoiler 1504 can be deflected and/or rotated about the second hinge line 1906 from the retracted position 1902 of FIG. 19 to the deployed position 2002 of FIG. 20. When the second mini-spoiler 1504 is in the deployed position 2002, the upper surface 1520 of the second mini-spoiler 1504 is oriented at an example deployment angle 2006 relative to the upper surface 144 of the outboard spoiler 128. In some examples, the deployment angle 2006 is between thirty degrees (30°) and ninety degrees (90°), and preferably between thirty degrees (30°) and sixty degrees (60°). In the illustrated example of FIG. 20, the deployment angle 2006 is approximately forty-five degrees (45°).

FIG. 20 further illustrates a second example airflow 2008 local to the outboard spoiler 128 when an aircraft implementing the aircraft wing 1500 is traveling at high Mach number with the outboard spoiler 128 in the first upward deflected position 2000 and the second mini-spoiler 1504 in the deployed position 2002. The second airflow 2008 of FIG. 20 differs from the first airflow 1908 of FIG. 19. More specifically, the second airflow 2008 of FIG. 20 includes a first example increased pressure region 2010 located along the upper surface 1520 of the second mini-spoiler 1504 and/or along the fixed upper surface 116 of the aircraft wing 1500 forward of the second mini-spoiler 1504. The second airflow 2008 of FIG. 20 further includes a second example flow separation region 2012 located along the upper surface 144 of the outboard spoiler 128 and along the upper surface 1912 of the outboard flap 124, and having a size and/or an area greater than the size and/or the area of the first flow separation region 1910 of the first airflow 1908 of FIG. 19. In response to the first increased pressure region 2010 and the second flow separation region 2012, the aircraft wing 1500 experiences a significant (e.g., measurable) lift reduction, which corresponds to the intended aerodynamic effect of deflecting the outboard spoiler 128 upward.

Deployment of the second mini-spoiler 1504 while the outboard spoiler 128 is positioned at a small upward deflection (e.g., as shown in FIG. 20) advantageously eliminates the adverse reversal of the intended aerodynamic effect that would otherwise occur (e.g., as shown in FIG. 6 described above) in the absence of the second mini-spoiler 1504 when the outboard spoiler 128 is positioned at the small upward deflection. By eliminating the dead-band associated with the outboard spoiler 128 being positioned at small upward deflections, the second mini-spoiler 1504 advantageously enhances the effectiveness of the outboard spoiler 128.

FIG. 21 is a partial cross-sectional view of the aircraft wing 1500 of FIGS. 15, 19 and 20 showing the outboard spoiler 128 of FIGS. 15, 19 and 20 in a second example upward deflected position 2100, and showing the second mini-spoiler 1504 of FIGS. 15, 19 and 20 in the retracted position 1902 of FIG. 19. The outboard spoiler 128 can be deflected and/or rotated about the first hinge line 1904 from the first upward deflected position 2000 of FIG. 20 to the second upward deflected position 2100 of FIG. 21. When the outboard spoiler 128 is in the second upward deflected position 2100, the upper surface 144 of the outboard spoiler 128 is oriented at a second example deflection angle 2102 relative to the fixed upper surface 116 of the aircraft wing 1500. The second deflection angle 2102 associated with the second upward deflected position 2100 of FIG. 21 is greater than the first deflection angle 2004 associated with the first upward deflected position 2000 of FIG. 20. In the illustrated example of FIG. 21, the second deflection angle 2102 is approximately fifteen degrees (15°). The second mini-spoiler 1504 can be deflected and/or rotated about the second hinge line 1906 from the deployed position 2002 of FIG. 20 to the retracted position 1902 of FIGS. 19 and 21.

FIG. 21 further illustrates a third example airflow 2104 local to the outboard spoiler 128 when an aircraft implementing the aircraft wing 1500 is traveling at high Mach number with the outboard spoiler 128 in the second upward deflected position 2100 and the second mini-spoiler 1504 in the retracted position 1902. The third airflow 2104 of FIG. 21 differs from the second airflow 2008 of FIG. 20. More specifically, the third airflow 2104 includes a second example increased pressure region 2106 located along the upper surface 144 of the outboard spoiler 128, along the upper surface 1520 of the second mini-spoiler 1504, and/or along the fixed upper surface 116 of the aircraft wing 1500 forward of the outboard spoiler 128, and having a size and/or an area greater than the size and/or the area of the first increased pressure region 2010 of the second airflow 2008 of FIG. 20. The third airflow 2104 of FIG. 21 further includes an example flow reattachment region 2108 located along the upper surface 144 of the outboard spoiler 128. The third airflow 2104 of FIG. 21 further includes a third example flow separation region 2110 located along the upper surface 1912 of the outboard flap 124, and having a size and/or an area greater than the size and/or the area of the second flow separation region 2012 of the second airflow 2008 of FIG. 20. In response to the second increased pressure region 2106, the flow reattachment region 2108, and the third flow separation region 2110, the aircraft wing 1500 maintains a significant (e.g., measurable) lift reduction.

Figure 22:
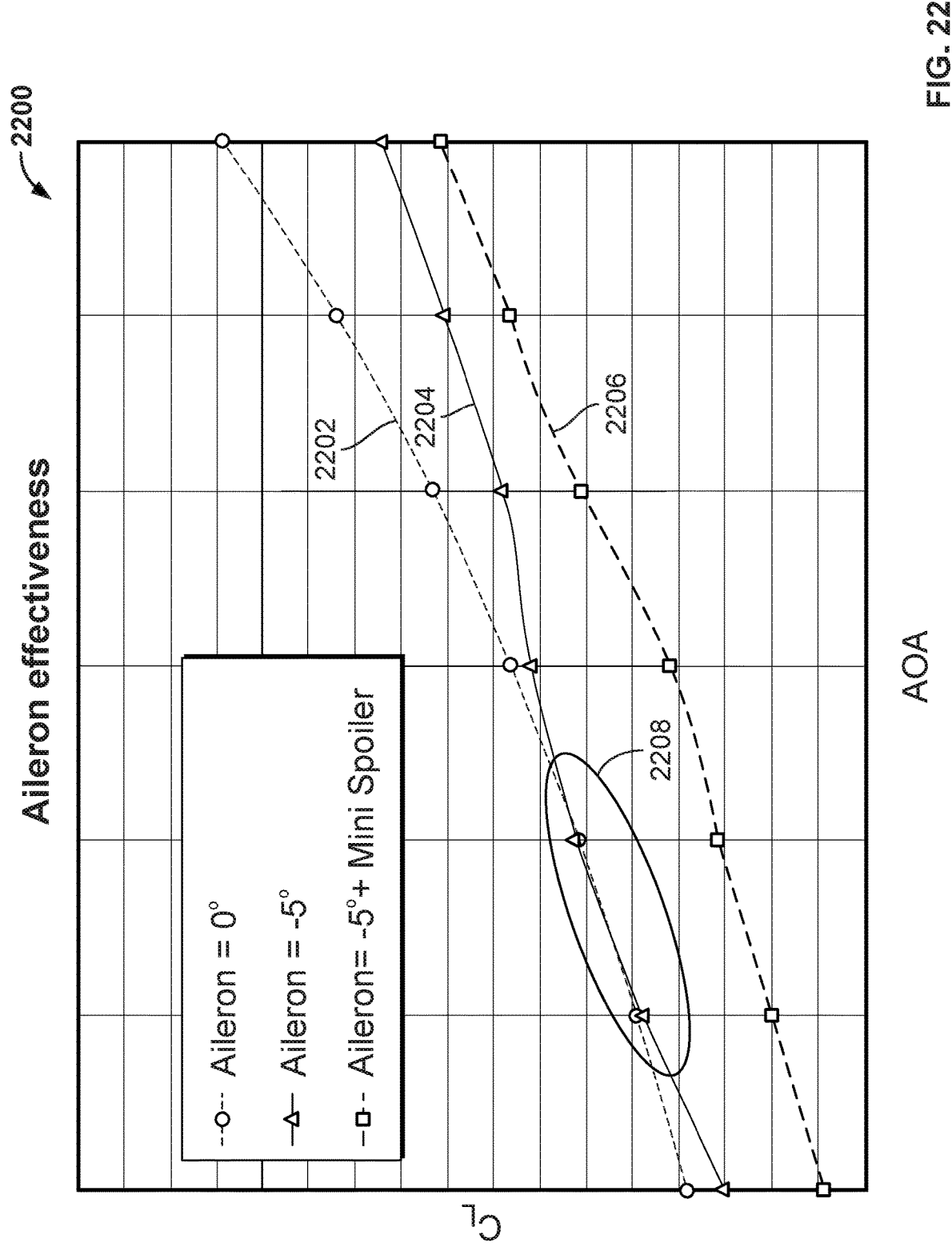
FIG. 22 is an example graph of lift coefficient ($C_L$) as a function of angle of attack (AOA) for a section of an aircraft wing at which an aileron is located.

FIG. 22 is an example graph 2200 of lift coefficient ($C_L$) as a function of angle of attack (AOA) for a section of an aircraft wing at which an aileron is located. A first example plot 2202 of the graph 2200 is provided for an aileron positioned in a neutral (e.g., undeflected) position, with the aileron lacking an associated mini-spoiler. A second example plot 2204 of the graph 2200 is provided for an aileron positioned at a small upward deflection of five degrees, with the aileron lacking an associated mini-spoiler. A third example plot 2206 of the graph 2200 is provided for an aileron positioned at a small upward deflection of five degrees, with the aileron having an associated mini-spoiler positioned in a deployed position.

In the illustrated example of FIG. 22, the second plot 2204 includes an example dead-band region 2208 (e.g., a region at which the lift coefficient associated with the second plot 2204 is at or near the lift coefficient associated with the first plot 2202 for a given angle of attack) corresponding to an adverse reversal of an intended aerodynamic effect of deflecting the aileron at the small upward deflection. In contrast, the third plot 2206 lacks such a dead-band region. Deployment of the mini-spoiler while the aileron is positioned at the small upward deflection accordingly eliminates the adverse reversal of the intended aerodynamic effect that would otherwise occur in the absence of the mini-spoiler when the aileron is positioned at the small upward deflection. By eliminating the dead-band region 2208 associated with the aileron being positioned at the small upward deflection, the mini-spoiler advantageously enhances the effectiveness of the aileron.

Figure 23:
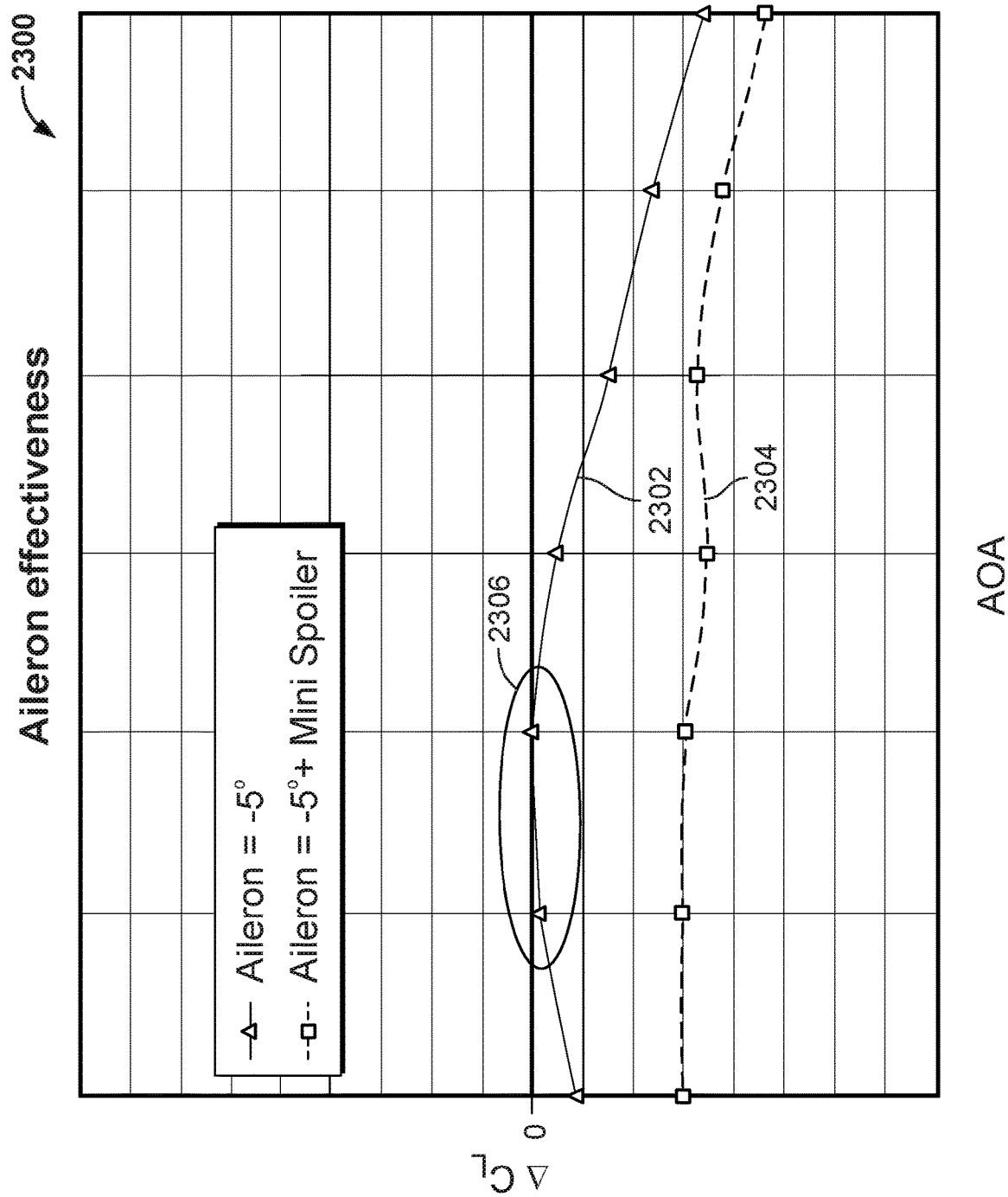
FIG. 23 is an example graph of change in lift coefficient ($\Delta C_L$) as a function of angle of attack (AOA) for a section of an aircraft wing at which an aileron is located.

FIG. 23 is an example graph 2300 of change in lift coefficient ($\Delta C_L$) as a function of angle of attack (AOA) for a section of an aircraft wing at which an aileron is located. A first example plot 2302 of the graph 2300 is provided for an aileron positioned at a small upward deflection of five degrees, with the aileron lacking an associated mini-spoiler. A second example plot 2304 of the graph 2300 is provided for an aileron positioned at a small upward deflection of five degrees, with the aileron having an associated mini-spoiler positioned in a deployed position. The first plot 2302 of the graph 2300 of FIG. 23 is derived from the difference between the second plot 2204 and first plot 2202 of the graph 2200 of FIG. 22 described above. The second plot 2304 of the graph 2300 of FIG. 23 is derived from the difference between the third plot 2206 and the first plot 2202 of the graph 2200 of FIG. 22 described above.

In the illustrated example of FIG. 23, the first plot 2302 includes an example dead-band region 2306 (e.g., a region at which the change in lift coefficient associated with the first plot 2302 is near or at zero) corresponding to an adverse reversal of an intended aerodynamic effect of deflecting the aileron at the small upward deflection. In contrast, the second plot 2304 lacks such a dead-band region. Deployment of the mini-spoiler while the aileron is positioned at the small upward deflection accordingly eliminates the adverse reversal of the intended aerodynamic effect that would otherwise occur in the absence of the mini-spoiler when the aileron is positioned at the small upward deflection. By eliminating the dead-band region 2306 associated with the aileron being positioned at the small upward deflection, the mini-spoiler advantageously enhances the effectiveness of the aileron.

Figure 24:
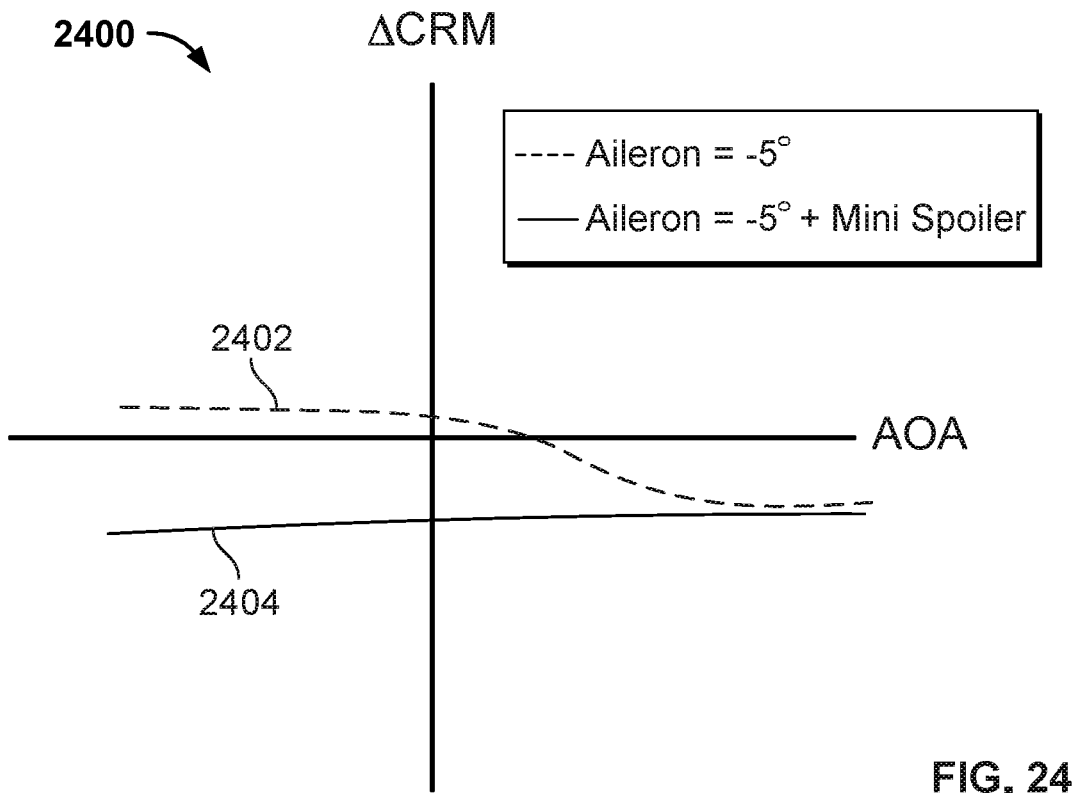
FIG. 24 is an example graph of change in rolling moment coefficient ($\Delta$CRM) as a function of angle of attack (AOA) for a section of an aircraft wing at which an aileron is located.

FIG. 24 is an example graph 2400 of change in rolling moment coefficient (ΔCRM) as a function of angle of attack (AOA) for a section of an aircraft wing at which an aileron is located. A first example plot 2402 of the graph 2400 is provided for an aileron positioned at a small upward deflection of five degrees, with the aileron lacking an associated mini-spoiler. A second example plot 2404 of the graph 2400 is provided for an aileron positioned at a small upward deflection of five degrees, with the aileron having an associated mini-spoiler positioned in a deployed position.

In the illustrated example of FIG. 24, the change in rolling moment coefficient associated with the first plot 2402 decreases as the angle of attack associated with the first plot 2402 increases. In contrast, the change in rolling moment coefficient associated with the second plot 2404 remains substantially constant as the angle of attack associated with the second plot 2404 increases. Deployment of the mini-spoiler while the aileron is positioned at the small upward deflection accordingly reduces variance in and/or stabilizes the change in rolling moment coefficient over a range of angles of attack, thereby enhancing the effectiveness of the aileron.

Figure 25:
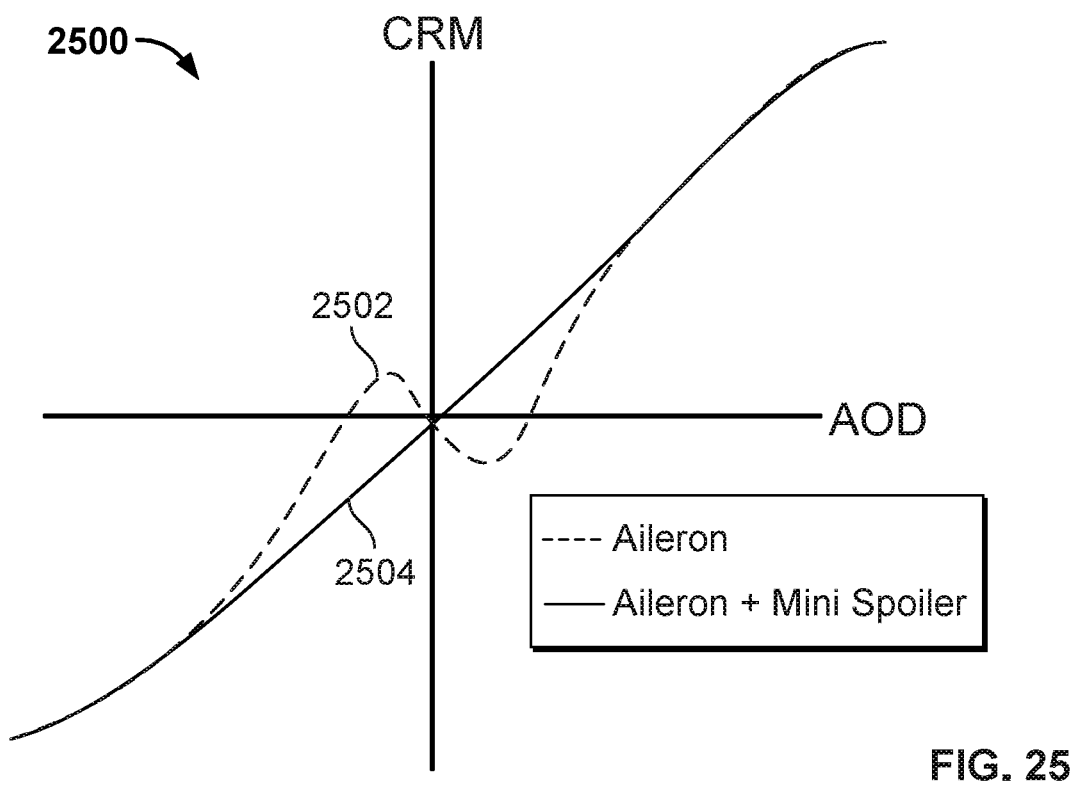
FIG. 25 is an example graph of rolling moment coefficient (CRM) as a function of angle of deflection (AOD) of an aileron for a section of an aircraft wing at which an aileron is located.

FIG. 25 is an example graph 2500 of rolling moment coefficient (CRM) as a function of angle of deflection (AOD) of an aileron for a section of an aircraft wing at which an aileron is located. A first example plot 2502 of the graph 2500 is provided for an aileron lacking an associated mini-spoiler. A second example plot 2504 of the graph 2500 is provided for an aileron having an associated mini-spoiler positioned in a deployed position.

In the illustrated example of FIG. 25, the rolling moment coefficient associated with the first plot 2502 is non-linear over a range of small angles of deflection of the aileron, and becomes linear at relatively larger angles of deflection of the aileron beyond the range of small angles. In contrast, the rolling moment coefficient associated with the second plot 2504 remains substantially linear over both smaller and relatively larger angles of deflection of the aileron. Deployment of the mini-spoiler while the aileron is positioned at small angles of deflection accordingly reduces variance in and/or stabilizes the rolling moment coefficient over a range of angles of deflection of the aileron, thereby enhancing the effectiveness of the aileron.

Figure 26:
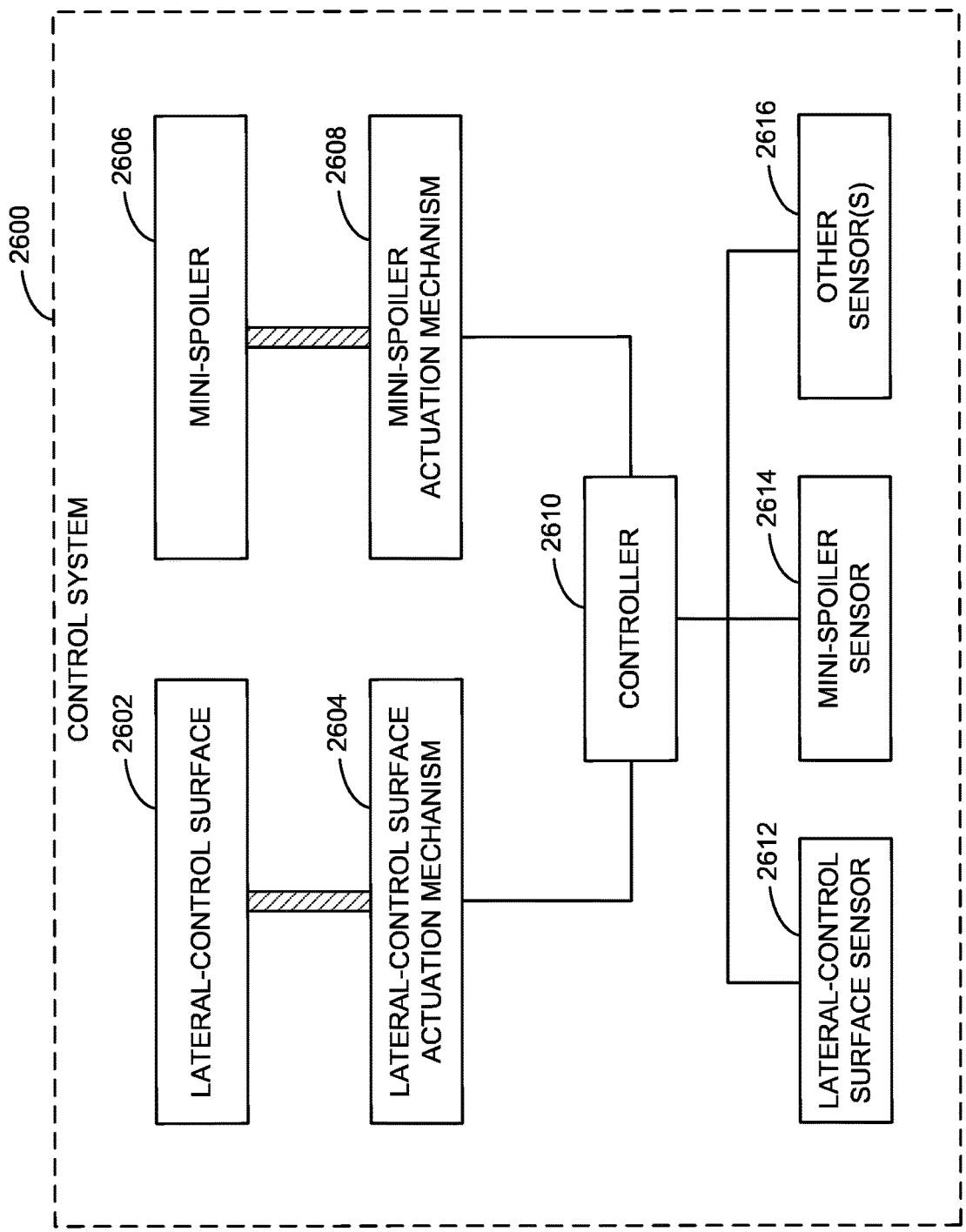
FIG. 26 is a block diagram of a first example control system configured to control the movement of a mini-spoiler associated with a lateral-control surface of an aircraft wing.

FIG. 26 is a block diagram of a first example control system 2600 configured to control the movement of a mini-spoiler associated with a lateral-control surface of an aircraft wing. The control system 2600 of FIG. 26 includes an example lateral-control surface 2602, an example lateral-control surface actuation mechanism 2604, an example mini-spoiler 2606, an example mini-spoiler actuation mechanism 2608, an example controller 2610, an example lateral-control surface sensor 2612, and an example mini-spoiler sensor 2614. The control system 2600 of FIG. 26 can also include one or more example other sensor(s) 2616 including, for example, one or more lift-control surface sensor(s) (e.g., an inboard slat sensor, an outboard slat sensor, an inboard flap sensor, an outboard flap sensor, etc.), an angle of attack sensor, an attitude sensor, an altitude sensor, an airspeed sensor, a Mach number sensor, etc.

In the illustrated example of FIG. 26, the lateral-control surface actuation mechanism 2604 is operatively coupled to the lateral-control surface 2602. The mini-spoiler actuation mechanism 2608 is operatively coupled to the mini-spoiler 2606. The controller 2610 is operatively coupled to the lateral-control surface actuation mechanism 2604 as well as the mini-spoiler actuation mechanism 2608. The lateral-control surface sensor 2612, the mini-spoiler sensor 2614, and the other sensor(s) 2616 are respectively operatively coupled to the controller 2610. In the illustrated example of FIG. 26, the lateral-control surface actuation mechanism 2604 and the mini-spoiler actuation mechanism 2608 are configured such that the respective operations of the lateral-control surface actuation mechanism 2604 and the mini-spoiler actuation mechanism 2608 can be performed independently from one another, with such operations being independently controlled via the controller 2610 of the control system 2600.

The control system 2600 of FIG. 26 can be implemented in an aircraft including the aircraft wing 800 of FIGS. 8-14, or the aircraft wing 1500 of FIGS. 15-21. For example, the lateral-control surface 2602 of the control system 2600 can be implemented by and/or as any of the lateral-control surfaces (e.g., the inboard spoiler 126, the outboard spoiler 128, the flaperon 130, or the aileron 132) of the aircraft wing 800 of FIGS. 8-14, or by and/or as any of the lateral-control surfaces (e.g., the inboard spoiler 126, the outboard spoiler 128, the flaperon 130, or the aileron 132) of the aircraft wing 1500 of FIGS. 15-21. As another example, the mini-spoiler 2606 of the control system 2600 can be implemented by and/or as any of the mini-spoilers (e.g., the first mini-spoiler 802, the second mini-spoiler 804, the third mini-spoiler 806, or the fourth mini-spoiler 808) of the aircraft wing 800 of FIGS. 8-14, or by and/or as any of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21.

The lateral-control surface 2602 and the mini-spoiler 2606 of the control system 2600 of FIG. 26 are preferably implemented by and/or as a lateral-control surface and a mini-spoiler that are associated (e.g., positionally and/or functionally associated) with one another. For example, the lateral-control surface 2602 of FIG. 26 can be implemented by and/or as the inboard spoiler 126 of the aircraft wing 800 of FIGS. 8-14, and the mini-spoiler 2606 of FIG. 26 can be implemented by and/or as one of the first mini-spoiler 802 of the aircraft wing 800 of FIGS. 8-14 located forward of the inboard spoiler 126. As another example, the lateral-control surface 2602 of FIG. 26 can be implemented by and/or as the outboard spoiler 128 of the aircraft wing 800 of FIGS. 8-14, and the mini-spoiler 2606 of FIG. 26 can be implemented by and/or as the second mini-spoiler 804 of the aircraft wing 800 of FIGS. 8-14 located forward of the outboard spoiler 128. As another example, the lateral-control surface 2602 of FIG. 26 can be implemented by and/or as the flaperon 130 of the aircraft wing 800 of FIGS. 8-14, and the mini-spoiler 2606 of FIG. 26 can be implemented by and/or as the third mini-spoiler 806 of the aircraft wing 800 of FIGS. 8-14 located forward of the flaperon 130. As another example, the lateral-control surface 2602 of FIG. 26 can be implemented by and/or as the aileron 132 of the aircraft wing 800 of FIGS. 8-14, and the mini-spoiler 2606 of FIG. 26 can be implemented by and/or as the fourth mini-spoiler 808 of the aircraft wing 800 of FIGS. 8-14 located forward of the aileron 132.

As another example, the lateral-control surface 2602 of FIG. 26 can be implemented by and/or as the inboard spoiler 126 of the aircraft wing 1500 of FIGS. 15-21, and the mini-spoiler 2606 of FIG. 26 can be implemented by and/or as the first mini-spoiler 1502 of the aircraft wing 1500 of FIGS. 15-21 located on the inboard spoiler 126. As another example, the lateral-control surface 2602 of FIG. 26 can be implemented by and/or as the outboard spoiler 128 of the aircraft wing 1500 of FIGS. 15-21, and the mini-spoiler 2606 of FIG. 26 can be implemented by and/or as the second mini-spoiler 1504 of the aircraft wing 1500 of FIGS. 15-21 located on the outboard spoiler 128. As another example, the lateral-control surface 2602 of FIG. 26 can be implemented by and/or as the flaperon 130 of the aircraft wing 1500 of FIGS. 15-21, and the mini-spoiler 2606 of FIG. 26 can be implemented by and/or as the third mini-spoiler 1506 of the aircraft wing 1500 of FIGS. 15-21 located on the flaperon 130. As another example, the lateral-control surface 2602 of FIG. 26 can be implemented by and/or as the aileron 132 of the aircraft wing 1500 of FIGS. 15-21, and the mini-spoiler 2606 of FIG. 26 can be implemented by and/or as the fourth mini-spoiler 1508 of the aircraft wing 1500 of FIGS. 15-21 located on the aileron 132.

The lateral-control surface actuation mechanism 2604 of the control system 2600 of FIG. 26 can be located (e.g., partially or fully located) within and/or on the aircraft wing 800 of FIGS. 8-14 or the aircraft wing 1500 of FIGS. 15-21, and may include portions and/or components located within and/or on the fuselage of the aircraft implementing the aircraft wing 800 of FIGS. 8-14 or the aircraft wing 1500 of FIGS. 15-21. The lateral-control surface actuation mechanism 2604 of FIG. 26 can be implemented by and/or as any number and/or type of actuation mechanism capable of being configured to fit partially and/or fully within or on an aircraft wing (e.g., the aircraft wing 800 of FIGS. 8-14, the aircraft wing 1500 of FIGS. 15-21, etc.) to which the lateral-control surface 2602 of FIG. 26 is movably coupled, and capable of being configured to move (e.g., rotate and/or deflect) the lateral-control surface 2602 of FIG. 26 over a desired and/or specified range of positions.

In some examples, the lateral-control surface actuation mechanism 2604 of FIG. 26 can be implemented by and/or as an electro-mechanical actuation system that includes one or more electronic component(s). In other examples, the lateral-control surface actuation mechanism 2604 of FIG. 26 can be implemented by and/or as a hydro-mechanical actuation system that includes one or more hydraulic component(s). In still other examples, the lateral-control surface actuation mechanism 2604 of FIG. 26 can be implemented by and/or as a pneumatic-mechanical actuation system that includes one or more pneumatic component(s). The lateral-control surface actuation mechanism 2604 of FIG. 26 can include any number and/or type of mechanical components including, for example, any number and/or type of actuators, motors, valves, gears, clutches, latches, pistons, rods, shafts, links, pulleys, chains, belts, hinges, pins, biasing elements, shape memory alloys, etc.

The mini-spoiler actuation mechanism 2608 of the control system 2600 of FIG. 26 can be located (e.g., partially or fully located) within and/or on the aircraft wing 800 of FIGS. 8-14 or the aircraft wing 1500 of FIGS. 15-21, and may include portions and/or components located within and/or on the fuselage of the aircraft implementing the aircraft wing 800 of FIGS. 8-14 or the aircraft wing 1500 of FIGS. 15-21. The mini-spoiler actuation mechanism 2608 of FIG. 26 can be implemented by and/or as any number and/or any type of actuation mechanism capable of being configured to fit partially and/or fully within or on an aircraft wing (e.g., the aircraft wing 800 of FIGS. 8-14, the aircraft wing 1500 of FIGS. 15-21, etc.) to which the mini-spoiler 2606 of FIG. 26 is movably coupled, and capable of being configured to move (e.g., rotate and/or deflect) the mini-spoiler 2606 of FIG. 26 over a desired and/or specified range of positions.

In some examples, the mini-spoiler 2606 of the control system 2600 of FIG. 26 is movably coupled to the lateral-control surface 2602 of the control system 2600 of FIG. 26. In such examples, the mini-spoiler actuation mechanism 2608 of the control system 2600 of FIG. 26 can be located (e.g., partially or fully located) within and/or on the lateral-control surface 2602 of the control system 2600 of FIG. 26. In such examples, the mini-spoiler actuation mechanism 2608 of FIG. 26 can be implemented by and/or as any number and/or of actuation mechanism capable of being configured to fit partially and/or fully within or on the lateral-control surface 2602 of FIG. 26 to which the mini-spoiler 2606 of FIG. 26 is movably coupled, and capable of being configured to move (e.g., rotate and/or deflect) the mini-spoiler 2606 of FIG. 26 over a desired and/or specified range of positions.

In some examples, the mini-spoiler actuation mechanism 2608 of FIG. 26 can be implemented by and/or as an electro-mechanical actuation system that includes one or more electronic component(s). In other examples, the mini-spoiler actuation mechanism 2608 of FIG. 26 can be implemented by and/or as a hydro-mechanical actuation system that includes one or more hydraulic component(s). In still other examples, the mini-spoiler actuation mechanism 2608 of FIG. 26 can be implemented by and/or as a pneumatic-mechanical actuation system that includes one or more pneumatic component(s). The mini-spoiler actuation mechanism 2608 of FIG. 26 can include any number and/or type of mechanical components including, for example, any number and/or type of actuators, motors, valves, gears, clutches, latches, pistons, rods, shafts, links, pulleys, chains, belts, hinges, pins, biasing elements, shape memory alloys, etc.

The controller 2610 of the control system 2600 of FIG. 26 can be located (e.g., partially or fully located) within and/or on the aircraft wing 800 of FIGS. 8-14 or the aircraft wing 1500 of FIGS. 15-21, or within and/or on the fuselage of the aircraft implementing the aircraft wing 800 of FIGS. 8-14 or the aircraft wing 1500 of FIGS. 15-21. The controller 2610 of FIG. 26 can be implemented by and/or as any number and/or type of hardware element capable of being configured to control the lateral-control surface actuation mechanism 2604 and/or the mini-spoiler actuation mechanism 2608 of the control system 2600 of FIG. 26, and/or capable of being configured to receive and/or process data sensed, measured and/or detected by the lateral-control surface sensor 2612, the mini-spoiler sensor 2614, and/or the other sensor(s) 2616 of the control system 2600 of FIG. 26. The controller 2610 of FIG. 26 can be implemented by one or more controller(s), processor(s), microcontroller(s), microprocessor(s), and/or circuit(s). In some examples, the controller 2610 can include a first controller dedicated to control the lateral-control surface actuation mechanism 2604 of the control system 2600 of FIG. 26, and a second dedicated controller configured to independently control the mini-spoiler actuation mechanism 2608 of the control system 2600 of FIG. 26.

The lateral-control surface sensor 2612 of the control system 2600 of FIG. 26 can be located on the lateral-control surface 2602 of FIG. 26. For example, the lateral-control surface sensor 2612 of FIG. 26 can be located on any of the lateral-control surfaces (e.g., the inboard spoiler 126, the outboard spoiler 128, the flaperon 130, or the aileron 132) of the aircraft wing 800 of FIGS. 8-14 or the aircraft wing 1500 of FIGS. 15-21. The lateral-control surface sensor 2612 of FIG. 26 is configured to sense, measure and/or detect the position and/or angle (e.g., relative to a reference location and/or orientation) of the lateral-control surface 2602 of FIG. 26. For example, the lateral-control surface sensor 2612 of FIG. 26 can be configured to sense, measure and/or detect the position and/or angle (e.g., relative to a reference location and/or orientation) of one of the lateral-control surfaces (e.g., the inboard spoiler 126, the outboard spoiler 128, the flaperon 130, or the aileron 132) of the aircraft wing 800 of FIGS. 8-14 or the aircraft wing 1500 of FIGS. 15-21.

The mini-spoiler sensor 2614 of the control system 2600 of FIG. 26 can be located on the mini-spoiler 2606 of FIG. 26. For example, the mini-spoiler sensor 2614 can be located on any of the mini-spoilers (e.g., the first mini-spoiler 802, the second mini-spoiler 804, the third mini-spoiler 806, or the fourth mini-spoiler 808) of the aircraft wing 800 of FIGS. 8-14, or on any of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21. The mini-spoiler sensor 2614 of FIG. 26 is configured to sense, measure and/or detect the position and/or angle (e.g., relative to a reference location and/or orientation) of the mini-spoiler 2606 of FIG. 26. For example, the mini-spoiler sensor 2614 of FIG. 26 can be configured to sense, measure and/or detect the position and/or angle (e.g., relative to a reference location and/or orientation) of one of the mini-spoilers (e.g., the first mini-spoiler 802, the second mini-spoiler 804, the third mini-spoiler 806, or the fourth mini-spoiler 808) of the aircraft wing 800 of FIGS. 8-14, or one of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21.

The other sensor(s) 2616 of the control system 2600 of FIG. 26 can be located within and/or on the aircraft wing 800 of FIGS. 8-14 or the aircraft wing 1500 of FIGS. 15-21, and/or may include portions and/or components located within and/or on the fuselage of the aircraft implementing the aircraft wing 800 of FIGS. 8-14 or the aircraft wing 1500 of FIGS. 15-21. For example, the other sensor(s) 2616 of FIG. 26 can include one or more lift-control surface sensor(s) located on any of the lift-control surfaces (e.g., the inboard slat 118, the outboard slats 120, the inboard flap 122, or the outboard flap 124) of the aircraft wing 800 of FIGS. 8-14 or the aircraft wing 1500 of FIGS. 15-21. In such an example, the lift-control surface sensor(s) can be configured to sense, measure and/or detect the position and/or angle (e.g., relative to a reference location and/or orientation) of one or more of the lift-control surfaces (e.g., the inboard slats 118, the outboard slats 120, the inboard flap 122, or the outboard flap 124) of the aircraft wing 800 of FIGS. 8-14 or the aircraft wing 1500 of FIGS. 15-21. The other sensor(s) 2616 of FIG. 26 can additionally or alternatively include one or more angle of attack sensor(s), one or more attitude sensor(s), one or more altitude sensor(s), one or more airspeed sensor(s), and/or one or more Mach number sensor(s) respectively configured to sense, measure and/or detect one or more other parameter(s) associated with an aircraft implementing the aircraft wing 800 of FIGS. 8-14 or the aircraft wing 1500 of FIGS. 15-21. Such other parameter(s) can include, for example, an angle of attack (e.g., an angle between a chord line of an aircraft wing and a relative direction of airflow against the aircraft wing) of the aircraft wing 800 of FIGS. 8-14 or the aircraft wing 1500 of FIGS. 15-21 (e.g., the angle between the chord line of the aircraft wing and the relative direction of airflow against the aircraft wing), and/or any an attitude, an altitude, an airspeed, or a Mach number of an aircraft implementing the aircraft wing 800 of FIGS. 8-14 or the aircraft wing 1500 of FIGS. 15-21.

The lateral-control surface 2602 of FIG. 26 can be moved (e.g., rotated and/or deflected) in a controlled manner to any number of positions over a possible range of positions of the lateral-control surface 2602. The controlled movement(s) of the lateral-control surface 2602 occur(s) via the lateral-control surface actuation mechanism 2604 of the control system 2600 of FIG. 26, with the lateral-control surface actuation mechanism 2604 being managed and/or controlled via the controller 2610 of the control system 2600. The controller 2610 generates and/or transmits one or more signal(s), command(s), and/or instruction(s) that cause(s) the lateral-control surface actuation mechanism 2604 to move the lateral-control surface 2602 to one or more position(s) (e.g., a neutral position, a first upward deflected position, a second upward deflected position extending beyond the first upward deflected position, etc.) specified by, indicated by, and/or derived from the signal(s), command(s), and/or instruction(s).

In some examples, the controller 2610 is configured to generate one or more signal(s), command(s), and/or instruction(s) that cause(s) the lateral-control surface actuation mechanism 2604 to move the lateral-control surface 2602 to a specified position in response to the controller 2610 determining and/or detecting that a threshold parameter associated with the position of the lateral-control surface 2602, the position of the mini-spoiler 2606 and/or, more generally, the operation of the aircraft implementing the control system 2600 of FIG. 26 has been sensed, measured and/or detected by one or more of the lateral-control surface sensor 2612, the mini-spoiler sensor 2614, and/or the other sensor(s) 2616 of the control system 2600 of FIG. 26.

The mini-spoiler 2606 of FIG. 26 can be moved (e.g., rotated and/or deflected) in a controlled manner to any number of positions over a possible range of positions of the mini-spoiler 2606. The controlled movement(s) of the mini-spoiler 2606 occur(s) via the mini-spoiler actuation mechanism 2608 of the control system 2600 of FIG. 26, with the mini-spoiler actuation mechanism 2608 being managed and/or controlled via the controller 2610 of the control system 2600. The controller 2610 generates and/or transmits one or more signal(s), command(s), and/or instruction(s) that cause(s) the mini-spoiler actuation mechanism 2608 to move the mini-spoiler 2606 to one or more position(s) (e.g., a retracted position, a deployed position, etc.) specified by, indicated by, and/or derived from the signal(s), command(s), and/or instruction(s).

In some examples, the controller 2610 is configured to generate one or more signal(s), command(s), and/or instruction(s) that cause(s) the mini-spoiler actuation mechanism 2608 to move the mini-spoiler 2606 to a specified position in response to the controller 2610 determining and/or detecting that the lateral-control surface 2602 of FIG. 26 is moving from one position to or toward another position. For example, the controller 2610 can be configured to generate one or more signal(s), command(s), and/or instruction(s) that cause(s) the mini-spoiler actuation mechanism 2608 to move the mini-spoiler 2606 from a retracted position to a deployed position in response to the controller 2610 determining and/or detecting that the lateral-control surface 2602 of FIG. 26 is moving from a neutral position to or toward a first upward deflected position. The controller 2610 can further be configured to generate one or more signal(s), command(s), and/or instruction(s) that cause(s) the mini-spoiler actuation mechanism 2608 to move the mini-spoiler 2606 from the deployed position to the retracted position in response to the controller 2610 determining and/or detecting that the lateral-control surface 2602 of FIG. 26 is moving from the first upward deflected position to or toward a second upward deflected position extending beyond the first upward deflected position. The controller 2610 can alternatively be configured to generate one or more signal(s), command(s), and/or instruction(s) that cause(s) the mini-spoiler actuation mechanism 2608 to maintain the mini-spoiler 2606 in its deployed position in response to the controller 2610 determining and/or detecting that the lateral-control surface 2602 of FIG. 26 is moving from the first upward deflected position to or toward the second upward deflected position.

FIG. 27 is a block diagram of a second example control system 2700 configured to control the movement of a mini-spoiler associated with a lateral-control surface of an aircraft wing. The control system 2700 of FIG. 27 includes an example lateral-control surface 2702, an example lateral-control surface actuation mechanism 2704, an example mini-spoiler 2706, an example controller 2708, an example lateral-control surface sensor 2710, and an example mini-spoiler sensor 2712. The control system 2700 of FIG. 27 can also include one or more example other sensor(s) 2714 including, for example, one or more lift-control surface sensor(s) (e.g., an inboard slat sensor, an outboard slat sensor, an inboard flap sensor, an outboard flap sensor, etc.), an angle of attack sensor, an attitude sensor, an altitude sensor, an airspeed sensor, a Mach number sensor, etc.

In the illustrated example of FIG. 27, the lateral-control surface actuation mechanism 2704 is operatively coupled to the lateral-control surface 2702. The mini-spoiler 2706 is mechanically slaved (e.g., via any type and/or any number of engaged mechanical couplings, including gears, clutches, rods, pistons, shafts, links, pulleys, chains, belts, hinges, pins, biasing elements, fasteners, etc.) to the lateral-control surface actuation mechanism 2704 such that movement and/or the position of the mini-spoiler 2706 is mechanically dependent upon movement and/or the position of the lateral-control surface 2702. The controller 2708 is operatively coupled to the lateral-control surface actuation mechanism 2704. The lateral-control surface sensor 2710, the mini-spoiler sensor 2712, and the other sensor(s) 2714 are respectively operatively coupled to the controller 2708.

The control system 2700 of FIG. 27 can be implemented in an aircraft including the aircraft wing 800 of FIGS. 8-14, or the aircraft wing 1500 of FIGS. 15-21. For example, the lateral-control surface 2702 of the control system 2700 can be implemented by and/or as any of the lateral-control surfaces (e.g., the inboard spoiler 126, the outboard spoiler 128, the flaperon 130, or the aileron 132) of the aircraft wing 800 of FIGS. 8-14, or by and/or as any of the lateral-control surfaces (e.g., the inboard spoiler 126, the outboard spoiler 128, the flaperon 130, or the aileron 132) of the aircraft wing 1500 of FIGS. 15-21. As another example, the mini-spoiler 2706 of the control system 2700 can be implemented by and/or as any of the mini-spoilers (e.g., the first mini-spoiler 802, the second mini-spoiler 804, the third mini-spoiler 806, or the fourth mini-spoiler 808) of the aircraft wing 800 of FIGS. 8-14, or by and/or as any of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21.

The lateral-control surface 2702 and the mini-spoiler 2706 of the control system 2700 of FIG. 27 are preferably implemented by and/or as a lateral-control surface and a mini-spoiler that are associated (e.g., positionally and/or functionally associated) with one another. For example, the lateral-control surface 2702 of FIG. 27 can be implemented by and/or as the inboard spoiler 126 of the aircraft wing 800 of FIGS. 8-14, and the mini-spoiler 2706 of FIG. 27 can be implemented by and/or as the first mini-spoiler 802 of the aircraft wing 800 of FIGS. 8-14 located forward of the inboard spoiler 126. As another example, the lateral-control surface 2702 of FIG. 27 can be implemented by and/or as the outboard spoiler 128 of the aircraft wing 800 of FIGS. 8-14, and the mini-spoiler 2706 of FIG. 27 can be implemented by and/or as the second mini-spoiler 804 of the aircraft wing 800 of FIGS. 8-14 located forward of the outboard spoiler 128. As another example, the lateral-control surface 2702 of FIG. 27 can be implemented by and/or as the flaperon 130 of the aircraft wing 800 of FIGS. 8-14, and the mini-spoiler 2706 of FIG. 27 can be implemented by and/or as the third mini-spoiler 806 of the aircraft wing 800 of FIGS. 8-14 located forward of the flaperon 130. As another example, the lateral-control surface 2702 of FIG. 27 can be implemented by and/or as the aileron 132 of the aircraft wing 800 of FIGS. 8-14, and the mini-spoiler 2706 of FIG. 27 can be implemented by and/or as the fourth mini-spoiler 808 of the aircraft wing 800 of FIGS. 8-14 located forward of the aileron 132.

As another example, the lateral-control surface 2702 of FIG. 27 can be implemented by and/or as the inboard spoiler 126 of the aircraft wing 1500 of FIGS. 15-21, and the mini-spoiler 2706 of FIG. 27 can be implemented by and/or as the first mini-spoiler 1502 of the aircraft wing 1500 of FIGS. 15-21 located on the inboard spoiler 126. As another example, the lateral-control surface 2702 of FIG. 27 can be implemented by and/or as the outboard spoiler 128 of the aircraft wing 1500 of FIGS. 15-21, and the mini-spoiler 2706 of FIG. 27 can be implemented by and/or as the second mini-spoiler 1504 of the aircraft wing 1500 of FIGS. 15-21 located on the one of the outboard spoilers 128. As another example, the lateral-control surface 2702 of FIG. 27 can be implemented by and/or as the flaperon 130 of the aircraft wing 1500 of FIGS. 15-21, and the mini-spoiler 2706 of FIG. 27 can be implemented by and/or as the third mini-spoiler 1506 of the aircraft wing 1500 of FIGS. 15-21 located on the flaperon 130. As another example, the lateral-control surface 2702 of FIG. 27 can be implemented by and/or as the aileron 132 of the aircraft wing 1500 of FIGS. 15-21, and the mini-spoiler 2706 of FIG. 27 can be implemented by and/or as the fourth mini-spoiler 1508 of the aircraft wing 1500 of FIGS. 15-21 located on the aileron 132.

The lateral-control surface actuation mechanism 2704 of the control system 2700 of FIG. 27 can be located (e.g., partially or fully located) within and/or on the aircraft wing 800 of FIGS. 8-14 or the aircraft wing of FIGS. 15-21, and may include portions and/or components located within and/or on the fuselage of the aircraft implementing the aircraft wing 800 of FIGS. 8-14 or the aircraft wing 1500 of FIGS. 15-21. The lateral-control surface actuation mechanism 2704 of FIG. 27 can be implemented by and/or as any number and/or type of actuation mechanism capable of being configured to fit partially and/or fully within or on an aircraft wing (e.g., the aircraft wing 800 of FIGS. 8-14, the aircraft wing 1500 of FIGS. 15-21, etc.) to which the lateral-control surface 2702 of FIG. 27 is movably coupled, and capable of being configured to move (e.g., rotate and/or deflect) the lateral-control surface 2702 of FIG. 27 over a desired and/or specified range of positions.

In some examples, the lateral-control surface actuation mechanism 2704 of FIG. 27 can be implemented by and/or as an electro-mechanical actuation system that includes one or more electronic component(s). In other examples, the lateral-control surface actuation mechanism 2704 of FIG. 27 can be implemented by and/or as a hydro-mechanical actuation system that includes one or more hydraulic component(s). In still other examples, the lateral-control surface actuation mechanism 2704 of FIG. 27 can be implemented by and/or as a pneumatic-mechanical actuation system that includes one or more pneumatic component(s). The lateral-control surface actuation mechanism 2704 of FIG. 27 can include any number and/or type of mechanical components including, for example, any number and/or type of actuators, motors, valves, gears, clutches, latches, pistons, rods, shafts, links, pulleys, chains, belts, hinges, pins, biasing elements, shape memory alloys, etc.

The controller 2708 of the control system 2700 of FIG. 27 can be located (e.g., partially or fully located) within and/or on the aircraft wing 800 of FIGS. 8-14 or the aircraft wing of FIGS. 15-21, or within and/or on the fuselage of the aircraft implementing the aircraft wing 800 of FIGS. 8-14 or the aircraft wing 1500 of FIGS. 15-21. The controller 2708 of FIG. 27 can be implemented by and/or as any number and/or type of hardware element capable of being configured to control the lateral-control surface actuation mechanism 2704 of the control system 2700 of FIG. 27, and/or capable of being configured to receive and/or process data sensed, measured and/or detected by the lateral-control surface sensor 2710, the mini-spoiler sensor 2712, and/or the other sensor(s) 2714 of the control system 2700 of FIG. 27. The controller 2708 of FIG. 27 can be implemented by one or more controller(s), processor(s), microcontroller(s), microprocessor(s), and/or circuit(s).

The lateral-control surface sensor 2710 of the control system 2700 of FIG. 27 can be located on the lateral-control surface 2702 of FIG. 27. For example, the lateral-control surface sensor 2710 of FIG. 27 can be located on any of the lateral-control surfaces (e.g., the inboard spoiler 126, the outboard spoiler 128, the flaperon 130, or the aileron 132) of the aircraft wing 800 of FIGS. 8-14 or the aircraft wing 1500 of FIGS. 15-21. The lateral-control surface sensor 2710 of FIG. 27 is configured to sense, measure and/or detect the position and/or angle (e.g., relative to a reference location and/or orientation) of the lateral-control surface 2702 of FIG. 27. For example, the lateral-control surface sensor 2710 of FIG. 27 can be configured to sense, measure and/or detect the position and/or angle (e.g., relative to a reference location and/or orientation) of one of the lateral-control surfaces (e.g., the inboard spoiler 126, the outboard spoiler 128, the flaperon 130, or the aileron 132) of the aircraft wing 800 of FIGS. 8-14 or the aircraft wing 1500 of FIGS. 15-21.

The mini-spoiler sensor 2712 of the control system 2700 of FIG. 27 can be located on the mini-spoiler 2706 of FIG. 27. For example, the mini-spoiler sensor 2712 can be located on any of the mini-spoilers (e.g., the first mini-spoiler 802, the second mini-spoiler 804, the third mini-spoiler 806, or the fourth mini-spoiler 808) of the aircraft wing 800 of FIGS. 8-14, or on any of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21. The mini-spoiler sensor 2712 of FIG. 27 is configured to sense, measure and/or detect the position and/or angle (e.g., relative to a reference location and/or orientation) of the mini-spoiler 2706 of FIG. 27. For example, the mini-spoiler sensor 2712 of FIG. 27 can be configured to sense, measure and/or detect the position and/or angle (e.g., relative to a reference location and/or orientation) of one of the mini-spoilers (e.g., the first mini-spoiler 802, the second mini-spoiler 804, the third mini-spoiler 806, or the fourth mini-spoiler 808) of the aircraft wing 800 of FIGS. 8-14, or one of the mini-spoilers (e.g., the first mini-spoiler 1502, the second mini-spoiler 1504, the third mini-spoiler 1506, or the fourth mini-spoiler 1508) of the aircraft wing 1500 of FIGS. 15-21.

The other sensor(s) 2714 of the control system 2700 of FIG. 27 can be located within and/or on the aircraft wing 800 of FIGS. 8-14 or the aircraft wing 1500 of FIGS. 15-21, and/or may include portions and/or components located within and/or on the fuselage of the aircraft implementing the aircraft wing 800 of FIGS. 8-14 or the aircraft wing 1500 of FIGS. 15-21. For example, the other sensor(s) 2714 of FIG. 27 can include one or more lift-control surface sensor(s) located on any of the lift-control surfaces (e.g., the inboard slat 118, the outboard slats 120, the inboard flap 122, and/or the outboard flap 124) of the aircraft wing 800 of FIGS. 8-14 or the aircraft wing 1500 of FIGS. 15-21. In such an example, the lift-control surface sensor(s) can be configured to sense, measure and/or detect the position and/or angle (e.g., relative to a reference location and/or orientation) of one or more of the lift-control surfaces (e.g., the inboard slat 118, the outboard slats 120, the inboard flap 122, or the outboard flap 124) of the aircraft wing 800 of FIGS. 8-14 or the aircraft wing 1500 of FIGS. 15-21. The other sensor(s) 2714 of FIG. 27 can additionally or alternatively include one or more angle of attack sensor(s), one or more attitude sensor(s), one or more altitude sensor(s), one or more airspeed sensor(s), and/or one or more Mach number sensor(s) respectively configured to sense, measure and/or detect one or more other parameter(s) associated with an aircraft implementing the aircraft wing 800 of FIGS. 8-14 or the aircraft wing 1500 of FIGS. 15-21. Such other parameter(s) can include, for example, an angle of attack (e.g., an angle between a chord line of an aircraft wing and a relative direction of airflow against the aircraft wing) of the aircraft wing 800 of FIGS. 8-14 or the aircraft wing 1500 of FIGS. 15-21 (e.g., the angle between the chord line of the aircraft wing and the relative direction of airflow against the aircraft wing), and/or any an attitude, an altitude, an airspeed, or a Mach number of an aircraft implementing the aircraft wing 800 of FIGS. 8-14 or the aircraft wing 1500 of FIGS. 15-21.

The lateral-control surface 2702 of FIG. 27 can be moved (e.g., rotated and/or deflected) in a controlled manner to any number of positions over a possible range of positions of the lateral-control surface 2702. The controlled movement(s) of the lateral-control surface 2702 occur(s) via the lateral-control surface actuation mechanism 2704 of the control system 2700 of FIG. 27, with the lateral-control surface actuation mechanism 2704 being managed and/or controlled via the controller 2708 of the control system 2700. The controller 2708 generates and/or transmits one or more signal(s), command(s), and/or instruction(s) that cause(s) the lateral-control surface actuation mechanism 2704 to move the lateral-control surface 2702 to one or more position(s) (e.g., a neutral position, a first upward deflected position, a second upward deflected position extending beyond the first upward deflected position, etc.) specified by, indicated by, and/or derived from the signal(s), command(s), and/or instruction(s).

In some examples, the controller 2708 is configured to generate one or more signal(s), command(s), and/or instruction(s) that cause(s) the lateral-control surface actuation mechanism 2704 to move the lateral-control surface 2702 to a specified position in response to the controller 2708 determining and/or detecting that a threshold parameter associated with the position of the lateral-control surface 2702, the position of the mini-spoiler 2706 and/or, more generally, the operation of the aircraft implementing the control system 2700 of FIG. 27 has been sensed, measured and/or detected by one or more of the lateral-control surface sensor 2710, the mini-spoiler sensor 2712, and/or the other sensor(s) 2714 of the control system 2700 of FIG. 27.

The mini-spoiler 2706 of FIG. 27 can be moved (e.g., rotated and/or deflected) in a controlled manner to any number of positions over a possible range of positions of the mini-spoiler 2706. The controlled movement(s) of the mini-spoiler 2706 is/are mechanically slaved, via the lateral-control surface actuation mechanism 2704 of FIG. 27, to the controlled movement(s) of the lateral-control surface 2702 of FIG. 27, as described above. In some examples, the mechanically-slaved mini-spoiler 2706 is configured to be moved from a retracted position to a deployed position in response to the lateral-control surface actuation mechanism 2704 moving the lateral-control surface 2702 from a neutral position to or toward a first upward deflected position. The mechanically-slaved mini-spoiler 2706 can further be configured to be moved from the deployed position to the retracted position in response to the lateral-control surface actuation mechanism 2704 moving the lateral-control surface 2702 from the first upward deflected position to or toward a second upward deflected position extending beyond the first upward deflected position. The mechanically-slaved mini-spoiler 2706 can alternatively be configured to maintain its deployed position in response to the lateral-control surface actuation mechanism 2704 moving the lateral-control surface 2702 from the first upward deflected position to or toward the second upward deflected position.

From the foregoing, it will be appreciated that the above-disclosed aircraft wings having example mini-spoilers configured to enhance the effectiveness of example lateral-control surfaces of the aircraft wings are advantageous relative to known aircraft wings lacking such mini-spoilers. In some disclosed examples, a lateral-control surface is movably coupled to the aircraft wing, and a mini-spoiler is located on or forward of the lateral-control surface. The mini-spoiler is movable between a retracted position and a deployed position relative to the aircraft wing and/or relative to the lateral-control surface, and is configured to be moved from the retracted position to the deployed position based on the lateral-control surface being positioned at a small upward deflection (e.g., five degrees (5°) upward) relative to a neutral (e.g., undeflected) position of the lateral-control surface). Moving the mini-spoiler from the retracted position to the deployed position while the lateral-control surface is positioned at small upward deflections advantageously prevents flow reattachment on the lateral-control surface. At high transonic Mach numbers, this favorable flow-field change induced by the deployment of the mini-spoiler can minimize or completely eliminate adverse reduction or reversal of an intended lateral-control control surface effect when the lateral-control surface is positioned at small upward deflections.

In some disclosed examples, the lateral-control surface is actuated via a first actuator configured to move the lateral-control surface, and the mini-spoiler is separately and/or independently actuated via a second actuator configured to move the mini-spoiler. In other disclosed examples, the lateral-control surface is actuated via an actuator configured to move the lateral-control surface, and the mini-spoiler is mechanically slaved (e.g., via any type and/or any number of engaged mechanical couplings, including gears, clutches, rods, pistons, shafts, links, pulleys, chains, belts, hinges, pins, biasing elements, fasteners, etc.) to the lateral control surface and/or to the actuator that is configured to move the lateral-control surface, such that the movements and/or positions of the mini-spoiler are mechanically dependent upon the movements and/or positions of the lateral-control surface.

The following paragraphs provide various examples of the examples disclosed herein.

Example 1 includes an aircraft comprising a wing, a lateral-control surface, and a mini-spoiler. The lateral-control surface of Example 1 is movably coupled to the wing. The lateral-control surface is movable between a neutral position, a first upward deflected position, and a second upward deflected position extending beyond the first upward deflected position. The mini-spoiler of Example 1 is located on or forward of the lateral-control surface. The mini-spoiler is movable between a retracted position and a deployed position. The mini-spoiler is configured to be moved from the retracted position to the deployed position based on the lateral-control surface being moved from the neutral position to or toward the first upward deflected position.

Example 2 includes the aircraft of Example 1, wherein the mini-spoiler includes an upper surface having a chordwise dimension between approximately one percent and approximately five percent of a local wing chord when the mini-spoiler is in the retracted position, wherein the local wing chord is measured from a leading edge of the wing to a trailing edge of the wing at a location local to the mini-spoiler.

Example 3 includes the aircraft of any of Examples 1-2, wherein the mini-spoiler is movably coupled to the wing and located forward of the lateral-control surface.

Example 4 includes the aircraft of any of Examples 1-2, wherein the mini-spoiler is movably coupled to the lateral-control surface.

Example 5 includes the aircraft of any of Examples 1-4, wherein the first upward deflected position is angled approximately five degrees from the neutral position, and the second upward deflected position is angled approximately fifteen degrees from the neutral position.

Example 6 includes the aircraft of any of Examples 1-5, wherein the mini-spoiler is further configured to be moved from the deployed position to the retracted position based on the lateral-control surface being moved from the first upward deflected position to or toward the second upward deflected position.

Example 7 includes the aircraft of any of Examples 1-6, wherein the aircraft further comprises a first actuation mechanism, a second actuation mechanism, and a controller. The first actuation mechanism of Example 7 is operatively coupled to the lateral-control surface and is configured to move the lateral-control surface. The second actuation mechanism of Example 7 is operatively coupled to the mini-spoiler and is configured to move the mini-spoiler independently from the lateral-control surface being moved by the first actuation mechanism. The controller of Example 7 is operatively coupled to the first and second actuation mechanisms and is configured to independently control the first and second actuation mechanisms.

Example 8 includes the aircraft of Example 7, wherein the controller is configured to command the first and second actuation mechanisms to simultaneously move the lateral-control surface from the neutral position toward the first upward deflected position and the mini-spoiler from the retracted position toward the deployed position.

Example 9 includes the aircraft of any of Examples 1-6, wherein the aircraft further comprises an actuation mechanism and a controller. The actuation mechanism of Example 9 is operatively coupled to the lateral-control surface and is configured to move the lateral-control surface. The actuation mechanism is configured to mechanically slave the mini-spoiler to the lateral-control surface such that the mini-spoiler moves based on the actuation mechanism moving the lateral-control surface. The controller of Example 9 is operatively coupled to the actuation mechanism and is configured to control the actuation mechanism.

Example 10 includes the aircraft of any of Examples 1-9, wherein the lateral-control surface is a spoiler.

Example 11 includes the aircraft of any of Examples 1-9, wherein the lateral-control surface is a flaperon.

Example 12 includes the aircraft of any of Examples 1-9, wherein the lateral-control surface is an aileron.

Example 13 includes a method comprising moving a lateral-control surface coupled to a wing of an aircraft from a neutral position to a first upward deflected position, and from the first upward deflected position to a second upward deflected position extending beyond the first upward deflected position. The method of Example 13 further comprises moving a mini-spoiler located on or forward of the lateral-control surface from a retracted position to a deployed position based on the lateral-control surface being moved from the neutral position to or toward the first upward deflected position.

Example 14 includes the method of Example 13, wherein the mini-spoiler includes an upper surface having a chordwise dimension between approximately one percent and approximately five percent of a local wing chord when the mini-spoiler is in the retracted position, wherein the local wing chord is measured from a leading edge of the wing to a trailing edge of the wing at a location local to the mini-spoiler.

Example 15 includes the method of any of Examples 13-14, wherein the mini-spoiler is movably coupled to the wing and located forward of the lateral-control surface.

Example 16 includes the method of any of Examples 13-14, wherein the mini-spoiler is movably coupled to the lateral-control surface.

Example 17 includes the method of any of Examples 13-16, wherein the first upward deflected position is angled approximately five degrees from the neutral position, and wherein the second upward deflected position is angled approximately fifteen degrees from the neutral position.

Example 18 includes the method of any of Examples 13-17, wherein the method further comprises moving the mini-spoiler from the deployed position to the retracted position based on the lateral-control surface being moved from the first upward deflected position to or toward the second upward deflected position.

Example 19 includes the method of any of Examples 13-18, wherein the method further comprises independently controlling a first actuation mechanism operatively coupled to the lateral-control surface and a second actuation mechanism operatively coupled to the mini-spoiler, and wherein the first actuation mechanism is configured to move the lateral-control surface and the second actuation mechanism is configured to move the mini-spoiler.

Example 20 includes the method of any of Examples 13-18, and further comprises controlling an actuation mechanism operatively coupled to the lateral-control surface, wherein the actuation mechanism is configured to move the lateral-control surface and to mechanically slave the mini-spoiler to the lateral-control surface such that the moving of the mini-spoiler is mechanically dependent on the moving of the lateral-control surface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft, comprising:
   a wing;
   a lateral-control surface movably coupled to the wing, the lateral-control surface movable between a neutral position, a first upward deflected position, and a second upward deflected position extending beyond the first upward deflected position; and
   a mini-spoiler located on or forward of the lateral-control surface, the mini-spoiler movable between a retracted position and a deployed position, the mini-spoiler configured to be moved from the retracted position to the deployed position based on the lateral-control surface being moved from the neutral position to or toward the first upward deflected position, the mini-spoiler further configured to be moved from the deployed position to the retracted position based on the lateral-control surface being moved from the first upward deflected position to or toward the second upward deflected position.

2. The aircraft of claim 1, wherein the mini-spoiler includes an upper surface having a chordwise dimension between approximately one percent and approximately five percent of a local wing chord when the mini-spoiler is in the retracted position, wherein the local wing chord is measured from a leading edge of the wing to a trailing edge of the wing at a location local to the mini-spoiler.

3. The aircraft of claim 1, wherein the mini-spoiler is movably coupled to the wing and located forward of the lateral-control surface.

4. The aircraft of claim 1, wherein the mini-spoiler is movably coupled to the lateral-control surface.

5. The aircraft of claim 1, wherein the first upward deflected position is angled approximately five degrees from the neutral position, and wherein the second upward deflected position is angled approximately fifteen degrees from the neutral position.

6. The aircraft of claim 1, further comprising:
   a first actuation mechanism operatively coupled to the lateral-control surface, the first actuation mechanism configured to move the lateral-control surface;
   a second actuation mechanism operatively coupled to the mini-spoiler, the second actuation mechanism configured to move the mini-spoiler independently from the lateral-control surface being moved by the first actuation mechanism; and
   a controller operatively coupled to the first and second actuation mechanisms, the controller configured to independently control the first and second actuation mechanisms.

7. The aircraft of claim 6, wherein the controller is configured to command the first and second actuation mechanisms to simultaneously move the lateral-control surface from the neutral position toward the first upward deflected position and the mini-spoiler from the retracted position toward the deployed position.

8. The aircraft of claim 1, further comprising:
   an actuation mechanism operatively coupled to the lateral-control surface, the actuation mechanism configured to move the lateral-control surface and to mechanically slave the mini-spoiler to the lateral-control surface such that the mini-spoiler moves based on the actuation mechanism moving the lateral-control surface; and
   a controller operatively coupled to the actuation mechanism, the controller configured to control the actuation mechanism.

9. The aircraft of claim 1, wherein the lateral-control surface is a spoiler.

10. The aircraft of claim 1, wherein the lateral-control surface is a flaperon.

11. The aircraft of claim 1, wherein the lateral-control surface is an aileron.

12. A method, comprising:
   moving a lateral-control surface coupled to a wing of an aircraft from a neutral position to a first upward deflected position, and from the first upward deflected position to a second upward deflected position extending beyond the first upward deflected position;
   moving a mini-spoiler located on or forward of the lateral-control surface from a retracted position to a deployed position based on the lateral-control surface being moved from the neutral position to or toward the first upward deflected position; and
   moving the mini-spoiler from the deployed position to the retracted position based on the lateral-control surface being moved from the first upward deflected position to or toward the second upward deflected position.

13. The method of claim 12, wherein the mini-spoiler includes an upper surface having a chordwise dimension between approximately one percent and approximately five percent of a local wing chord when the mini-spoiler is in the retracted position, wherein the local wing chord is measured from a leading edge of the wing to a trailing edge of the wing at a location local to the mini-spoiler.

14. The method of claim 12, wherein the mini-spoiler is movably coupled to the wing and located forward of the lateral-control surface.

15. The method of claim 12, wherein the mini-spoiler is movably coupled to the lateral-control surface.

16. The method of claim 12, wherein the first upward deflected position is angled approximately five degrees from the neutral position, and wherein the second upward deflected position is angled approximately fifteen degrees from the neutral position.

17. The method of claim 12, further comprising independently controlling a first actuation mechanism operatively coupled to the lateral-control surface and a second actuation mechanism operatively coupled to the mini-spoiler, wherein the first actuation mechanism is configured to move the lateral-control surface and the second actuation mechanism is configured to move the mini-spoiler.

18. The method of claim 12, further comprising controlling an actuation mechanism operatively coupled to the lateral-control surface, wherein the actuation mechanism is configured to move the lateral-control surface and to mechanically slave the mini-spoiler to the lateral-control surface such that the moving of the mini-spoiler is mechanically dependent on the moving of the lateral-control surface.

19. An aircraft, comprising:
a wing having a fixed upper surface;
a lateral-control surface movably coupled to the wing, the lateral-control surface movable between a neutral position, a first upward deflected position, and a second upward deflected position extending beyond the first upward deflected position; and
a mini-spoiler located along the fixed upper surface of the wing forward of the lateral-control surface, the mini-spoiler having an upper surface, the mini-spoiler movable between a retracted position and an upward deployed position, the mini-spoiler configured to be moved from the retracted position to the upward deployed position based on the lateral-control surface being moved from the neutral position to or toward the first upward deflected position, the upper surface of the mini-spoiler to be aligned with the fixed upper surface of the wing when the mini-spoiler is in the retracted position.

20. The aircraft of claim 19, wherein the mini-spoiler is further configured to be moved from the upward deployed position to the retracted position based on the lateral-control surface being moved from the first upward deflected position to or toward the second upward deflected position.

21. An aircraft, comprising:
a wing;
a lateral-control surface movably coupled to the wing, the lateral-control surface having an upper surface, the lateral-control surface movable between a neutral position, a first upward deflected position, and a second upward deflected position extending beyond the first upward deflected position; and
a mini-spoiler located on the lateral-control surface along the upper surface of the lateral-control surface, the mini-spoiler having an upper surface, the mini-spoiler movable between a retracted position and an upward deployed position, the mini-spoiler configured to be moved from the retracted position to the upward deployed position based on the lateral-control surface being moved from the neutral position to or toward the first upward deflected position, the upper surface of the mini-spoiler to be aligned with the upper surface of the lateral-control surface when the mini-spoiler is in the retracted position.

22. The aircraft of claim 21, wherein the mini-spoiler is further configured to be moved from the upward deployed position to the retracted position based on the lateral-control surface being moved from the first upward deflected position to or toward the second upward deflected position.

* * * * *